United States Patent
Kim et al.

(10) Patent No.: US 9,241,268 B2
(45) Date of Patent: Jan. 19, 2016

(54) METHOD AND DEVICE FOR SCREEN UNLOCKING OF ELECTRONIC DEVICE

(71) Applicant: Samsung Electronics Co., Ltd., Gyeonggi-do (KR)

(72) Inventors: So-Young Kim, Gyeonggi-do (KR); Soo-Hyung Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 12 days.

(21) Appl. No.: 14/044,313

(22) Filed: Oct. 2, 2013

(65) Prior Publication Data

US 2014/0099924 A1    Apr. 10, 2014

(30) Foreign Application Priority Data

Oct. 4, 2012    (KR) .................... 10-2012-0109801

(51) Int. Cl.
*H04W 12/06* (2009.01)
*G06F 3/0488* (2013.01)
*H04L 29/06* (2006.01)

(52) U.S. Cl.
CPC ............ *H04W 12/06* (2013.01); *G06F 3/0488* (2013.01); *H04L 63/168* (2013.01)

(58) Field of Classification Search
CPC ....... H04W 88/02; H04W 12/06; H04M 1/66; G06F 21/00
See application file for complete search history.

(56) References Cited

U.S. PATENT DOCUMENTS

| | | | |
|---|---|---|---|
| 8,504,842 B1* | 8/2013 | Meacham | 713/183 |
| 2011/0130170 A1* | 6/2011 | Han et al. | 455/566 |
| 2011/0283241 A1* | 11/2011 | Miller et al. | 715/863 |

FOREIGN PATENT DOCUMENTS

KR    10-2011-0103598 A    9/2011

* cited by examiner

*Primary Examiner* — Myron K Wyche
(74) *Attorney, Agent, or Firm* — Cha & Reiter, LLC

(57) ABSTRACT

A method for authentication in an electronic device is provided, comprising: receiving a touch pattern, the touch pattern including a set of points; determining, by a processor, whether the touch pattern is valid by validating a first portion of the touch pattern, the first portion not including at least one of the set of points; when the touch pattern is determined to be valid, unlocking the screen; and when the touch pattern is determined to be invalid, holding the screen locked.

22 Claims, 76 Drawing Sheets

| POSITION OF THE UNDEFINED TOUCH PATTERN | AHEAD OF THE DEFINED TOUCH PATTERN | BEHIND THE DEFINED TOUCH PATTERN |
|---|---|---|
| THE NUMBER OF POINTS CONNECTED BY THE UNDEFINED TOUCH PATTERN | TWO | THREE |

----- : THE UNDEFINED TOUCH PATTERN

——— : THE DEFINED TOUCH PATTERN

| POSITION OF THE UNDEFINED TOUCH PATTERN | AHEAD OF THE DEFINED TOUCH PATTERN | BEHIND THE DEFINED TOUCH PATTERN |
|---|---|---|
| THE NUMBER OF POINTS CONNECTED BY THE UNDEFINED TOUCH PATTERN | UNLIMITED | TWO |

——— : THE DEFINED TOUCH PATTERN

| POSITION OF THE UNDEFINED TOUCH PATTERN | AHEAD OF THE DEFINED TOUCH PATTERN | BEHIND THE DEFINED TOUCH PATTERN |
|---|---|---|
| THE NUMBER OF POINTS CONNECTED BY THE UNDEFINED TOUCH PATTERN | THREE | UNLIMITED |

——— : THE DEFINED TOUCH PATTERN

| POSITION OF THE UNDEFINED TOUCH PATTERN | AHEAD OF THE DEFINED TOUCH PATTERN | BEHIND THE DEFINED TOUCH PATTERN |
|---|---|---|
| THE NUMBER OF POINTS CONNECTED BY THE UNDEFINED TOUCH PATTERN | THREE | UNLIMITED |

– – – – : THE UNDEFINED TOUCH PATTERN

———— : THE DEFINED TOUCH PATTERN

| POSITION OF THE UNDEFINED TOUCH PATTERN | AHEAD OF THE DEFINED TOUCH PATTERN | BEHIND THE DEFINED TOUCH PATTERN |
|---|---|---|
| THE NUMBER OF POINTS CONNECTED BY THE UNDEFINED TOUCH PATTERN | THREE | UNLIMITED |

---- : THE UNDEFINED TOUCH PATTERN

—— : THE DEFINED TOUCH PATTERN

| POSITION OF THE UNDEFINED TOUCH PATTERN | AHEAD OF THE DEFINED TOUCH PATTERN | BEHIND THE DEFINED TOUCH PATTERN |
|---|---|---|
| THE NUMBER OF POINTS CONNECTED BY THE UNDEFINED TOUCH PATTERN | THREE | UNLIMITED |

- - - - : THE UNDEFINED TOUCH PATTERN

———— : THE DEFINED TOUCH PATTERN

| POSITION OF THE UNDEFINED CHARACTER STRING | AHEAD OF THE DEFINED CHARACTER STRING |
|---|---|
| THE NUMBER OF CHARACTERS IN THE UNDEFINED CHARACTER STRING | TWO |

| POSITION OF THE UNDEFINED CHARACTER STRING | AHEAD OF THE DEFINED CHARACTER STRING |
|---|---|
| THE NUMBER OF CHARACTERS IN THE UNDEFINED CHARACTER STRING | TWO |

| POSITION OF THE UNDEFINED CHARACTER STRING | AHEAD OF THE DEFINED CHARACTER STRING | BEHIND THE DEFINED CHARACTER STRING |
|---|---|---|
| THE NUMBER OF CHARACTERS IN THE UNDEFINED CHARACTER STRING | TWO | THREE |

THE DEFINED CHARACTER STRING

| POSITION OF THE UNDEFINED CHARACTER STRING | AHEAD OF THE DEFINED CHARACTER STRING | BEHIND THE DEFINED CHARACTER STRING |
|---|---|---|
| THE NUMBER OF CHARACTERS IN THE UNDEFINED CHARACTER STRING | TWO | THREE |

| POSITION OF THE UNDEFINED CHARACTER STRING | AHEAD OF THE DEFINED CHARACTER STRING | BEHIND THE DEFINED CHARACTER STRING |
|---|---|---|
| THE NUMBER OF CHARACTERS IN THE UNDEFINED CHARACTER STRING | THREE | UNLIMITED |

| POSITION OF THE UNDEFINED CHARACTER STRING | AHEAD OF THE DEFINED CHARACTER STRING | BEHIND THE DEFINED CHARACTER STRING |
|---|---|---|
| THE NUMBER OF CHARACTERS IN THE UNDEFINED CHARACTER STRING | THREE | UNLIMITED |

| POSITION OF THE UNDEFINED CHARACTER STRING | AHEAD OF THE DEFINED CHARACTER STRING | BEHIND THE DEFINED CHARACTER STRING |
|---|---|---|
| THE NUMBER OF CHARACTERS IN THE UNDEFINED CHARACTER STRING | THREE | UNLIMITED |

2

METHOD AND DEVICE FOR SCREEN UNLOCKING OF ELECTRONIC DEVICE

CROSS-REFERENCE TO RELATED APPLICATION(S)

The present application claims the benefit under 35 U.S.C. §119(a) to a Korean patent application filed in the Korean Intellectual Property Office on Oct. 4, 2012, and assigned Serial No. 10-2012-0109801, the entire disclosure of which is hereby incorporated by reference.

TECHNICAL FIELD

The present disclosure relates generally to a method and an apparatus for unlocking a screen of an electronic device.

BACKGROUND

Thanks to recent development in the electronic communication industry, portable electronic devices, such as mobile communication terminals (e.g., cellular phones), electronic organizers, Personal Digital Assistants (PDAs) have become necessities of modern life. Such electronic devices often use touch screens as a means for user input in combination with screen lock mechanisms that restrict access to those touchscreens. FIG. 1 depicts an example of one such screen lock mechanism. As shown, the screen lock provides a slide bar 11. When the slide bar 11 is moved to the right, the screen of the portable electronic device is unlocked. However, this mechanism is not completely secure because it allows the screen of the portable device to be unlocked by just about anyone.

SUMMARY

To address the above-discussed deficiencies the present disclosure provides a method and an apparatus for securely unlocking the screens of electronic devices. In one aspect, a method for unlocking a screen of an electronic device is provided, comprising: receiving a touch pattern, the touch pattern including a set of points; determining, by a processor, whether the touch pattern is valid by validating a first portion of the touch pattern, the first portion not including at least one of the set of points; when the touch pattern is determined to be valid, unlocking the screen; and when the touch pattern is determined to be invalid, holding the screen locked.

In another aspect, a method for unlocking a screen of an electronic device is provided, comprising: receiving a character string, the character string including a set of characters; determining, by a processor, whether the character string is valid by validating a first portion of the character string, the first portion not including at least one of the set of characters; when the character string is determined to be valid, unlocking the screen; and when the character string is determined to be invalid, holding the screen locked.

In another aspect, an electronic device is provided comprising at least one processor, and a memory coupled to the processor. The memory stores a plurality of processor-executable instructions, which when executed by the processor cause the processor to: receive through the input device one of a character string comprising a set of characters or a touch pattern comprising a set of points, determine whether the character string or touch pattern is valid by validating a first portion of the touch pattern or character string, unlock a screen of the electronic device when the character string or touch pattern is determined to be valid, and hold the screen locked when the character string or touch pattern is determined to be invalid.

BRIEF DESCRIPTION OF THE DRAWINGS

The above and other aspects, features, and advantages of certain exemplary embodiments of the present disclosure will be more apparent from the following description taken in conjunction with the accompanying drawings, in which.

Throughout the drawings, like reference numerals will be understood to refer to like parts, components and structures.

DETAILED DESCRIPTION

The following description with reference to the accompanying drawings includes various specific details that are provided to assist in understanding that are presented in the disclosure, but these details are to be regarded merely as examples. Accordingly, those of ordinary skill in the art will recognize that various changes and modifications of the examples provided herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following examples are provided for illustrative purposes only and not for the purpose of limiting the disclosure.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
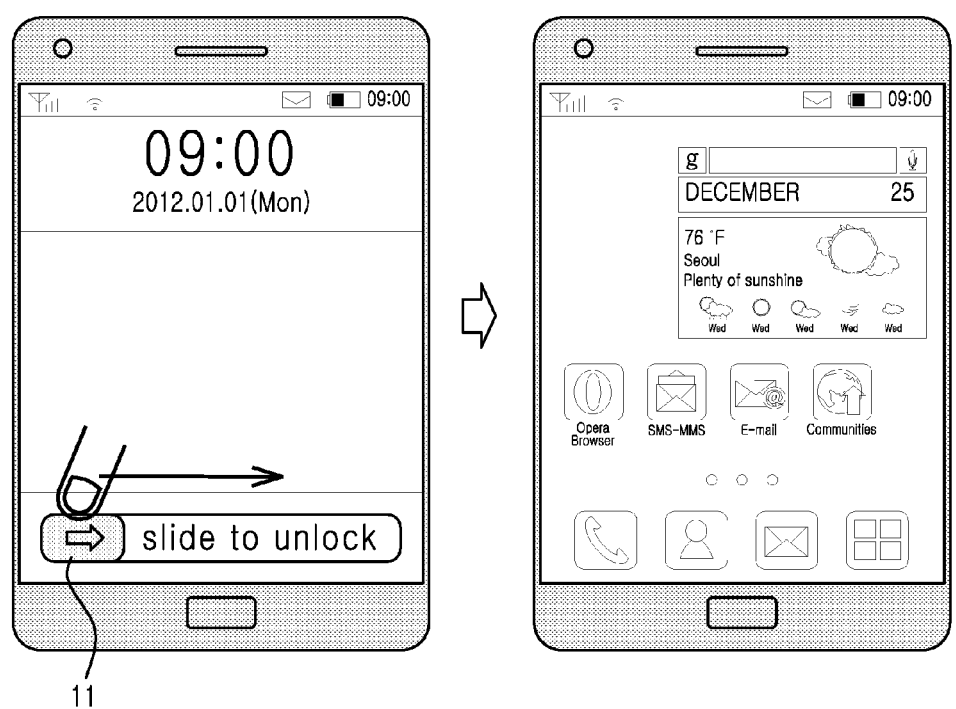
FIG. 1 is a diagram of a locked screen in a portable electronic device using a conventional touch screen in accordance with aspects of the disclosure.
Figure 2:
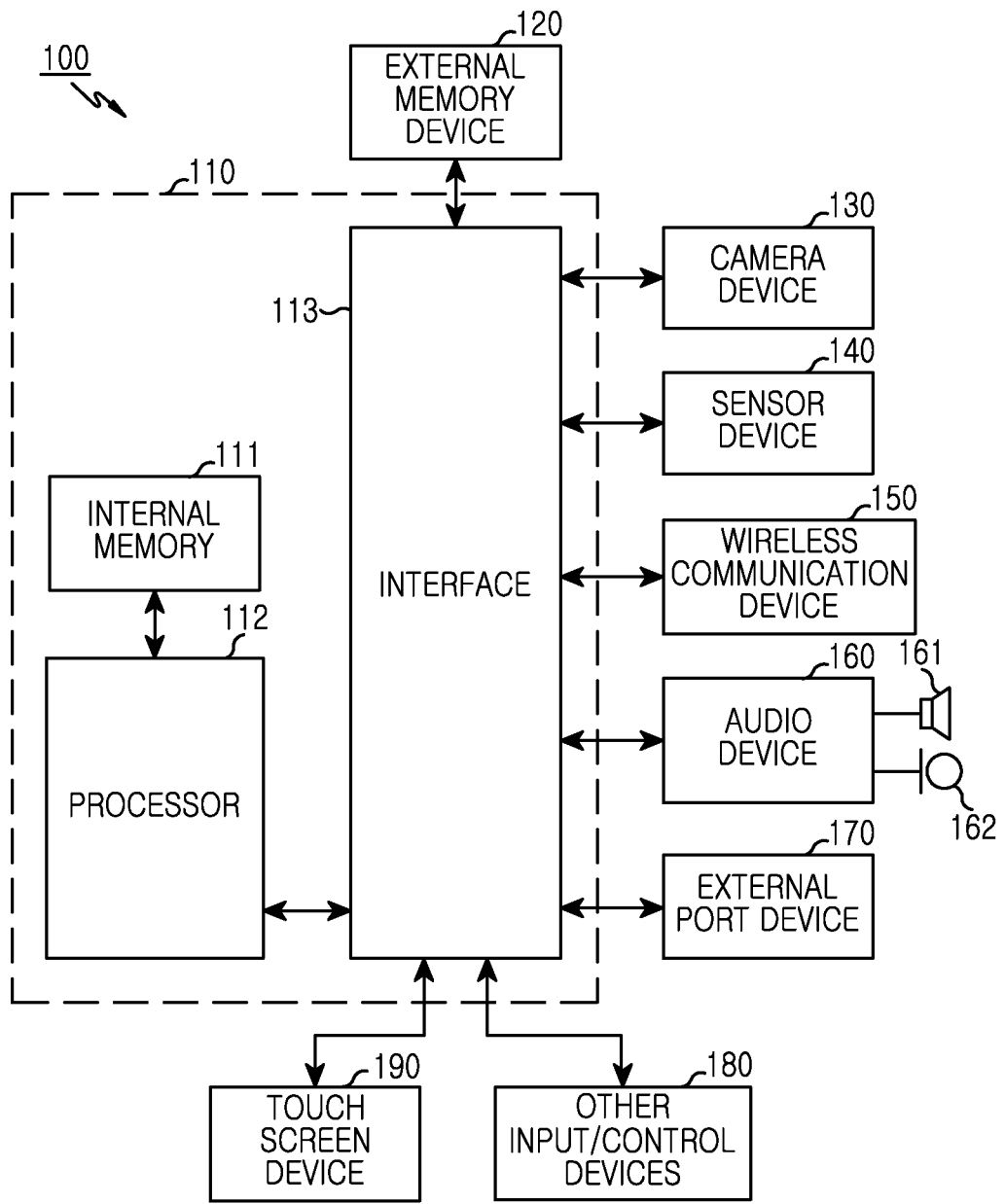
FIG. 2 is a block diagram of the portable electronic device according to aspects of the disclosure.

FIG. 2 is a block diagram of an electronic device according to aspects of the disclosure.

The electronic device 100 can employ a device such as mobile phone, mobile pad, media player, tablet computer, handheld computer, or Personal Digital Assistant (PDA) The electronic device 100 may be an electronic device combining two or more functions of those devices.

The electronic device 100 includes a host device 110, an external memory device 120, a camera device 130, a sensor device 140, a wireless communication device 150, an audio device 160, an external port device 170, a touch screen device 190, and other input/control devices 180, or any combination thereof. A plurality of external memory devices 120 and a plurality of external port devices 170 can also be included.

The host device 110 includes an internal memory 111, one or more processors 112, and an interface 113. The internal memory 111, the one or more processors 112, and the interface 113 can be embodied separately or integrated together.

The processor 112 performs various functions for the electronic device 100 by executing various software programs and processes, and it may control voice communication, video communication, and data communication. In addition to those typical functions, the processor 112 executes a software module (that includes a plurality of processor-executable instructions) stored in the internal memory 111 and/or the external memory device 120 and performs various functions corresponding to the module. The processor 112 also executes a particular software module (instruction set) stored in the internal memory 111 and/or the external memory device 120 and performs particular functions corresponding to the module. That is, the processor 112 fulfills the method according to exemplary embodiments of the present invention in association with the software modules stored in the internal memory 111 and/or the external memory device 120. The processor 112 can include one or more data processors, an image processor, or a CODEC. Additionally or alternatively, the electronic device 100 may separately include a data processor, an image processor, or a CODEC.

The interface 113 interconnects various devices that are part of the electronic device 100 with the host device 110.

The camera device 130 can perform camera functions such as photo and video clip recording. The camera device 130 includes a Charged Coupled Device (CCD) or a Complementary Metal-Oxide Semiconductor (CMOS). In some implementations, the processor may be configured to cause the camera device 130 to move a lens or adjust an F number of an iris.

The various components of the electronic device 100 can be coupled using one or more communication buses or stream lines.

The sensor device 140 includes a motion sensor, an optical sensor, and a temperature sensor and allows various functions. For example, the motion sensor can detect motion of the electronic device 100, and the optical sensor can detect intensity of ambient light.

The wireless communication device 150 allows wireless communication and can include radio frequency transmitter and receiver and optical (e.g., infrared light) transmitter and receiver. In some implementations, the wireless communication device 150 can be designed to operate over one of a Global System for Mobile communication (GSM) network, an Enhanced Data GSM Environment (EDGE) network, a Code Division Multiple Access (CDMA) network, a W-CDMA network, a Long Term Evolution (LTE) network, an Orthogonal Frequency Division Multiple Access (OFDMA) network, a Wireless Fidelity (Wi-Fi) network, a WiMax network and/or a Bluetooth network, and or any other suitable type of network.

The audio device 160 is coupled to a speaker 161 and a microphone 162 to process audio input and output such as voice recognition, voice reproduction, digital recording, and telephone function. That is, the audio device 160 communicates with a user through the speaker 161 and the microphone 162. The audio device 160 receives a data signal from the host device 110, converts the received data signal to an electric signal, and outputs the converted electric signal to the speaker 161. The speaker 161 converts the electric signal into audio. The microphone 162 converts a sound wave from the person or other sound sources to an electric signal. The audio device 160 receives the electric signal from the microphone 162, converts the received electric signal to the audio data signal, and sends the converted audio data signal to the host device 110. The audio device 160 can include an earphone, headphone, or headset attachable and detachable to and from the electronic device 100.

The external port device 170 connects the electronic device 100 to other electronic device directly or indirectly via a network (e.g., Internet, intranet, and wireless LAN).

The touch screen device 190 provides an I/O interface between the electronic device 100 and the user. That is, the touch screen device 190 applies a touch detection technology, forwards a user's touch input to the host device 110, and shows visual information fed from the host device 110, for example, text, graphic, and video, to the user.

The other input/control devices 180 can include up/down buttons for volume control. Besides, the other input/control devices 180 can include at least one of a push button, a rocker button, a rocker switch, a thumb wheel, a dial, a stick, and a pointer such as stylus, which is given the corresponding function.

The external memory device 120 includes fast random access memory such as one or more magnetic disc storage devices and/or non-volatile memory, one or more optical storage devices, and/or a flash memory (e.g., NAND and NOR). The external memory device 120 stores software, and the software includes an operating system module, a communication module, a graphic module, a user interface module, a CODEC module, and one or more application modules. The term 'module' can be referred to as a set of instructions, an instruction set, or a program. The instructions may be executed by the processor 112 or any other suitable processor.

The operating system module indicates an embedded operating system such as WINDOWS, LINUX, Darwin, RTXC, UNIX, OS X, or VxWorks, and includes various software components for controlling general system operations. These include, e.g., memory management and control, storage hardware (device) control and management, and power control and management. The operating system module processes normal communication between various hardware (devices) and software components (modules).

The communication module allows communication with other electronic devices, such as computers or servers, through the wireless communication device 150 or the external port device 170.

The graphic module may be executed by the processor 112 to provide and display graphics on the touch screen device 190. In some aspects, the term 'graphics' may encompass text, web page content, icons, digital images, video, animation, and or any other type of content that can be visually displayed on a touch screen device or another suitable type of device.

The user interface module includes various software components relating to a user interface. The user interface module is involved in the status change of the user interface and the condition of the user interface status change.

The CODEC module can include software components relating to video file encoding and decoding.

The camera module includes camera related software components allowing camera related processes and functions.

The application module includes a browser, an e-mail, an instant message, a word processing, keyboard emulation, an address book, a touch list, a widget, Digital Right Management (DRM), voice recognition, voice reproduction, a position determining function, and a location based service. The memory 110 can further include additional modules (instructions) besides the above-stated modules. The various functions of the electronic device 100 as stated above and to be explained, can be executed by hardware and/or software and/or their combination including one or more stream processing and/or Application Specific Integrated Circuits (ASICs).

Particularly, the electronic device 100 may implement security measures that involve locking the device's screen in order to block use of the device by an unauthorized person. The external memory device 120 provides a module for unlocking the screen. The module for unlocking the screen is realized through the interface between the touch screen device 190 and the user. Although in this example, the module for unlocking the screen is implemented in least partially in software that is executed by processor 112 (or another circuit that is integrated into the device 100) in other examples, the module for unlocking the screen may be implemented entirely in hardware (e.g., via logic that is programmed into an FPGA or another suitable type of circuit).

For example, the screen unlocking module can provide one of a touch pattern unlock screen, a password unlock screen, and a PIN unlock screen through the touch screen device 190. The touch pattern unlock screen shows a plurality of points. When the user touches and drags particular points, the screen is unlocked. The password unlock screen includes a keypad having a plurality of buttons, for example, digit buttons, letter buttons, and symbol buttons, and a window which hides the digit, the letter, or the symbol of the touched button of the keypad. When the user inputs a particular character string, for example, a series of characters such as digits, letters, or symbols through the keypad, the screen is unlocked.

The PIN unlock screen includes a keypad of digit buttons, and a window which hides the digit of the touched button of the keypad. When the user inputs a particular digit string through the keypad, the screen is unlocked.

The screen unlocking module using the touch pattern unlock screen according to aspects of the disclosure, may determine whether the input touch pattern is valid when a defined touch pattern belongs to the input touch pattern, unlocking the screen when the input touch pattern is valid, and holding the screen locked when the input touch pattern is invalid.

The screen unlocking module, according to aspects of the disclosure, may further hold the screen locked when the defined touch pattern does not belong to the input touch pattern.

The screen unlocking module, according to aspects of the disclosure, may determine that the input touch pattern is valid when an undefined touch pattern does not belong to the input touch pattern.

The screen unlocking module, according to aspects of the disclosure, may determine that the input touch pattern is valid when the undefined touch pattern belongs to the input touch pattern and precedes the defined touch pattern.

The screen unlocking, according to aspects of the disclosure, may determine that the input touch pattern is valid when the undefined touch pattern belongs to the input touch pattern and follows the defined touch pattern.

The screen unlocking module, according to aspects of the disclosure, may determine that the input touch pattern is valid when two undefined touch patterns belong to the input touch pattern and precede and follow the defined touch pattern respectively.

The screen unlocking module, according to aspects of the disclosure, may determine that the input touch pattern is valid when the undefined touch pattern belongs to the input touch pattern and connects an unspecified number of points.

The screen unlocking module, according to aspects of the disclosure, may determine that the input touch pattern is valid when the undefined touch pattern belongs to the input touch pattern and connects a specified number of points.

The screen unlocking module, according to aspects of the disclosure, may use the password unlock screen or the PIN unlock screen to: receive a character string that is input by a user, determine whether the input character string is valid when a defined character string belongs to the input character string, unlock the screen when the input character string is valid, and hold the screen locked when the input character string is invalid.

The screen unlocking, according to aspects of the disclosure, may hold the screen locked when the defined character string does not belong to the input character string.

The screen unlocking module, according to aspects of the disclosure, may determine that an input character string is valid when an undefined character string does not belong to the input character string.

The screen unlocking module, according to aspects of the disclosure, may determine that the input character string is valid when the undefined character string belongs to the input character string and precedes the defined character string.

The screen unlocking module, according to aspects of the disclosure, may determine that the input character string is valid when the undefined character string belongs to the input character string and follows the defined character string.

The screen unlocking module, according to aspects of the disclosure, may determine that the input character string is valid when two undefined character strings belong to the input character string and precede and follow the defined character string respectively.

The screen unlocking module, according to aspects of the disclosure, may determine that the input character string is valid when the undefined character string belongs to the input character string and connects an unspecified number of characters.

The screen unlocking module, according to aspects of the disclosure, may determine that the input character string is valid when the undefined character string belongs to the input character string and connects a specified number of characters.

Figure 3A:
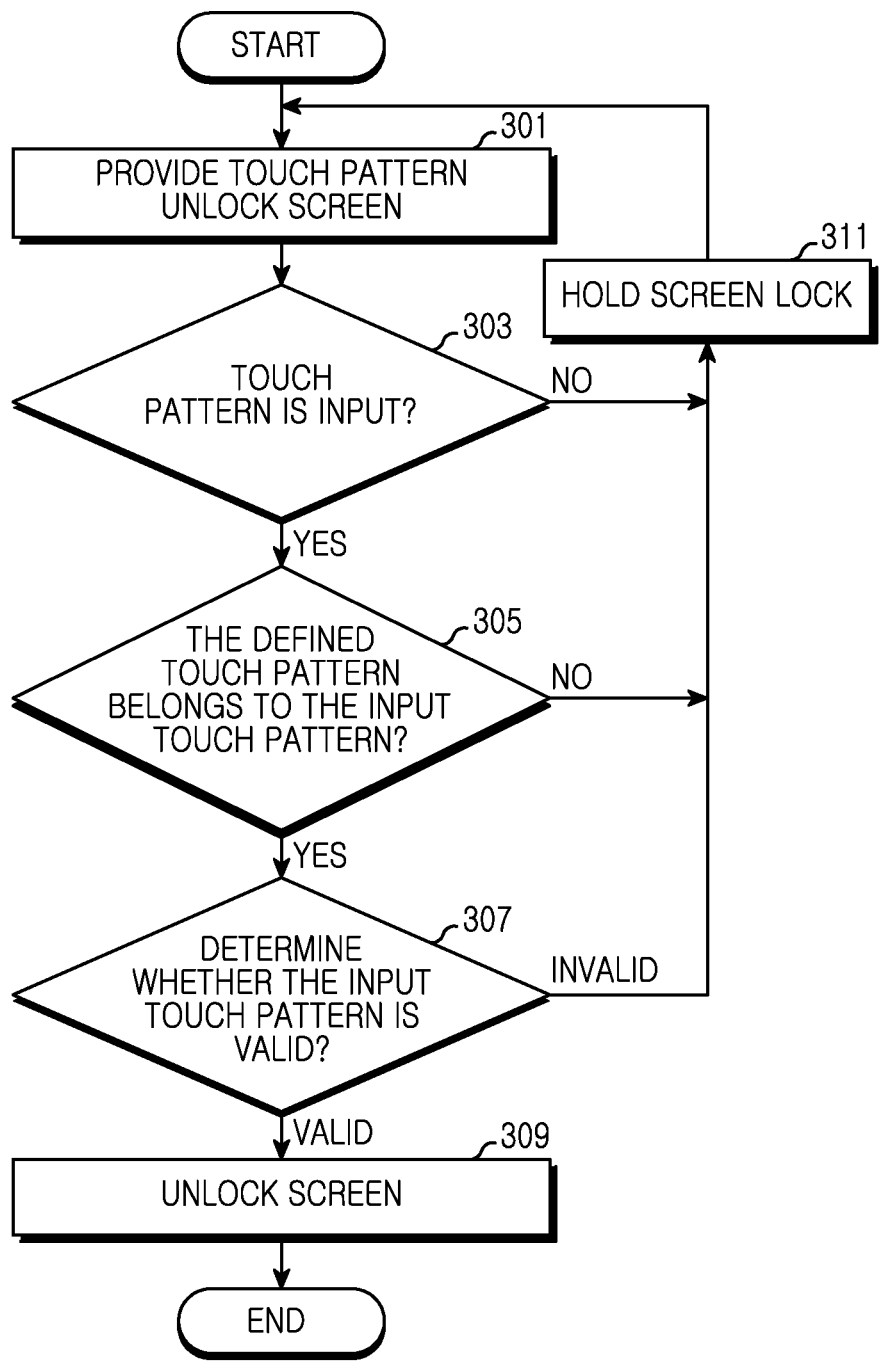
FIG. 3A is a flowchart of a screen unlocking method of an electronic device including a touch screen according to aspects of the disclosure.

FIG. 3A is a flowchart of a method for unlocking the screen of an electronic device according to aspects of the disclosure. In step 301, the processor 112 provides a touch pattern unlock screen. When the user inputs a touch pattern in step 303, the processor proceeds to step 305. By contrast, when the user does not input the touch pattern, the processor 112 holds the screen locked in step 311 and returns to step 301.

In step 305, the processor 112 determines whether a defined touch pattern belongs to the input touch pattern. The input touch pattern, in some implementations, may include an ordered set of points from a touch pattern unlock screen that have been touched by a user of the device 100, such that the points in the set are ordered according to the order in which they were touched by the user. Furthermore, in some implementations, the defined touch pattern may include a predetermined sequence of points. More specifically, in some implementations, the defined touch pattern may include a specific ordered set of points. For example, a defined touch pattern may include the ordered set of points: {"Point 1", "Point 5", and "Point 2"}, wherein "Point 1," "Point 2", and "Point 5" are unique identifiers of points in the touch pattern unlock screen.

In some implementations, the determination of whether the defined touch pattern belongs to input may be made based on a rule, such that the defined pattern is considered to belong to the input touch pattern only if the rule is satisfied. In some implementations, the rule may be satisfied only of the ordered set of points that have been touched by the user (e.g., the input pattern) includes a subset (e.g., a proper subset) that matches the ordered set of points that is (or is part of) the defined touch pattern. In some implementations, a match may be said to exist if the subset is the same as the ordered set. For example, an input touch pattern may be considered to include a defined touch pattern if it includes the points "Point 1", "Point 5", "and Point 2", in that order.

When it is determined that the defined touch pattern belongs to the input touch pattern, the processor 112 determines whether the input touch pattern is valid in step 307. Step 307 is discussed further below. By contrast, when the defined touch pattern does not belong to the input touch pattern, the processor 112 holds the screen locked in step 311 and returns to step 301.

When the input touch pattern is valid, the processor 112 unlocks the screen in step 309.

When the input touch pattern is invalid, the processor 112 holds the screen locked in step 311 and returns to step 301.

FIGS. 3B through 3E depict a user interface screen for unlocking the screen of the electronic device 100 according to aspects of the disclosure.

The touch pattern unlock screen 3 includes nine points 31, the user can selectively touch and drag some of the points 31, after which the points and a line linking the points are highlighted.

Figure 3B:
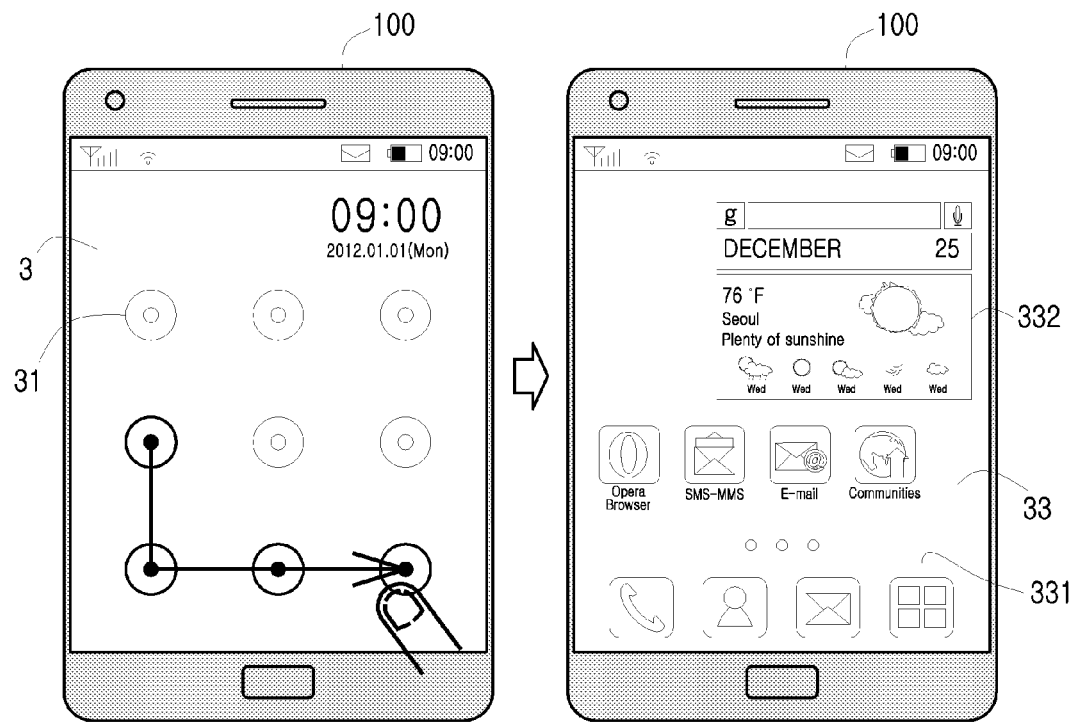
FIGS. 3B, 3C, 3D and 3E are diagrams of a user interface screen for unlocking the screen of the electronic device including the touch screen according to aspects of the disclosure.

Referring to FIG. 3B, the electronic device 100 provides the touch pattern unlock screen 3. When a defined touch pattern is input, the electronic device 100 unlocks the screen and provides the unlocked screen 33. The defined touch pattern connects the fixed points in a fixed order, which can be set by the user. The unlocked screen 33 can provide shortcuts to an icon 331 and a widget 332. Additionally or alternatively, the unlocked screen 33 may be the screen of an application that is being executed by the electronic device 100.

Figure 3C:
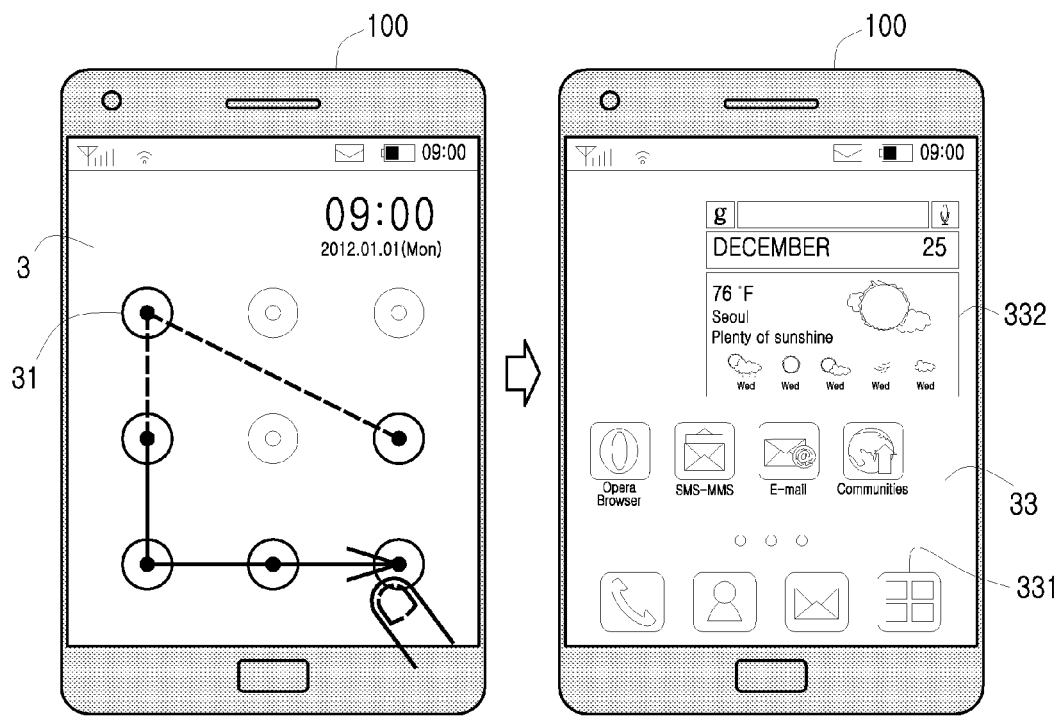

Referring to FIG. 3C, the electronic device 100 provides the touch pattern unlock screen 3. When an undefined touch pattern and a defined touch pattern following the undefined touch pattern are input, the electronic device 100 unlocks the screen and provides the unlocked screen 33. The undefined touch pattern connects two or more unspecified points using touch-and-drag. When the undefined touch pattern precedes the defined touch pattern and connects an unspecified number of unspecified points, the screen of device 100 may be unlocked. When the undefined touch pattern precedes the defined touch pattern and connects a specified number of unspecified points, the screen of device 100 may be unlocked.

Figure 3D:
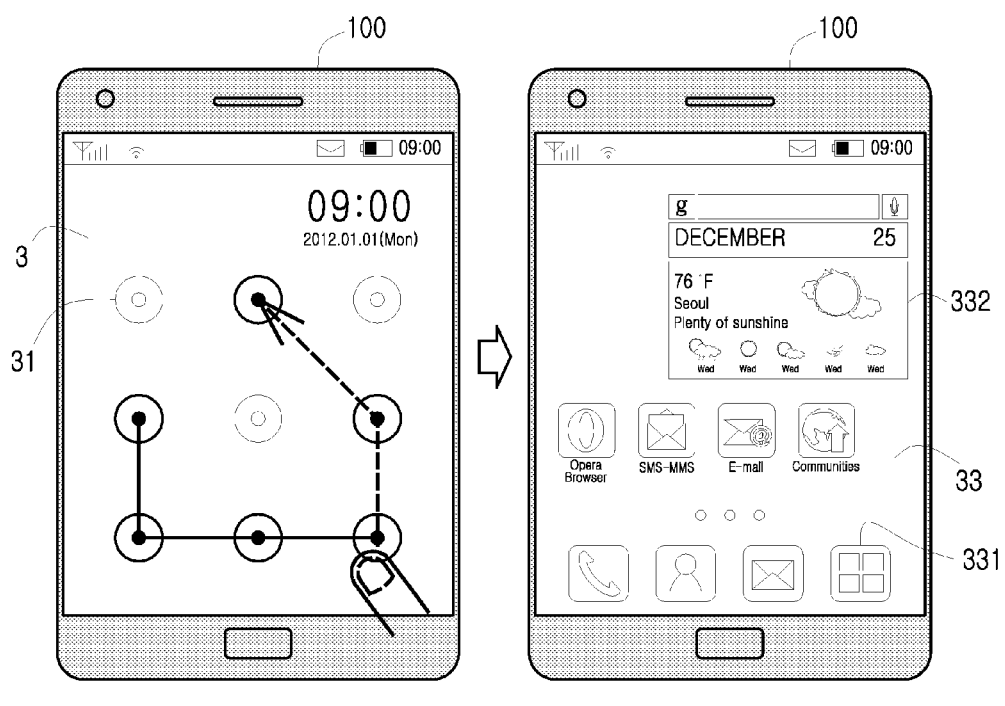

Referring to FIG. 3D, the electronic device 100 provides the touch pattern unlock screen 3. When a defined touch pattern and an undefined touch pattern following the defined touch pattern are input, the electronic device 100 unlocks the screen and provides the unlocked screen 33. The undefined touch pattern connects two or more unspecified points using the touch-and-drag. When the undefined touch pattern follows the defined touch pattern and connects an unspecified number of unspecified points, the screen of device 100 may be unlocked. When the undefined touch pattern follows the defined touch pattern and connects a specified number of unspecified points, the screen of device 100 may be unlocked.

Figure 3E:
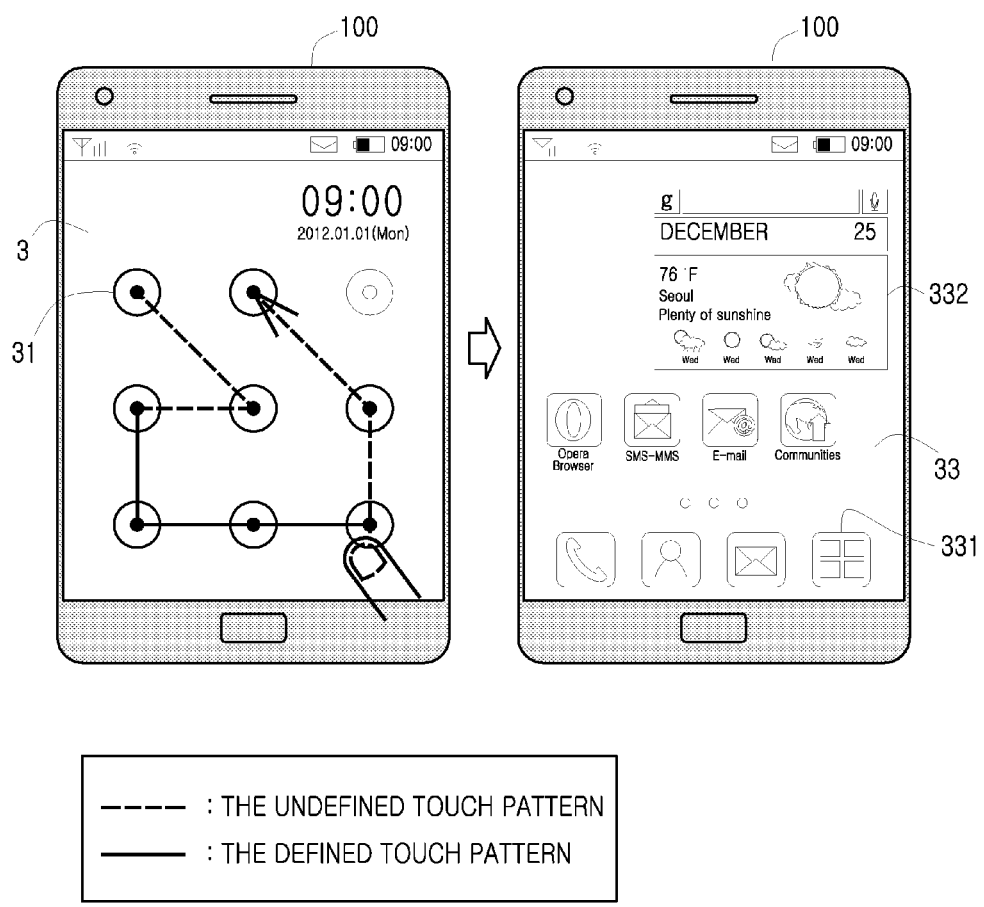

Referring to FIG. 3E, the electronic device 100 provides the touch pattern unlock screen 3. When an undefined touch pattern, a defined touch pattern following the undefined touch pattern, and an undefined touch pattern following the defined touch pattern are input, the electronic device 100 unlocks the screen and provides the unlocked screen 33. The undefined touch pattern connects two or more unspecified points using the touch-and-drag. When the first undefined touch pattern precedes the defined touch pattern and connects an unspecified number of unspecified points, the screen of device 100 may be unlocked. When the first undefined touch pattern precedes the defined touch pattern and connects a specified number of unspecified points, the screen of device 100 may be unlocked. When the second undefined touch pattern follows the defined touch pattern and connects an unspecified number of unspecified points, the screen of device 100 may be unlocked When the second undefined touch pattern follows the defined touch pattern and connects a specified number of unspecified points, the screen of device 100 may be unlocked.

Figure 4A:
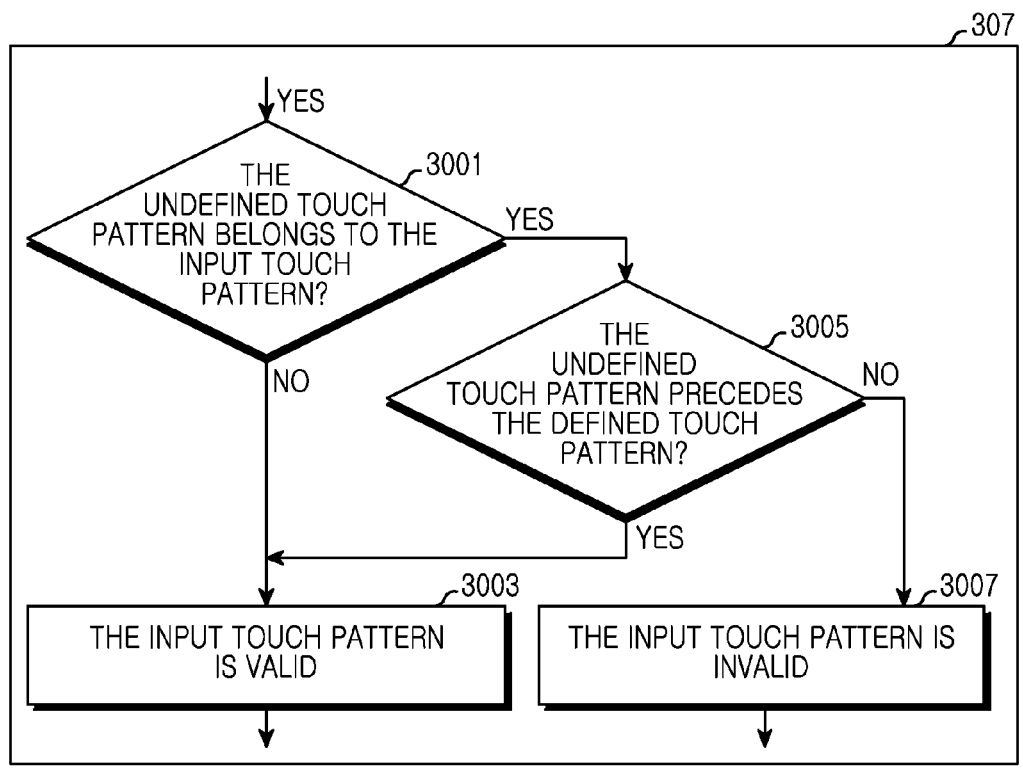
FIG. 4A is a flowchart of a method for determining whether an input touch pattern is valid according to aspects of the disclosure.

FIG. 4A is a flowchart of a method for performing step 307 of FIG. 3A according to aspects of the disclosure.

In the example of FIG. 4A, the screen of device 100 is unlocked when a touch pattern is input that includes a defined touch pattern and an undefined touch pattern which precedes the defined touch pattern and connects an unspecified number of unspecified points. In this example, the screen of device 100 may be unlocked when an undefined touch pattern precedes the defined touch pattern in the input touch sequence. In some implementations, this condition which can be set by the user.

In some implementations, the input touch pattern may be considered to include an undefined touch pattern, when a subset (e.g., proper subset) of the input touch pattern satisfies an undefined pattern rule. In some aspects, the undefined pattern rule may identify a plurality of sequences of touch points. For example, the rule may provide that the undefined touch pattern may be just any set of touch points. Additionally or alternatively, the undefined touch pattern rule may provide that the undefined touch pattern may include any set of N points. For example, an undefined pattern rule may provide that a valid touch sequence may include any set of three points preceding any defined pattern that is part of the input touch sequence. This rule may be satisfied when an input touch pattern is the concatenation of a set of three random points and a defined pattern. By contrast, the same rule may be violated when the input touch pattern is the concatenation of a set of two random points and the defined pattern.

More specifically, in the example of FIG. 4A, the processor 112 determines whether the undefined touch pattern belongs to the input touch pattern in step 3001. When the undefined touch pattern does not belong to the input touch pattern, that is, when the input touch pattern includes the defined touch pattern only, the processor 112 determines that the input touch pattern is valid in step 3003. By contrast, when the undefined touch pattern belongs to the input touch pattern, that is, when the input touch pattern is the combination of the undefined touch pattern and the defined touch pattern, the processor 112 goes to step 3005.

In step 3005, the processor 112 determines whether the undefined touch pattern precedes the defined touch pattern. When the undefined touch pattern precedes the defined touch pattern, the processor 112 determines that the input touch pattern is valid in step 3003. By contrast, when the undefined touch pattern does not precede the defined touch pattern, that is, when the undefined touch pattern follows the defined touch pattern, the processor 112 determines the input touch pattern is invalid in step 3007.

Figure 4B:
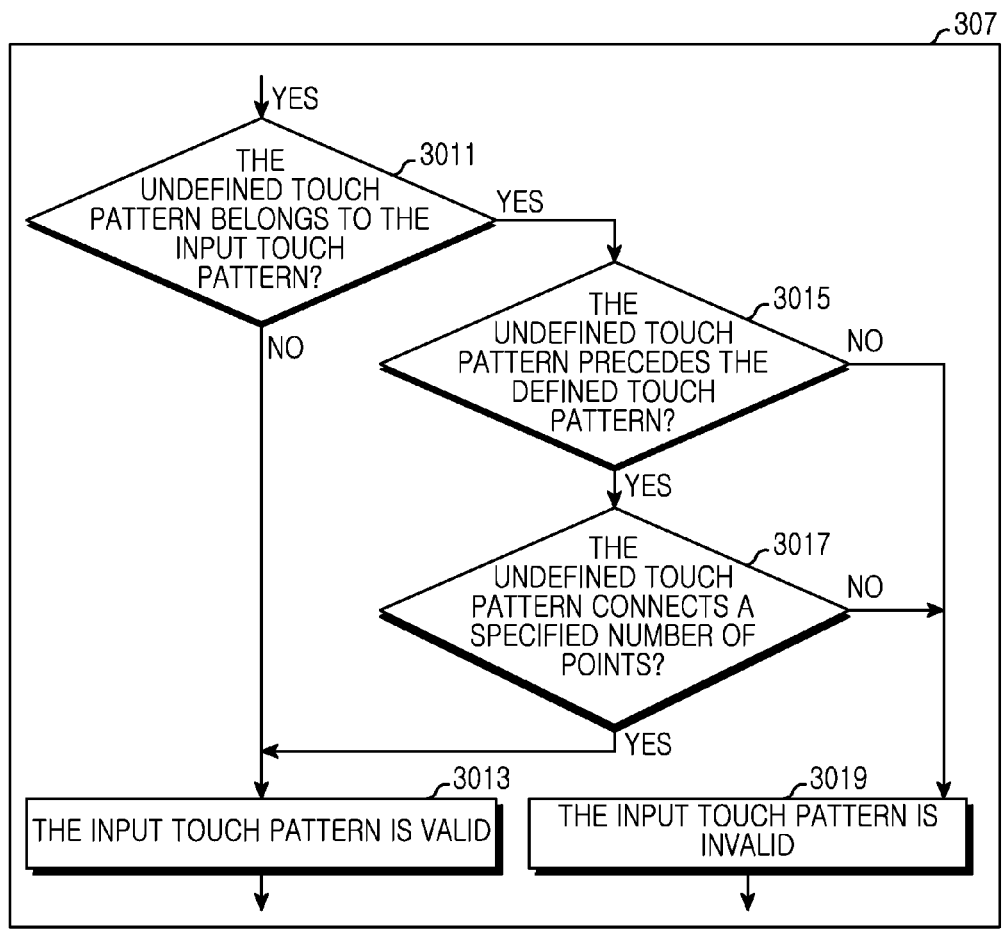
FIG. 4B is a flowchart of a method for determining whether the input touch pattern is valid according to aspects of the disclosure.

FIG. 4B is a flowchart of a method for performing step 307 of FIG. 3A according to aspects of the disclosure.

In FIG. 4B, the screen of device 100 is unlocked when a touch pattern is input that includes a defined touch pattern and an undefined touch pattern which precedes the defined touch pattern and connects a specified number of unspecified points. In this example, the input touch sequence is considered valid when the undefined touch pattern precedes the defined touch pattern and connects the specified number of points.

Referring to FIG. 4B, the processor 112 determines whether the undefined touch pattern belongs to the input touch pattern in step 3011. When the undefined touch pattern does not belong to the input touch pattern, that is, when the input touch pattern matches the defined touch pattern, the processor 112 determines that the input touch pattern is valid in step 3013. By contrast, when the undefined touch pattern belongs to the input touch pattern, that is, when the input touch pattern is the combination of the undefined touch pattern and the defined touch pattern, the processor 112 goes to step 3015.

In step 3015, the processor 112 determines whether the undefined touch pattern precedes the defined touch pattern. When the undefined touch pattern precedes the defined touch pattern, the processor 112 goes to step 3017. By contrast, when the undefined touch pattern does not precede the defined touch pattern, that is, when the undefined touch pattern follows the defined touch pattern, the processor 112 determines the input touch pattern is invalid in step 3019.

In step 3017, the processor 112 determines whether the undefined touch pattern connects the specified number of points. When the undefined touch pattern connects the specified number of points, the processor 112 determines the input touch pattern is valid in step 3013. By contrast, when the undefined touch pattern does not connect the specified number of points, the processor 112 determines the input touch pattern is invalid in step 3019.

FIGS. 4C through 4G depict a user interface screen for unlocking the screen of the electronic device 100 according to aspects of the disclosure. Particularly, in FIGS. 4C through 4G when an undefined touch pattern precedes a defined touch pattern in an input touch sequence and connects three points, it satisfies the condition for a screen unlock. The touch pattern unlock screen 4 includes nine points 41, the user can selectively connect some of the points 41 using a touch-and-drag, after which the connected points and a line linking the points may be highlighted.

Figure 4C:
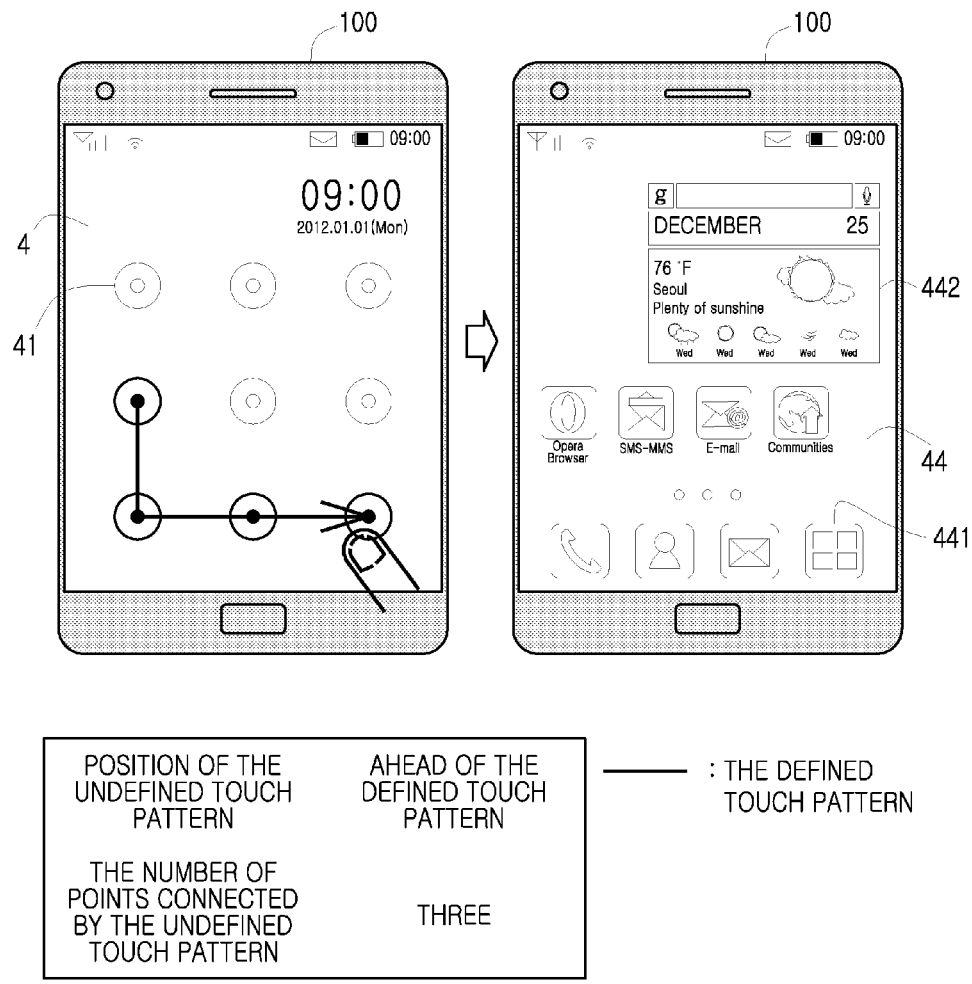
FIGS. 4C, 4D, 4E, 4F, and 4G are diagrams of a user interface screen for unlocking the screen of the electronic device according to aspects of the disclosure.

Referring to FIG. 4C, the electronic device 100 provides the touch pattern unlock screen 4. When the defined touch pattern is input, the electronic device 100 unlocks the screen and provides the unlocked screen 44. The defined touch pattern connects fixed points in a fixed order, which can be set by the user. The unlocked screen 44 can provide shortcuts to an icon 431 and a widget 432. Additionally or alternatively, the unlocked screen 44 can be the screen of an application that is being executed by the device 100.

Figure 4D:
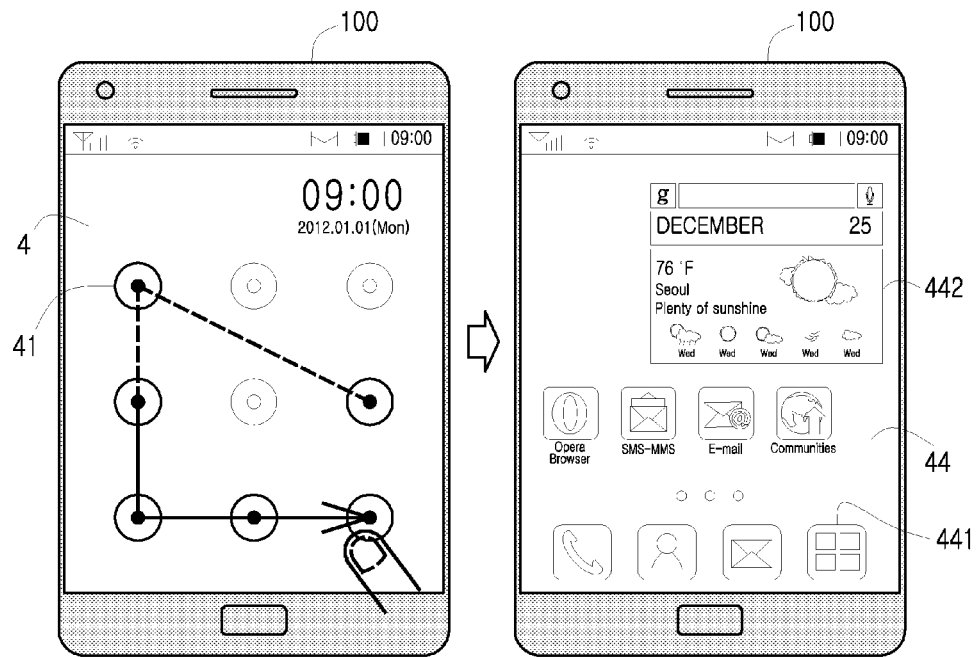

Referring to FIG. 4D, the electronic device 100 provides the touch pattern unlock screen 4. When an undefined touch pattern connecting three unspecified points and a defined touch pattern following the undefined touch pattern are input, the electronic device 100 unlocks the screen and provides the unlocked screen 44.

Figure 4E:
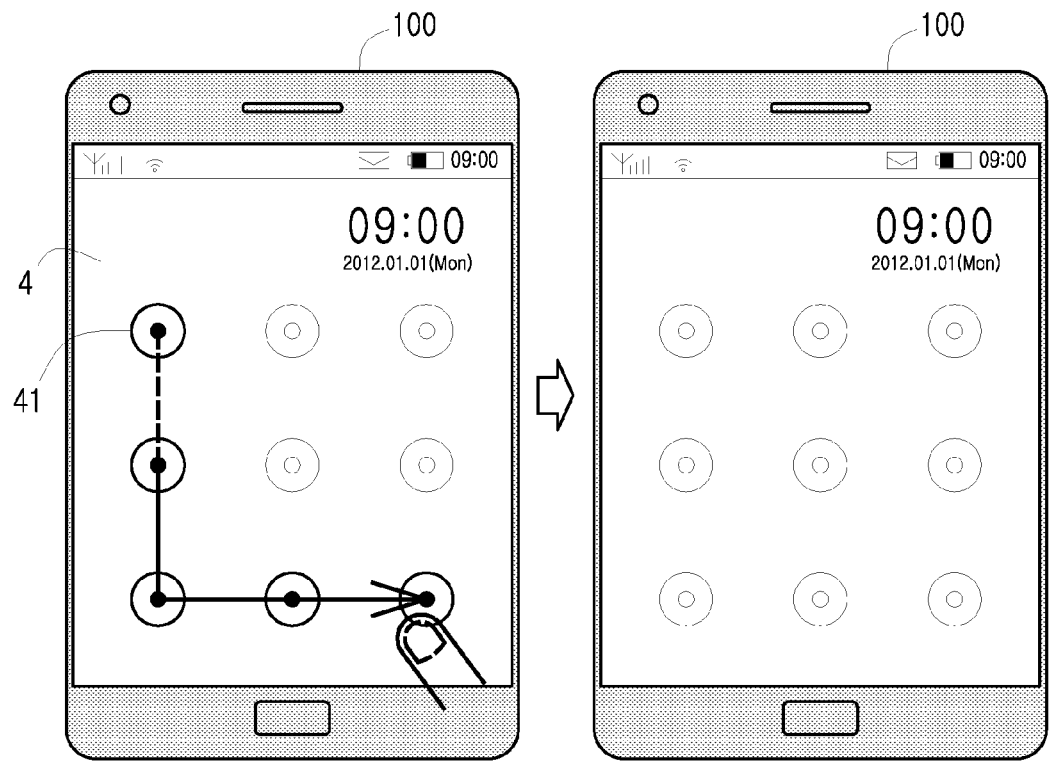

Referring to FIG. 4E, the electronic device 100 provides the touch pattern unlock screen 4. When an undefined touch pattern connecting two unspecified points and an undefined touch pattern following the defined touch pattern are input, the electronic device 100 holds the screen locked. In this example, the reason for keeping the screen locked is that the undefined touch pattern connects the two unspecified points, rather than three points.

Figure 4F:
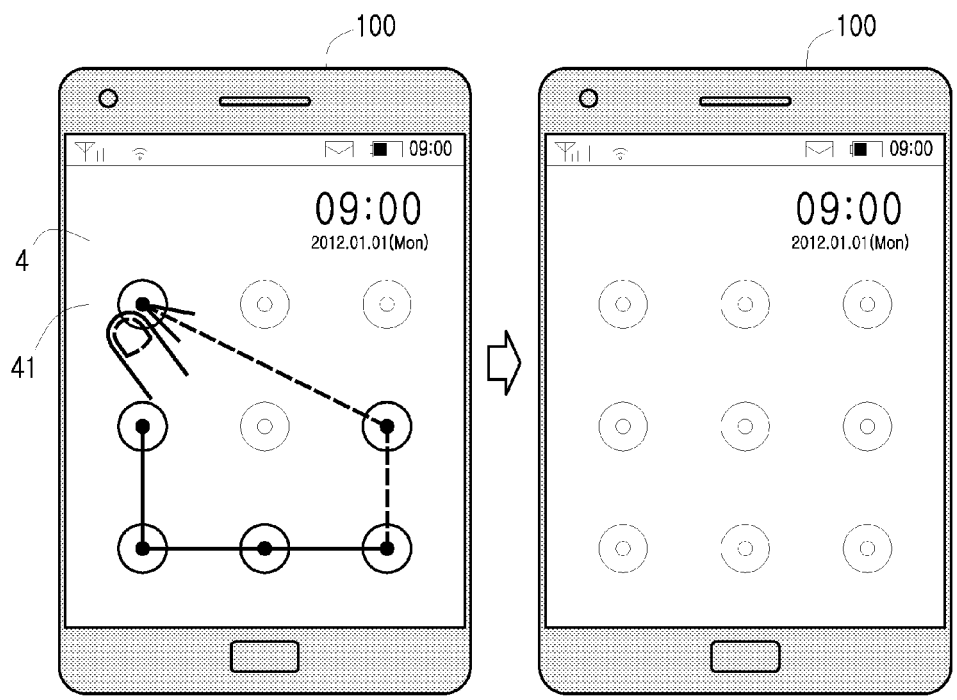

Referring to FIG. 4F, the electronic device 100 provides the touch pattern unlock screen 4. When a defined touch pattern and an undefined touch pattern following the defined touch pattern are input, the electronic device 100 holds the screen locked. In this example the reason for keeping the screen locked is that the undefined touch pattern follows the defined touch pattern, rather than preceding the defined touch pattern.

Figure 4G:
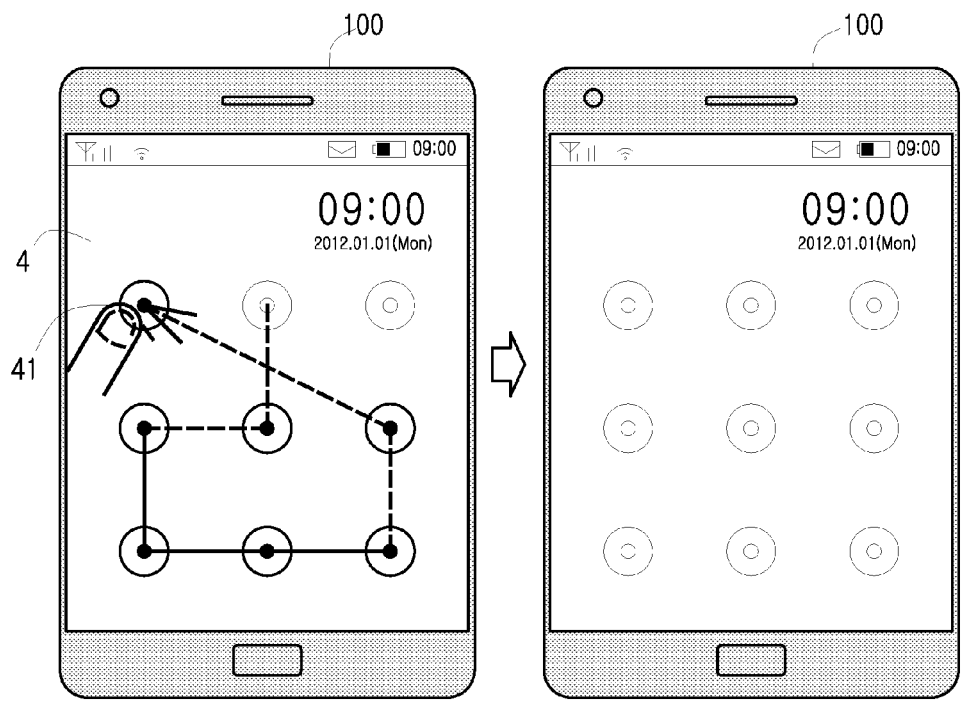

Referring to FIG. 4G, the electronic device 100 provides the touch pattern unlock screen 4. When an undefined touch pattern connecting three unspecified points, a defined touch pattern following the undefined touch pattern, and an undefined touch pattern following the defined touch pattern are input, the electronic device 100 holds the screen locked. In this example, the reason for keeping the screen locked is that the undefined touch pattern follows the defined touch pattern.

Figure 5A:
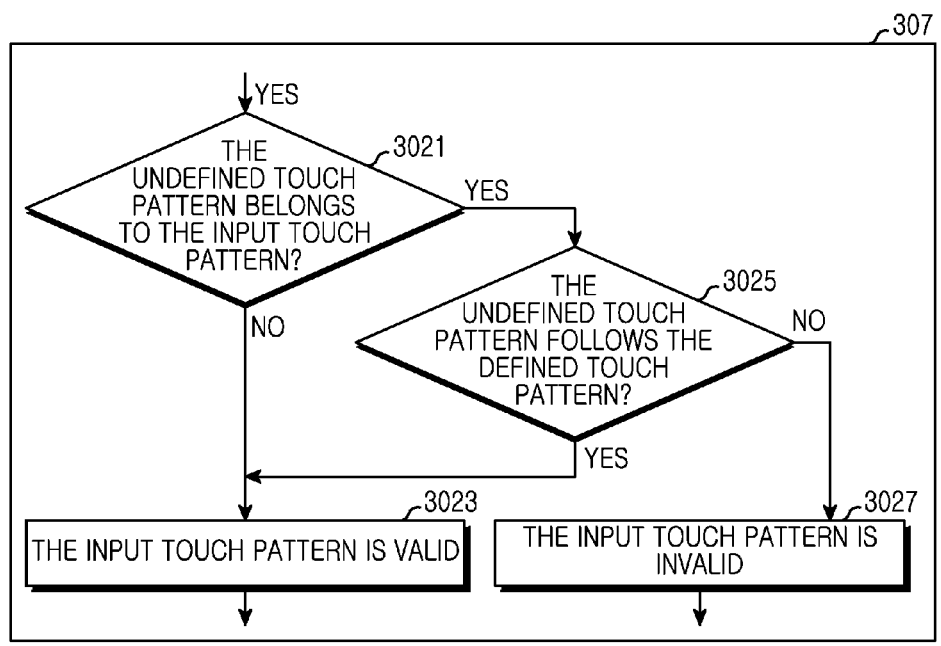
FIG. 5A is a flowchart of a method for determining whether an input touch pattern is valid according to aspects of the disclosure.

FIG. 5A is a flowchart of a method for performing step 307 of FIG. 3A according to aspects of the disclosure.

In FIG. 5A, the screen is unlocked when a touch pattern is input that includes a defined touch pattern and an undefined touch pattern which follows the defined touch pattern and connects an unspecified number of unspecified points. In this example, the undefined touch pattern must follow the defined touch pattern in order for the screen to be unlocked. In some implementations, this condition can be set by the user.

Referring to FIG. 5A, the processor 112 determines whether the undefined touch pattern belongs to the input touch pattern in step 3021. When the undefined touch pattern does not belong to the input touch pattern, that is, when the input touch pattern matches the defined touch pattern, the processor 112 determines that the input touch pattern is valid in step 3023. By contrast, when the undefined touch pattern belongs to the input touch pattern, that is, when the input touch pattern is the combination of the undefined touch pattern and the defined touch pattern, the processor 112 goes to step 3025.

In step 3025, the processor 112 determines whether the undefined touch pattern follows the defined touch pattern. When the undefined touch pattern follows the defined touch pattern, the processor 112 determines that the input touch pattern is valid in step 3023. By contrast, when the undefined touch pattern does not follow the defined touch pattern, that is, when the undefined touch pattern precedes the defined touch pattern, the processor 112 determines that the input touch pattern is invalid in step 3027.

Figure 5B:
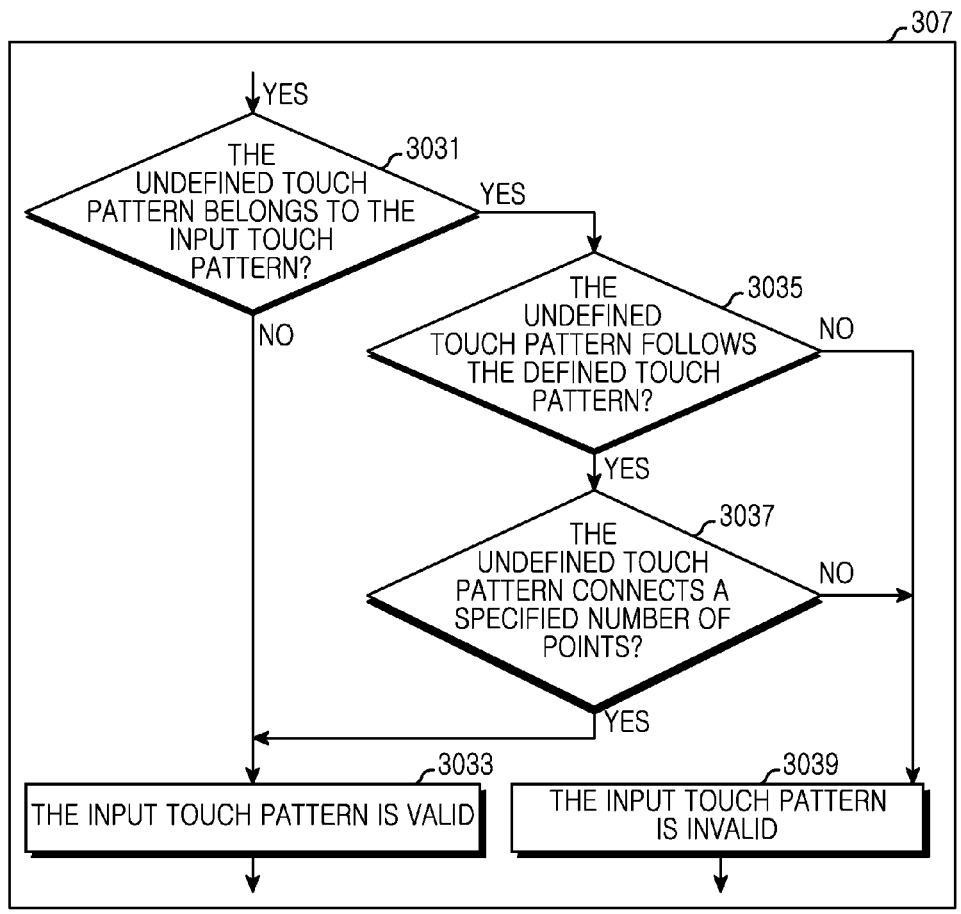
FIG. 5B is a flowchart of a method for determining whether an input touch pattern is valid according to aspects of the disclosure.

FIG. 5B is a flowchart of a method for performing step 307 of FIG. 3A according to aspects of the disclosure.

In the example of FIG. 5B, the screen of device 100 is unlocked when a touch pattern is input that includes a defined touch pattern and an undefined touch pattern which follows the defined touch pattern and connects a specified number of unspecified points. In this example, the undefined touch pattern must follow the defined touch pattern and connect the specified number of points in order for the screen to be unlocked. In some implementations, this condition can be set by the user.

Referring to FIG. 5B, the processor 112 determines whether an undefined touch pattern belongs to the input touch pattern in step 3031. When an undefined touch pattern does not belong to the input touch pattern, that is, when the input touch pattern matches the defined touch pattern, the processor 112 determines that the input touch pattern is valid in step 3033. By contrast, when an undefined touch pattern belongs to the input touch pattern, that is, when the input touch pattern is the combination of an undefined touch pattern and the defined touch pattern, the processor 112 goes to step 3035.

In step 3035, the processor 112 determines whether the undefined touch pattern follows the defined touch pattern. When the undefined touch pattern follows the defined touch pattern, the processor 112 goes to step 3037. By contrast, when the undefined touch pattern does not follow the defined touch pattern, that is, when the undefined touch pattern precedes the defined touch pattern, the processor 112 determines the input touch pattern is invalid in step 3039.

In step 3037, the processor 112 determines whether the undefined touch pattern connects a specified number of points (e.g., three points). When the undefined touch pattern connects the specified number of points, the processor 112 determines that the input touch pattern is valid in step 3033. By contrast, when the undefined touch pattern does not connect the specified number of points, the processor 112 determines that the input touch pattern is invalid in step 3039.

FIGS. 5C through 5G depict a user interface screen for unlocking the screen of the electronic device including the touch screen of FIG. 5B according to aspects of the disclosure. Particularly, in FIGS. 5C through 5G, when an undefined touch pattern follows a defined touch pattern and connects two points, it satisfies a condition for unlocking the screen of device 100. The touch pattern unlock screen 5 includes nine points 51, the user can selectively connect some of the points 51 using the touch-and-drag, after which the connected points and the line linking the points are highlighted.

Figure 5C:
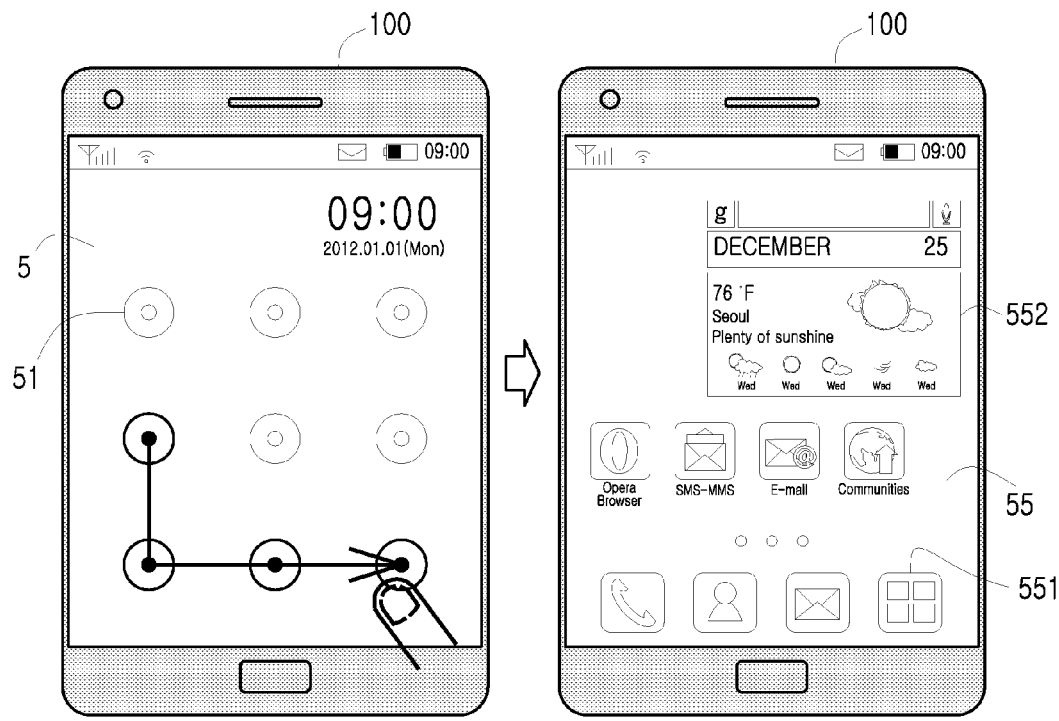
FIGS. 5C, 5D, 5E, 5F, and 5G are diagrams of a user interface screen for unlocking the screen of an electronic device according to aspects of the disclosure.

Referring to FIG. 5C, the electronic device 100 provides the touch pattern unlock screen 5. When the defined touch pattern is input, the electronic device 100 unlocks the screen and provides the unlocked screen 55. The defined touch pattern can be set by the user. The unlocked screen 55 can provide shortcuts to an icon 531 and a widget 532. The unlocked screen 55 can be the screen of the corresponding application. The unlocked screen 55 is also applied to FIGS. 5D through 5G.

Figure 5D:
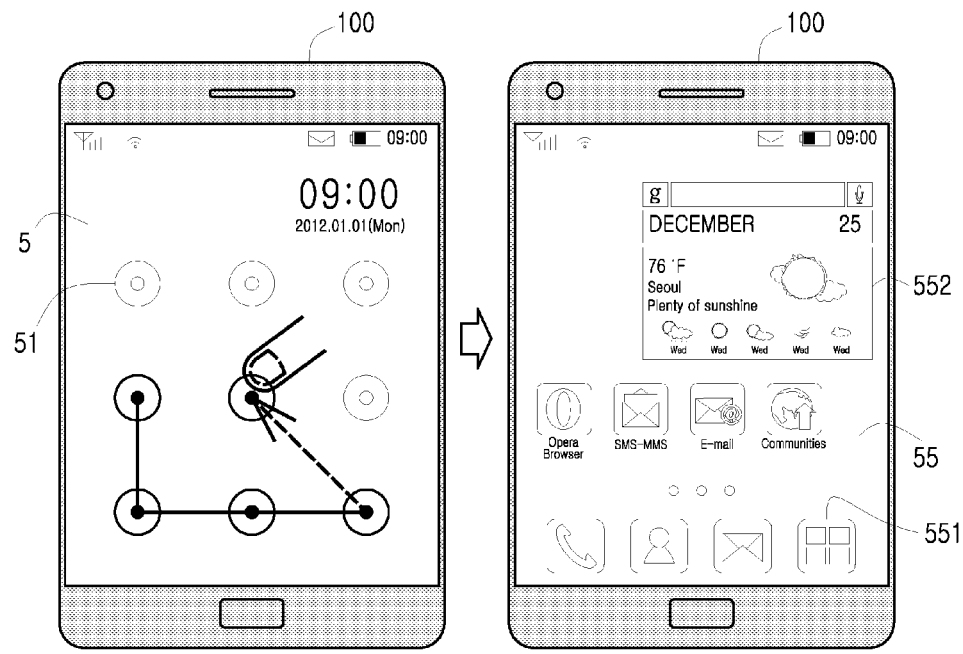

Referring to FIG. 5D, the electronic device 100 provides the touch pattern unlock screen 5. When a defined touch pattern and an undefined touch pattern following the defined touch pattern and connecting two points are input, the electronic device 100 unlocks the screen and provides the unlocked screen 55.

Figure 5E:
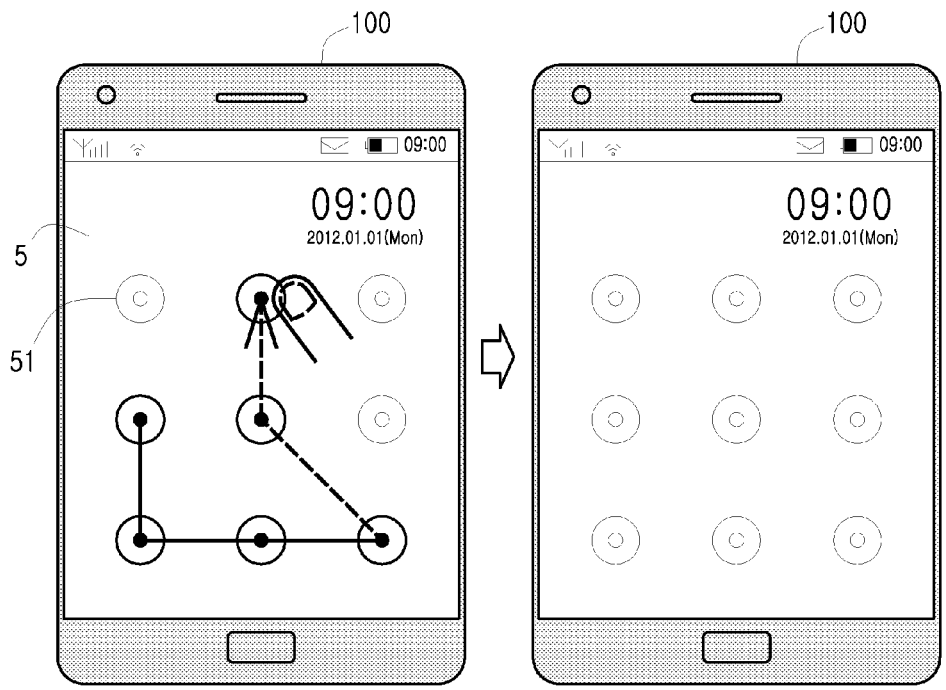

Referring to FIG. 5E, the electronic device 100 provides the touch pattern unlock screen 5. When a defined touch pattern and an undefined touch pattern following the defined touch pattern and connecting three points are input, the electronic device 100 holds the screen lock. In this example, the reason for keeping the screen locked is that the undefined touch pattern connects the three points, rather than two points.

Figure 5F:
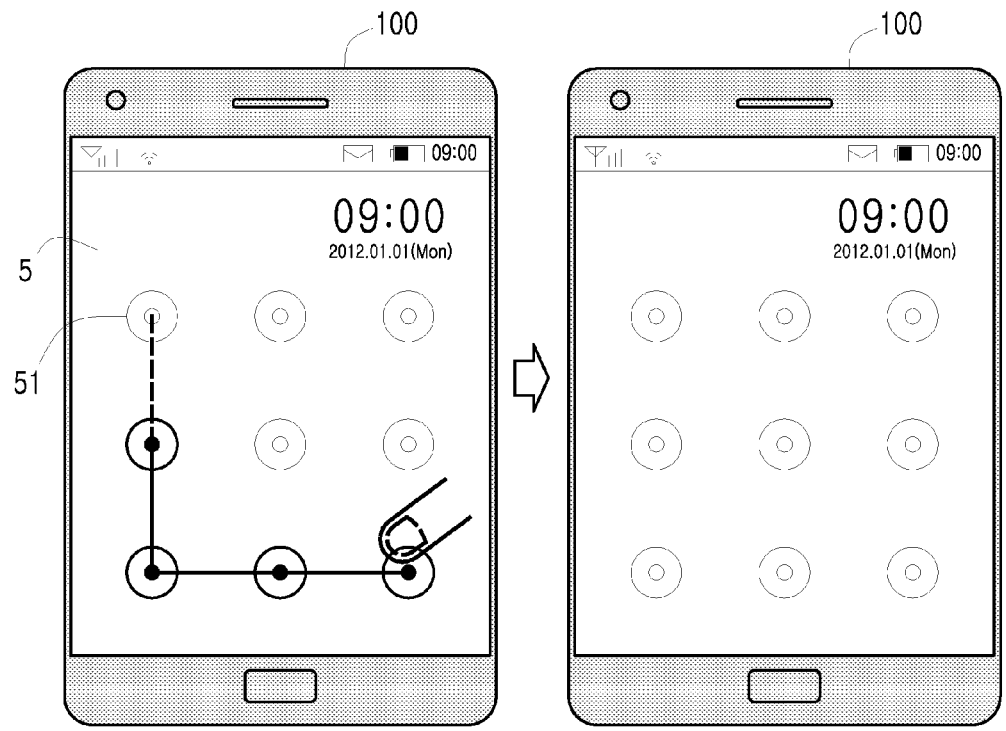

Referring to FIG. 5F, the electronic device 100 provides the touch pattern unlock screen 5. When an undefined touch pattern and a defined touch pattern following the undefined touch pattern are input, the electronic device 100 holds the screen locked. In this example, the reason for keeping the screen locked is that the undefined touch pattern precedes the defined touch pattern.

Figure 5G:
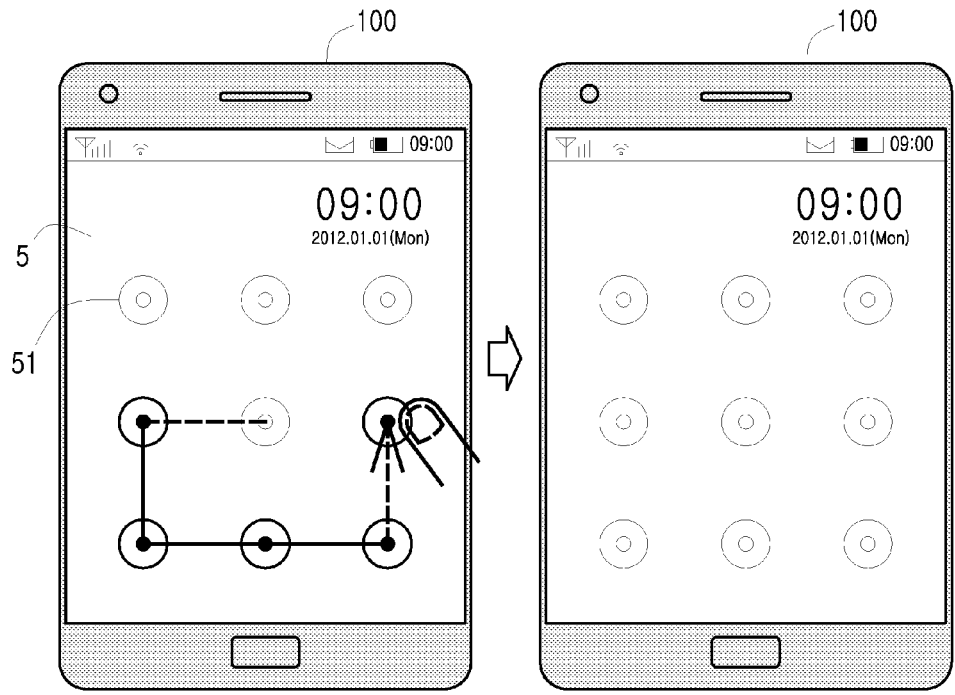

Referring to FIG. 5G, the electronic device 100 provides the touch pattern unlock screen 5. When an undefined touch pattern, a defined touch pattern following the undefined touch pattern, and an undefined touch pattern following the defined touch pattern and connecting two points are input, the electronic device 100 holds the screen locked. In this example, the reason for keeping the screen locked is that the undefined touch pattern precedes the defined touch pattern.

Figure 6A:
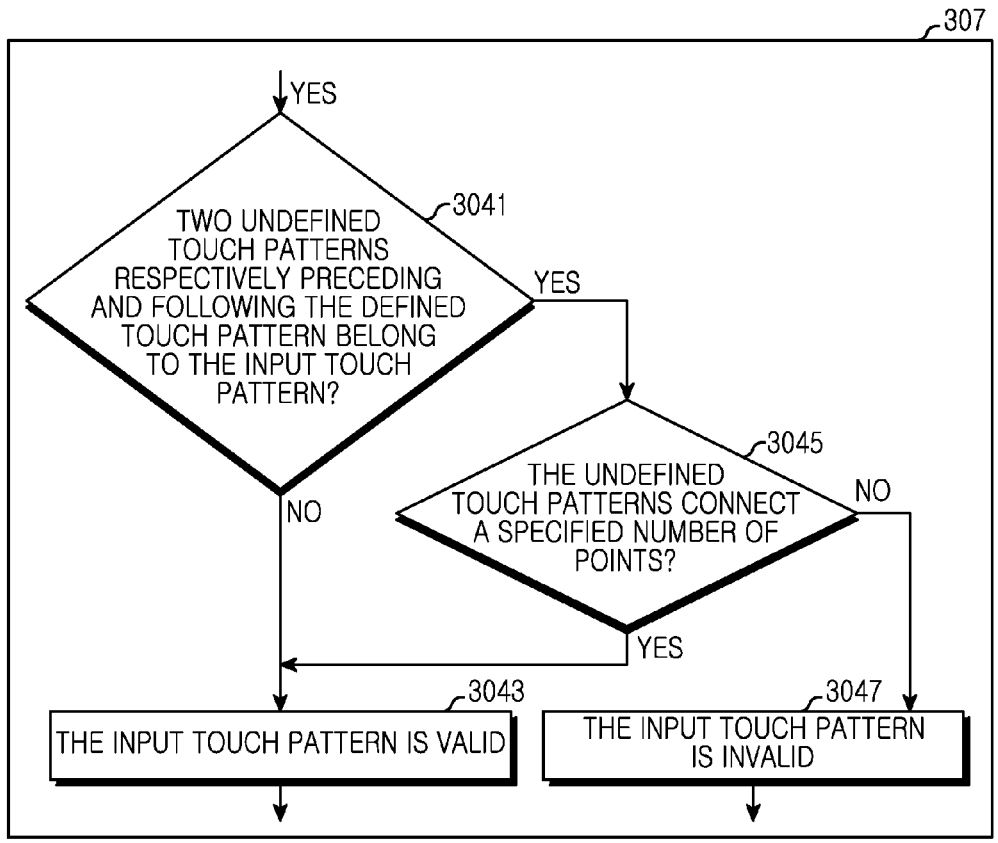
FIG. 6A is a flowchart of a method for determining whether an input touch pattern is valid according to aspects of the disclosure.

FIG. 6A is a flowchart of a method for performing step 307 of FIG. 3A according to aspects of the disclosure.

In FIG. 6A, the screen of device 100 is unlocked when a touch pattern is input that includes a defined touch pattern, a first undefined touch pattern preceding the defined touch pattern and connecting a specified number of unspecified points, and a second undefined touch pattern following the defined touch pattern and connecting a specified number of unspecified points is input. This condition can be set by the user.

Referring to FIG. 6A, the processor 112 determines whether the two undefined touch patterns preceding and following the defined touch pattern respectively belong to the input touch pattern in step 3041. When the input touch pattern does not include undefined touch patterns preceding and following the defined pattern, the processor 112 determines that the input touch pattern is valid in step 3043. By contrast, when the two undefined touch patterns preceding and following the defined touch pattern belong to the input touch pattern, the processor 112 goes to step 3045.

In step 3045, the processor 112 determines whether the undefined touch patterns connect their specified number of points. When the undefined touch patterns each connect the specified number of points, the processor 112 determines that the input touch pattern is valid in step 3043. By contrast, when the undefined touch patterns each do not connect the specified number of points, the processor 112 determines that the input touch pattern is invalid in step 3047.

FIGS. 6B through 6F depict a user interface screen for unlocking the screen of the electronic device 100 according to aspects of the disclosure. In thee example of FIGS. 6B through 6F, the condition for unlocking the screen is satisfied when a first undefined touch pattern precedes a defined touch pattern and connects two points and the second undefined touch pattern follows the defined touch pattern and connects three points. The touch pattern unlock screen 6 includes nine points 61, the user can selectively touch and connect some of the points 61, after which the connected points and the line linking the points are highlighted.

Figure 6B:
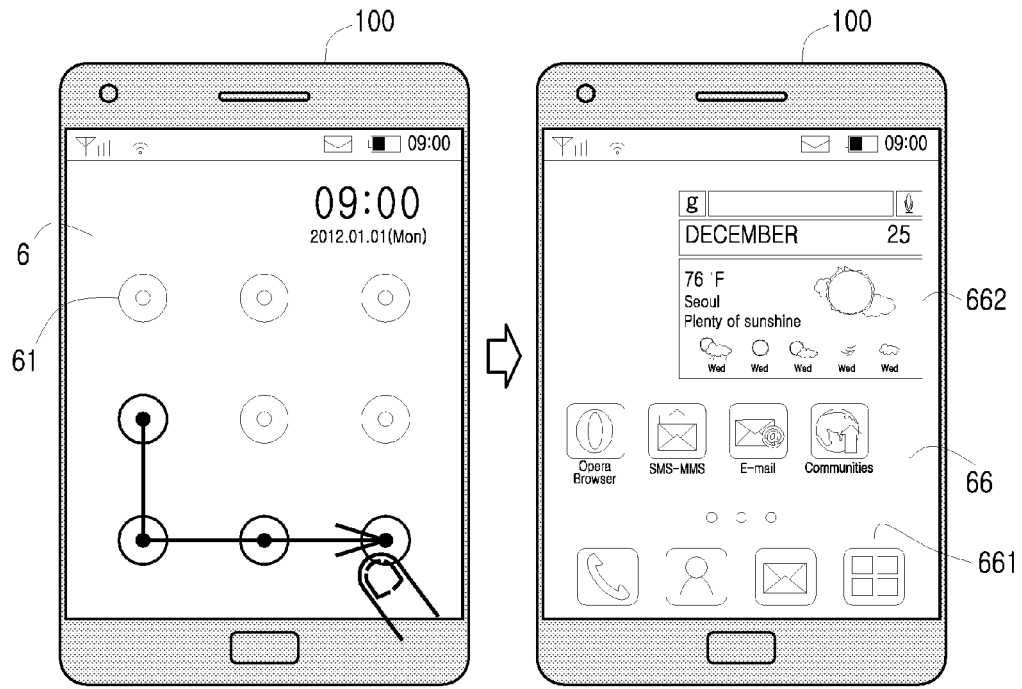
FIGS. 6B, 6C, 6D, 6E, and 6F are diagrams of a user interface screen for unlocking the screen of an electronic device according to aspects of the disclosure.
Figure 6C:
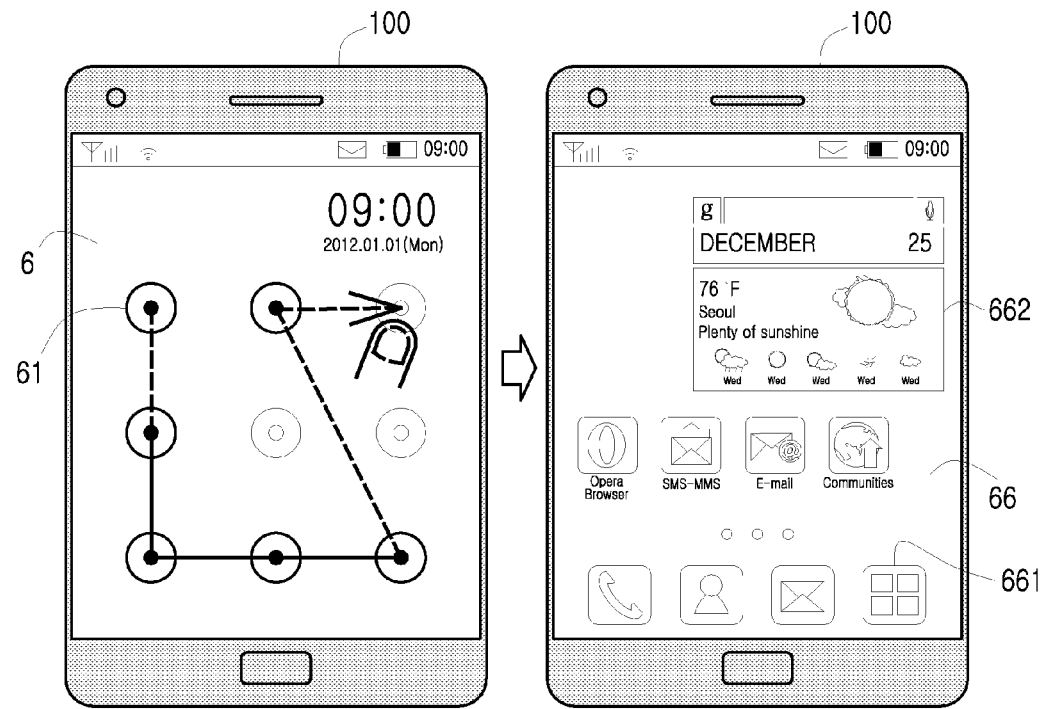

Referring to FIG. 6B, the electronic device 100 provides the touch pattern unlock screen 6. When a defined touch pattern is input, the electronic device 100 unlocks the screen and provides the unlocked screen 66. The unlocked screen 66 can provide shortcuts to an icon 661 and a widget 662. Additionally or alternatively, the unlocked screen 66 can be the screen of an application that is being executed by the device 100. Referring to FIG. 6C, the electronic device 100 provides the touch pattern unlock screen 6. When a first undefined touch pattern connecting two points, a defined touch pattern following the first undefined touch pattern, and an undefined touch pattern following the defined touch pattern and connecting three points are input, the electronic device 100 unlocks the screen and provides the unlocked screen 66.

Figure 6D:
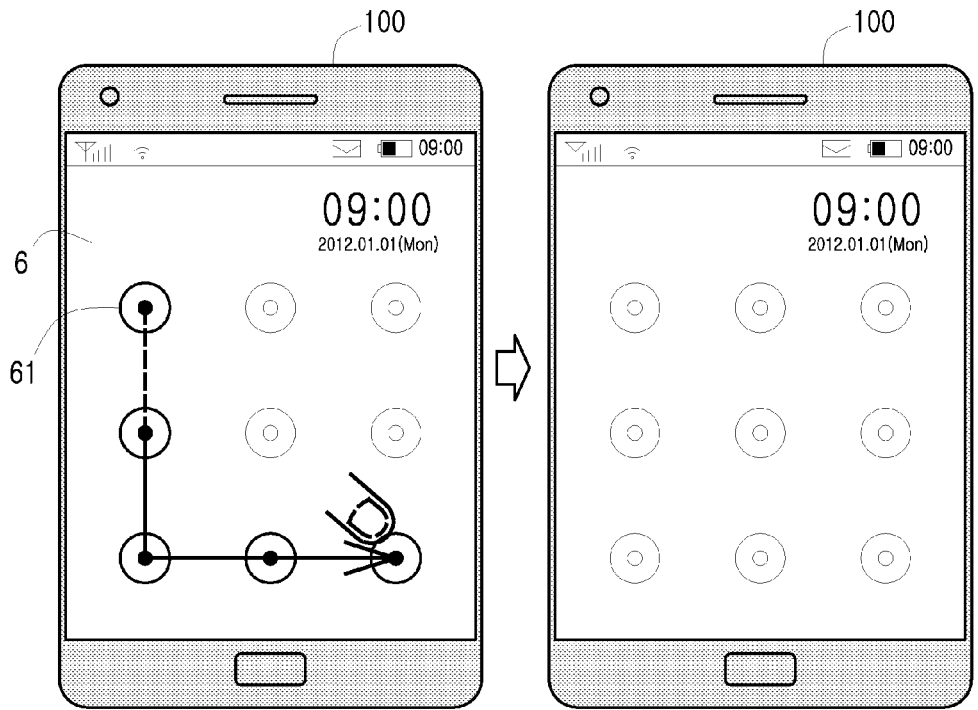

Referring to FIG. 6D, the electronic device 100 provides the touch pattern unlock screen 6. When an undefined touch pattern connecting two points and a defined touch pattern following the undefined touch pattern are input, the electronic device 100 holds the screen locked. In this example, the reason for keeping the screen locked is that there is no undefined touch pattern following the defined touch pattern and connecting three points.

Figure 6E:
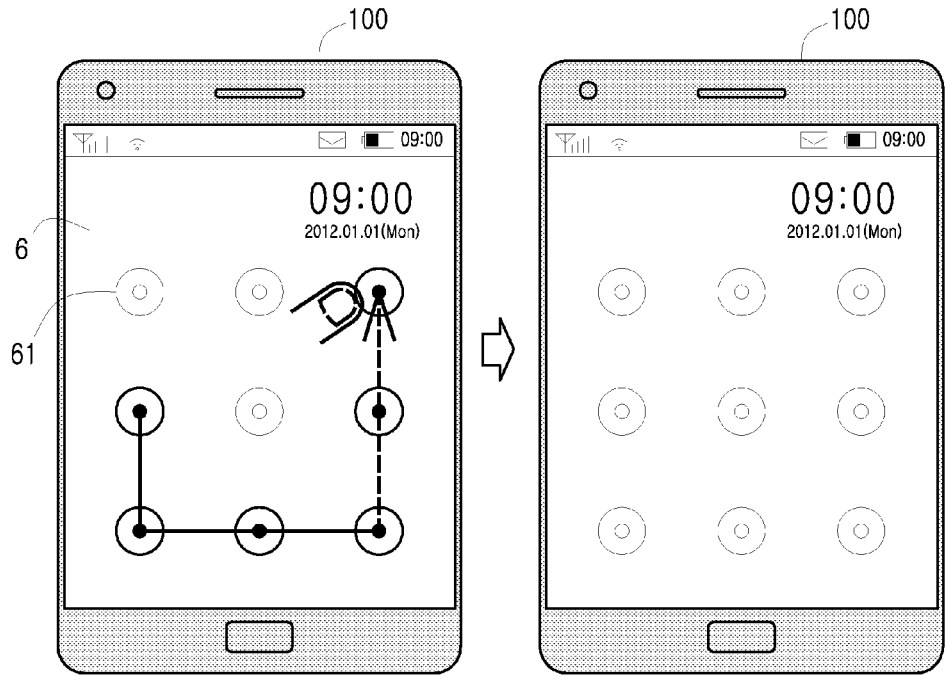

Referring to FIG. 6E, the electronic device 100 provides the touch pattern unlock screen 6. When a defined touch pattern and an undefined touch pattern following the defined touch pattern are input, the electronic device 100 holds the screen locked. In this example, the reason for keeping the screen locked is that there is no undefined touch pattern preceding the defined touch pattern and connecting two points.

Figure 6F:
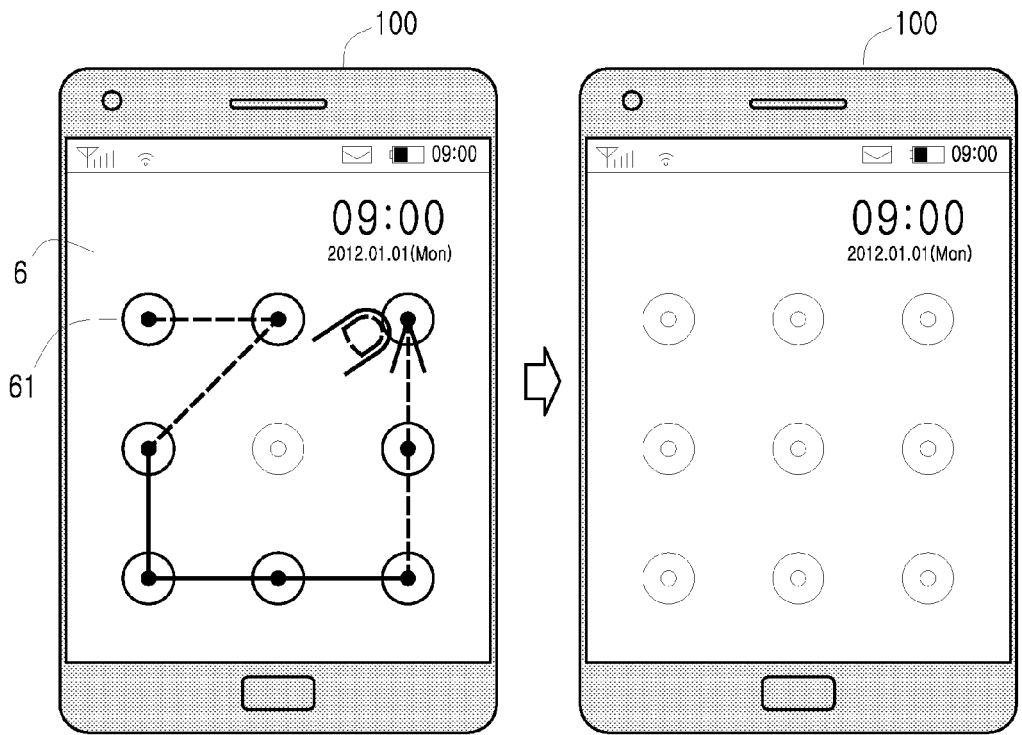

Referring to FIG. 6F, the electronic device 100 provides the touch pattern unlock screen 6. When a first undefined touch pattern connecting three points, a defined touch pattern following the first undefined touch pattern, and a second undefined touch pattern following the defined touch pattern and connecting two points are input, the electronic device 100 holds the screen locked. In this example, the reason for keeping the screen locked is that the undefined touch pattern preceding the defined touch pattern connects three points, rather than two points.

Figure 7A:
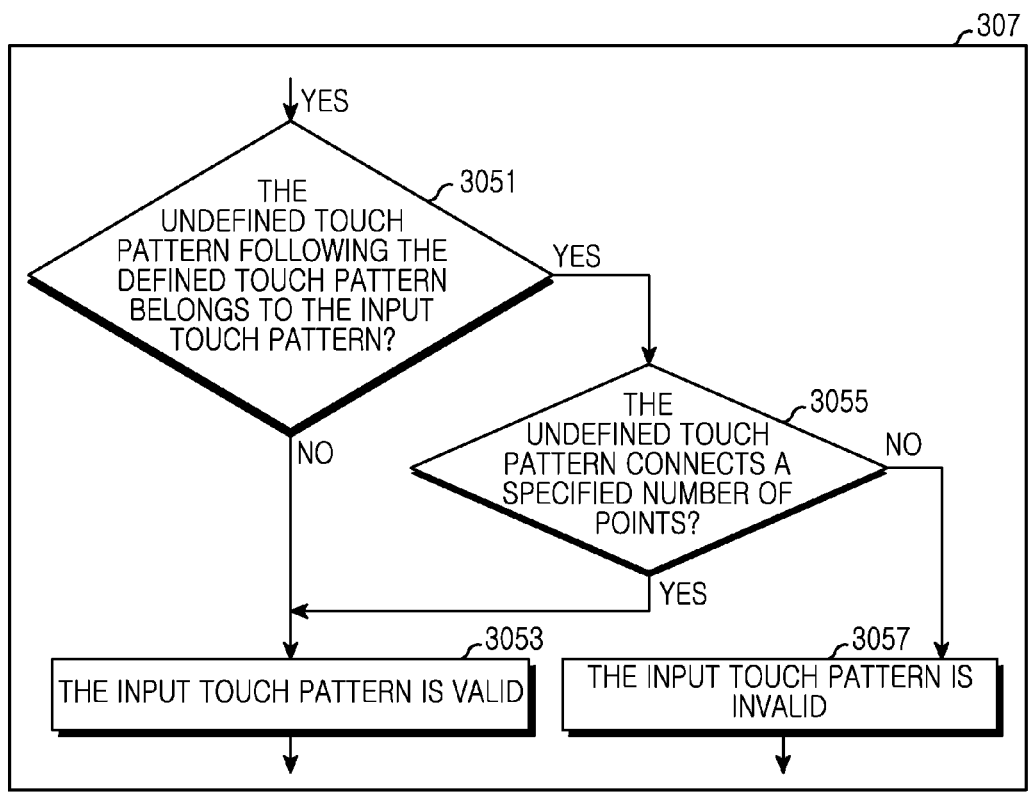
FIG. 7A is a flowchart of a method for determining whether an input touch pattern is valid according to aspects of the disclosure.

FIG. 7A is a flowchart of a method for performing step 307 of FIG. 3A according to aspects of the disclosure.

In FIG. 7A, the screen of device is unlocked when a touch pattern is input that includes a defined touch pattern and an undefined touch pattern following the defined touch pattern and connecting a specified number of unspecified points is input. In this example, the presence of an undefined touch pattern preceding the defined touch pattern is irrelevant with respect to the screen unlocking. In some implementations, the above condition can be set by the user.

Referring to FIG. 7A, the processor 112 determines whether an undefined touch pattern following the defined touch pattern belongs to the input touch pattern in step 3051. When the undefined touch pattern following the defined touch pattern does not belong to the input touch pattern, that is, when the input touch pattern matches the defined touch pattern or when the undefined touch pattern preceding the defined touch pattern belongs to the input touch pattern, the processor 112 determines that the input touch pattern is valid in step 3053. By contrast, when the undefined touch pattern belongs to the input touch pattern, the processor 112 goes to step 3055.

In step 3055, the processor 112 determines whether the undefined touch pattern connects a specified number of points. When the undefined touch pattern connects the specified number of points, the processor 112 determines that the input touch pattern is valid in step 3053. By contrast, when the undefined touch pattern does not connect the specified number of points, the processor 112 determines the input touch pattern is invalid in step 3057.

FIGS. 7B through 7E depict a user interface screen for unlocking the screen of the electronic device 100 according to aspects of the disclosure. In the example FIGS. 7B through 7E, the condition for unlocking the screen is satisfied when an undefined touch pattern follows a defined touch pattern and connects two points. The presence of an undefined touch pattern preceding the defined touch pattern is irrelevant to the screen unlock. The touch pattern unlock screen 7 includes nine points 71, the user can selectively touch and connect some of the points 71, after which the connected points and the line linking the points are highlighted.

Figure 7B:
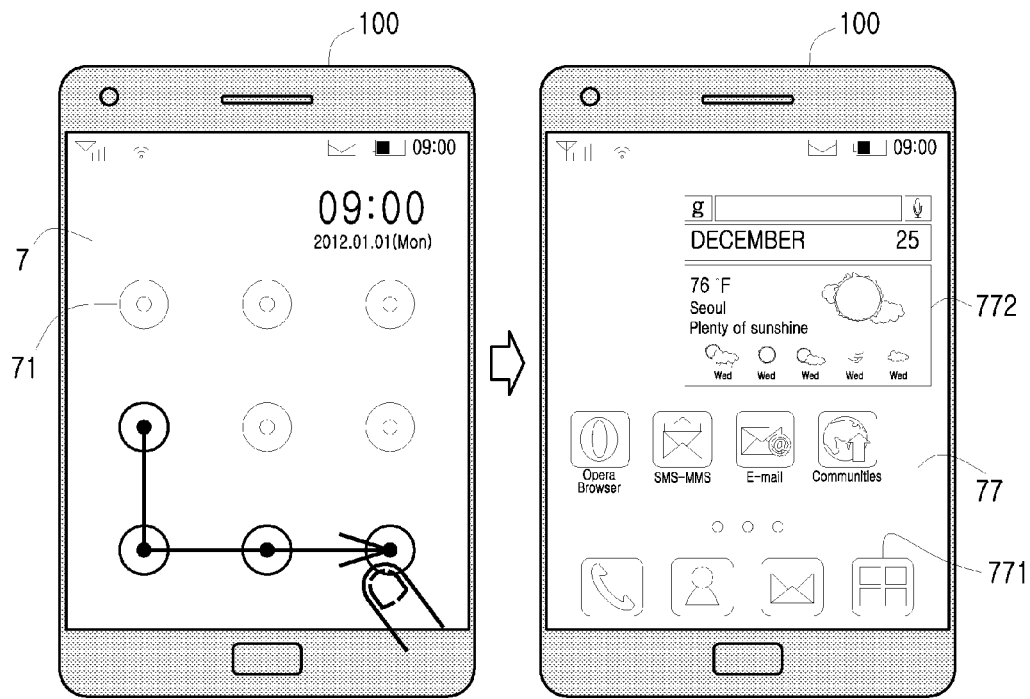
FIGS. 7B, 7C, 7D, and 7E are diagrams of a user interface screen for unlocking the screen of an electronic device according to aspects of the disclosure.

Referring to FIG. 7B, the electronic device 100 provides the touch pattern unlock screen 7. When a defined touch pattern is input, the electronic device 100 unlocks the screen and provides the unlocked screen 77. The unlocked screen 77 can provide shortcuts to an icon 771 and a widget 772. In some implementations, the unlocked screen 77 can be the screen of an application that is being executed by device 100.

Figure 7C:
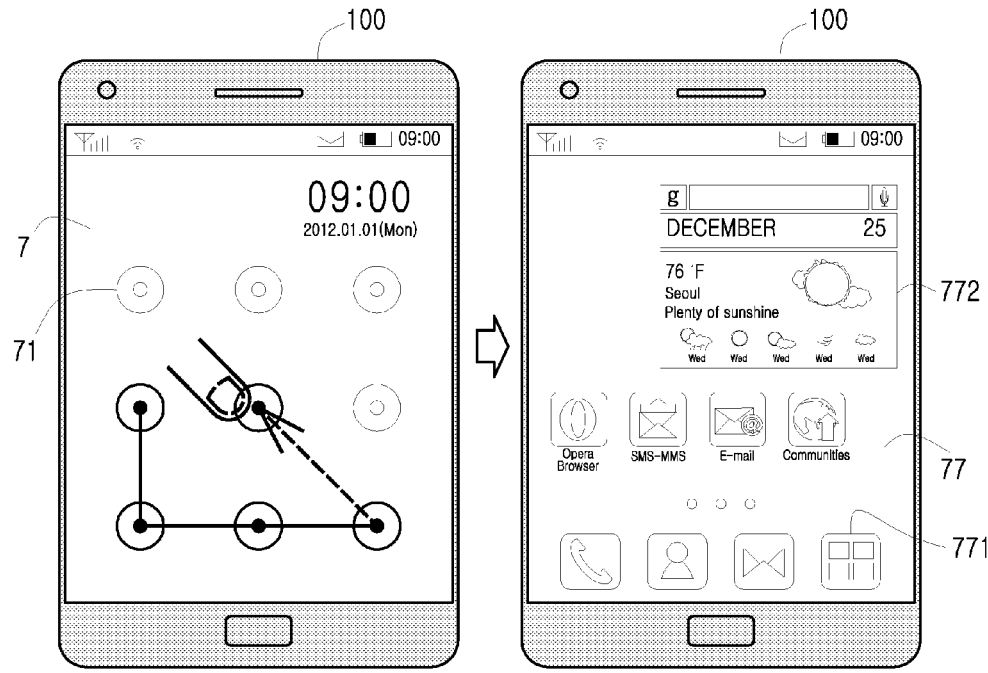

Referring to FIG. 7C, the electronic device 100 provides the touch pattern unlock screen 7. When a defined touch pattern and an undefined touch pattern following the defined touch pattern and connecting two points are input, the electronic device 100 unlocks the screen and provides the unlocked screen 77.

Figure 7D:
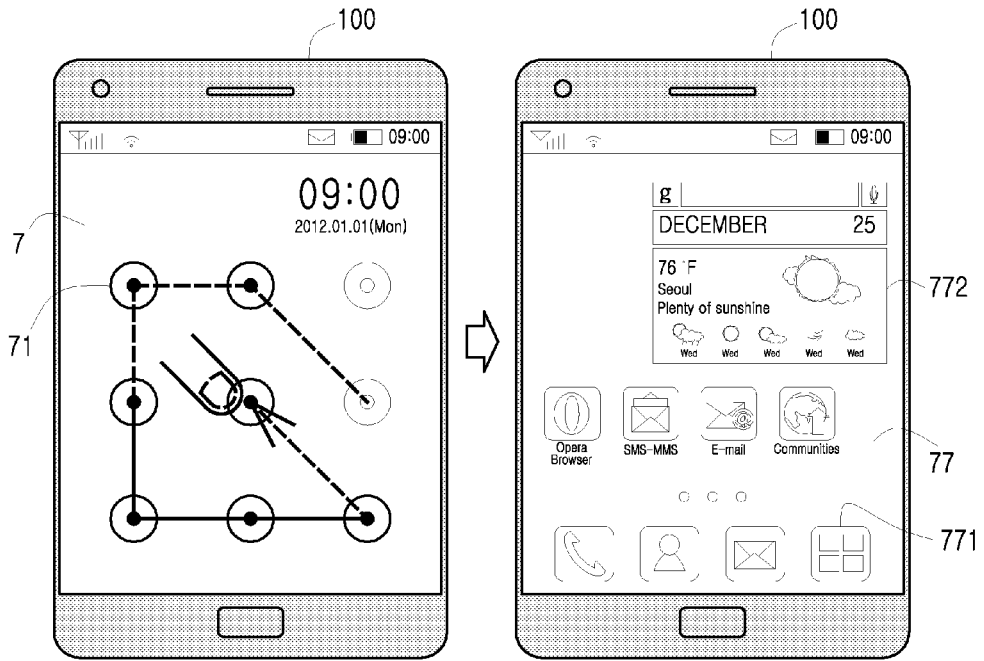

Referring to FIG. 7D, the electronic device 100 provides the touch pattern unlock screen 7. When a first undefined touch pattern connecting multiple points, a defined touch pattern following the first undefined touch pattern, and a second undefined touch pattern following the defined touch pattern and connecting two points are input, the electronic device 100 unlocks the screen and provides the unlocked screen 77.

Figure 7E:
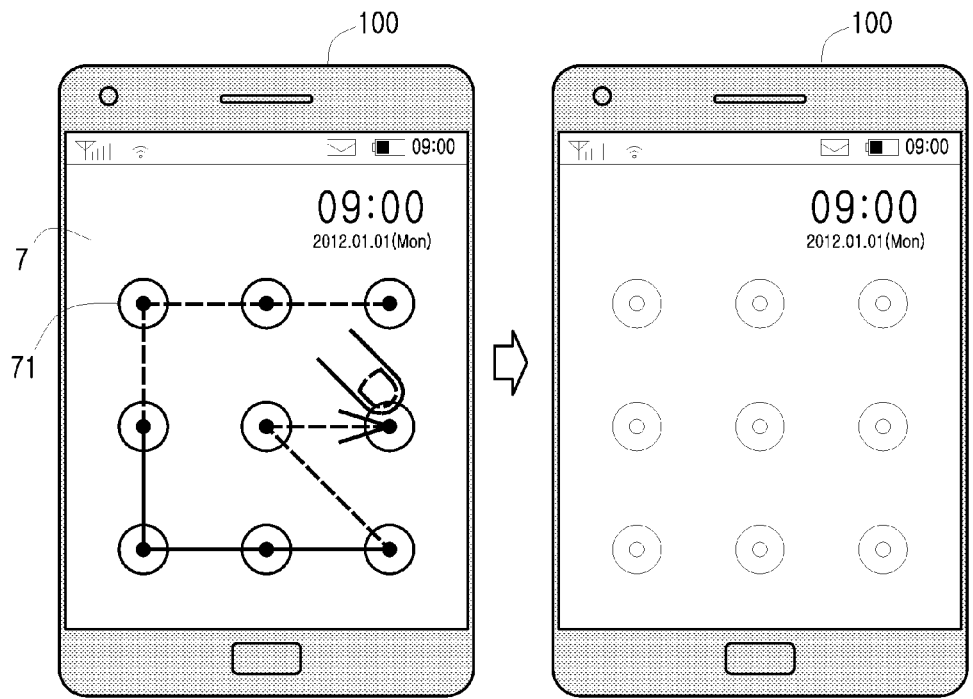

Referring to FIG. 7E, the electronic device 100 provides the touch pattern unlock screen 7. When a first undefined touch pattern connecting multiple points, a defined touch pattern following the first undefined touch pattern, and a second touch pattern following the defined touch pattern and connecting three points are input, the electronic device 100 holds the screen locked. In this example, the reason for keeping the screen locked is that the undefined touch pattern following the defined touch pattern connects the three points, rather than two points.

Figure 8A:
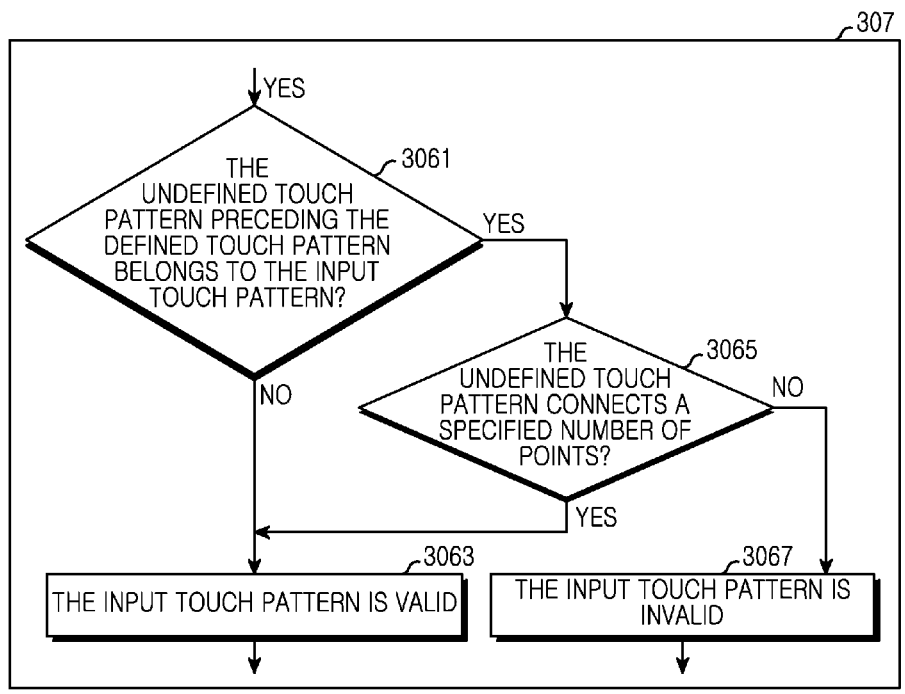
FIG. 8A is a flowchart of a method for determining whether an input touch pattern is valid according to aspects of the disclosure.

FIG. 8A is a flowchart of a method for performing step 307 of FIG. 3A according to aspects of the disclosure.

In example of FIG. 8A, the screen of electronic device 100 is unlocked when a touch pattern is input that includes a defined touch pattern and an undefined touch pattern preceding the defined touch pattern and connecting a specified number of unspecified points. The presence of an undefined touch pattern following the defined touch pattern and connecting an unspecified number of unspecified points is irrelevant with respect to the screen unlock. In some implementations, the above condition can be set by the user.

Referring to FIG. 8A, the processor 112 determines whether an undefined touch pattern preceding the defined touch pattern belongs to the input touch pattern in step 3061. When the undefined touch pattern does not belong to the input touch pattern, that is, when the input touch pattern matches the defined touch pattern or when the undefined touch pattern following the defined touch pattern belongs to the input touch pattern, the processor 112 determines the valid input touch pattern in step 3063. By contrast, when the undefined touch pattern preceding the defined touch pattern belongs to the input touch pattern, the processor 112 goes to step 3065.

In step 3065, the processor 112 determines whether the undefined touch pattern connects its specified number of points. When the undefined touch pattern connects the specified number of points, the processor 112 determines that the input touch pattern is valid in step 3063. By contrast, when the undefined touch pattern does not connect the specified number of points, the processor 112 determines that the input touch pattern is invalid in step 3067.

FIGS. 8B through 8E depict a user interface screen for unlocking the screen of the electronic device including the touch screen of FIG. 8A according to an exemplary embodiment of the present invention. In FIGS. 8B through 8E, the condition for unlocking the screen is satisfied when an undefined touch pattern precedes the defined touch pattern and connects three points. The undefined touch pattern following the defined touch pattern is irrelevant to the screen unlock. The touch pattern unlock screen 8 includes nine points 81, the user can selectively touch and connect some of the points 81, after which the connected points and the line linking the points are highlighted.

Figure 8B:
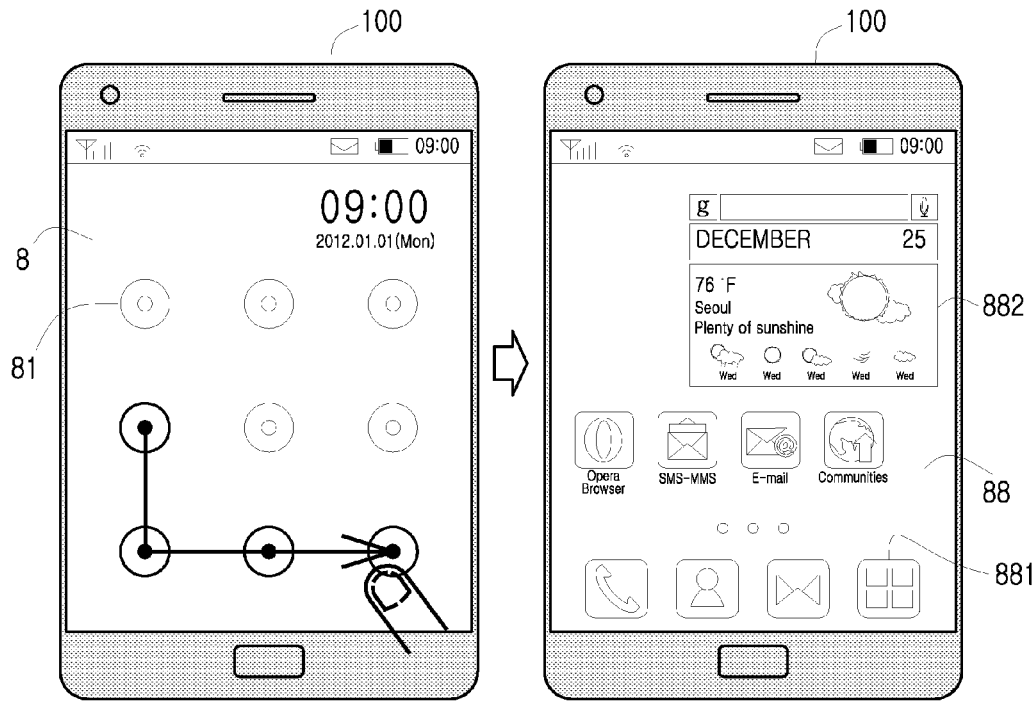
FIGS. 8B, 8C, 8D, and 8E are diagrams of a user interface screen for unlocking the screen of an electronic device according to aspects of the disclosure.

Referring to FIG. 8B, the electronic device 100 provides the touch pattern unlock screen 8. When a defined touch pattern is input, the electronic device 100 unlocks the screen and provides the unlocked screen 88. The unlocked screen 88 can provide shortcuts to an icon 881 and a widget 882. Additionally or alternatively, the unlocked screen 88 can be the screen of an application that is being executed by the device 100.

Figure 8C:
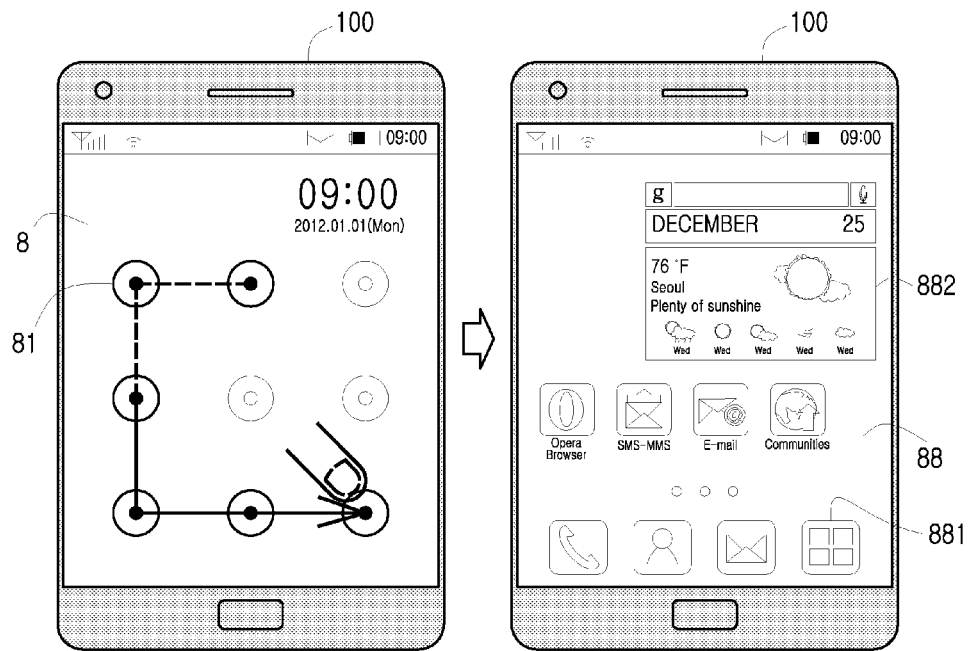

Referring to FIG. 8C, the electronic device 100 provides the touch pattern unlock screen 8. When an undefined touch pattern connecting three points and a defined touch pattern following the undefined touch pattern are input, the electronic device 100 unlocks the screen and provides the unlocked screen 88.

Figure 8D:
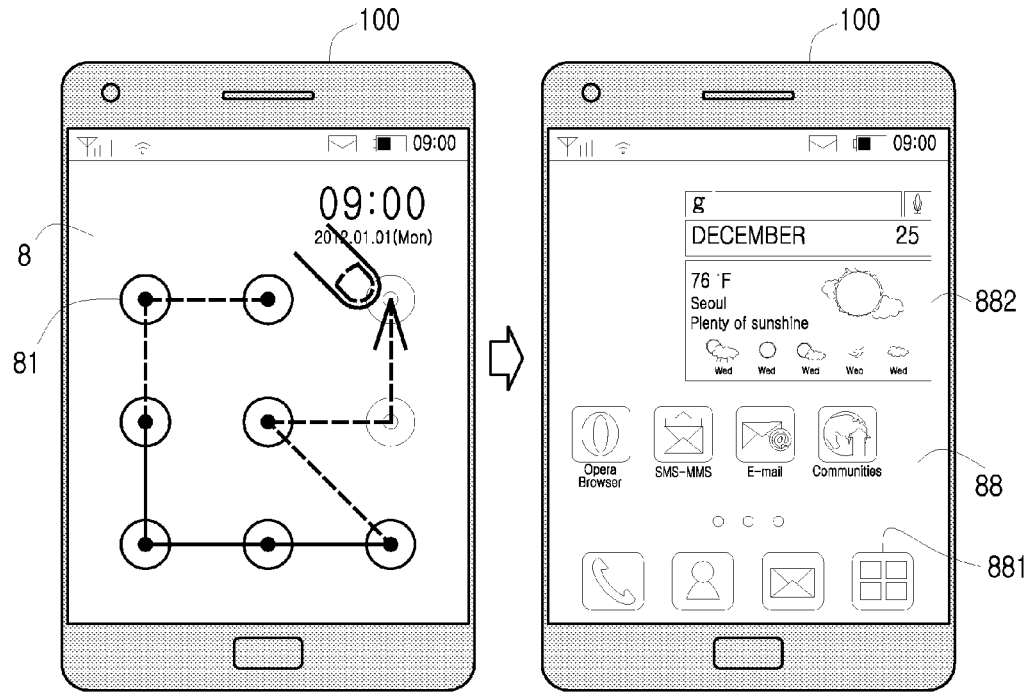

Referring to FIG. 8D, the electronic device 100 provides the touch pattern unlock screen 8. When a first undefined touch pattern connecting three points, a defined touch pattern following the first undefined touch pattern, and a second undefined touch pattern following the defined touch pattern and connecting multiple points are input, the electronic device 100 unlocks the screen and provides the unlocked screen 88.

Figure 8E:
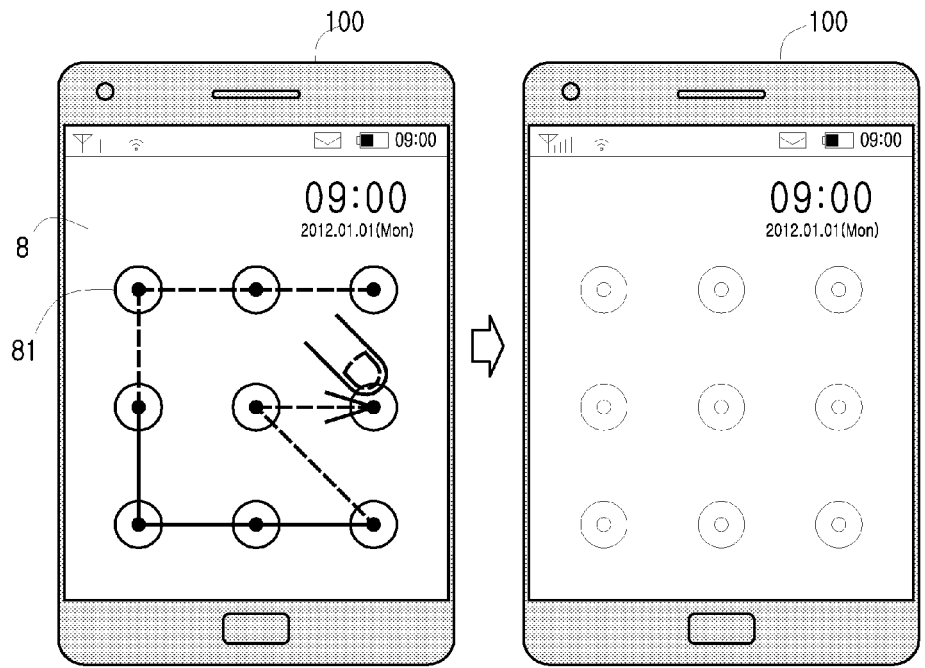

Referring to FIG. 8E, the electronic device 100 provides the touch pattern unlock screen 8. When a first undefined touch pattern connecting fourth points, a defined touch pattern following the first undefined touch pattern, and a second touch pattern following the defined touch pattern and connecting multiple points are input, the electronic device 100 holds the screen locked. In this example, the reason for keeping the screen locked is that the first undefined touch pattern preceding the defined touch pattern connects four points, rather than three points.

Figure 9A:
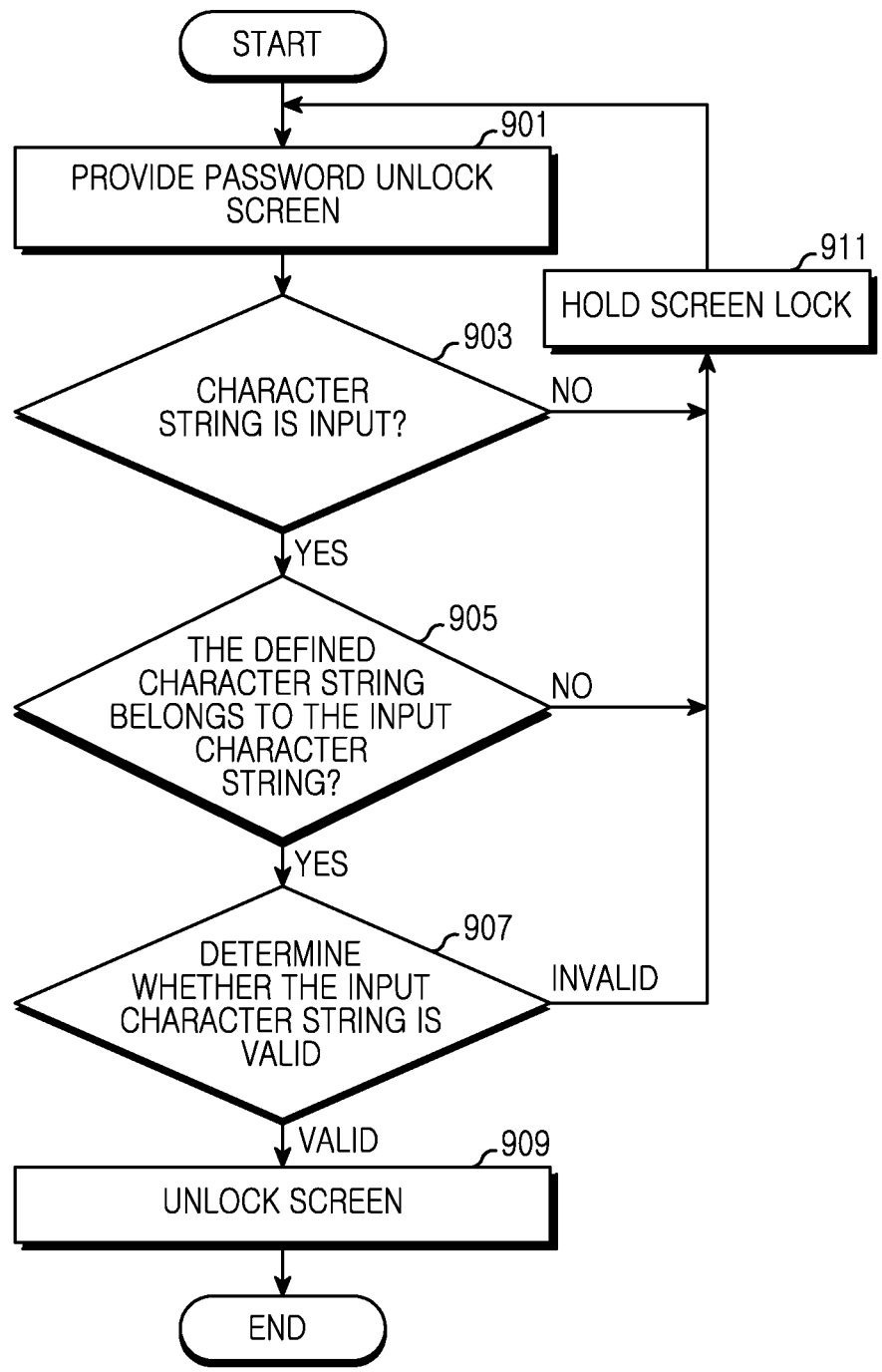
FIG. 9A is a flowchart of a method for unlocking the screen of an electronic device including a touch screen according to aspects of the disclosure.

FIG. 9A is a flowchart of a method for unlocking the screen of an electronic device according to aspects of the disclosure.

Referring to FIG. 9A, the processor 112 provides the password unlock screen in step 901.

When the user inputs the character string in step 903, the processor 112 goes to step 905. By contrast, when the user inputs no character string, the processor 112 holds the screen locked in step 911 and returns to step 901.

In step 905, the processor 112 determines whether the defined character string belongs to the input character string. In some implementations, the defined character string may be a specified character string, such as the string "doremi." In some implementations, the determination of whether the defined character string belongs to the input character string may be based on a rule that provides that the user input must include a substring that is (or be) the same as the predetermined character string. The defined character string may include any number of symbols. The symbols may include one or more of letters, numbers, and/or any other suitable type of symbol. By contrast, an undefined character string may be any one of a plurality of character strings. In some implementations, a character string input by the user may be considered to include an undefined string if it satisfies an undefined character string rule. For example, the rule may be satisfied if the input character string is a concatenation of any random set of characters (the random set of character being the undefined string) and the defined character string. As another example, the rule may be satisfied if the input character string is a concatenation of any random set of characters of size greater than three characters (the random string being the undefined string) and the defined character string. In the latter example, the undefined character string rule may provide that the undefined character string must include three characters, without specifying what the characters should be.

When the defined character string belongs to the input character string, the processor 112 determines whether the input character string is valid in step 907. Step 907 is discussed further below. By contrast, when the defined character string does not belong to the input character string, the processor 112 holds the screen locked in step 911 and goes back to step 901.

When the input character string is valid, the processor 112 unlocks the screen is step 909.

When the input character string is invalid, the processor 112 holds the screen locked in step 911 and goes back to step 901.

FIGS. 9B through 9E depict a user interface screen for unlocking the screen of the electronic device 100 according to aspects of the disclosure. The password unlock screen 9 includes a keypad 91 having a plurality of buttons, for example, digit buttons, letter buttons, and symbol buttons, and a window 92 which hides the digit, the letter, or the symbol of the touched button of the keypad 91.

Figure 9B:
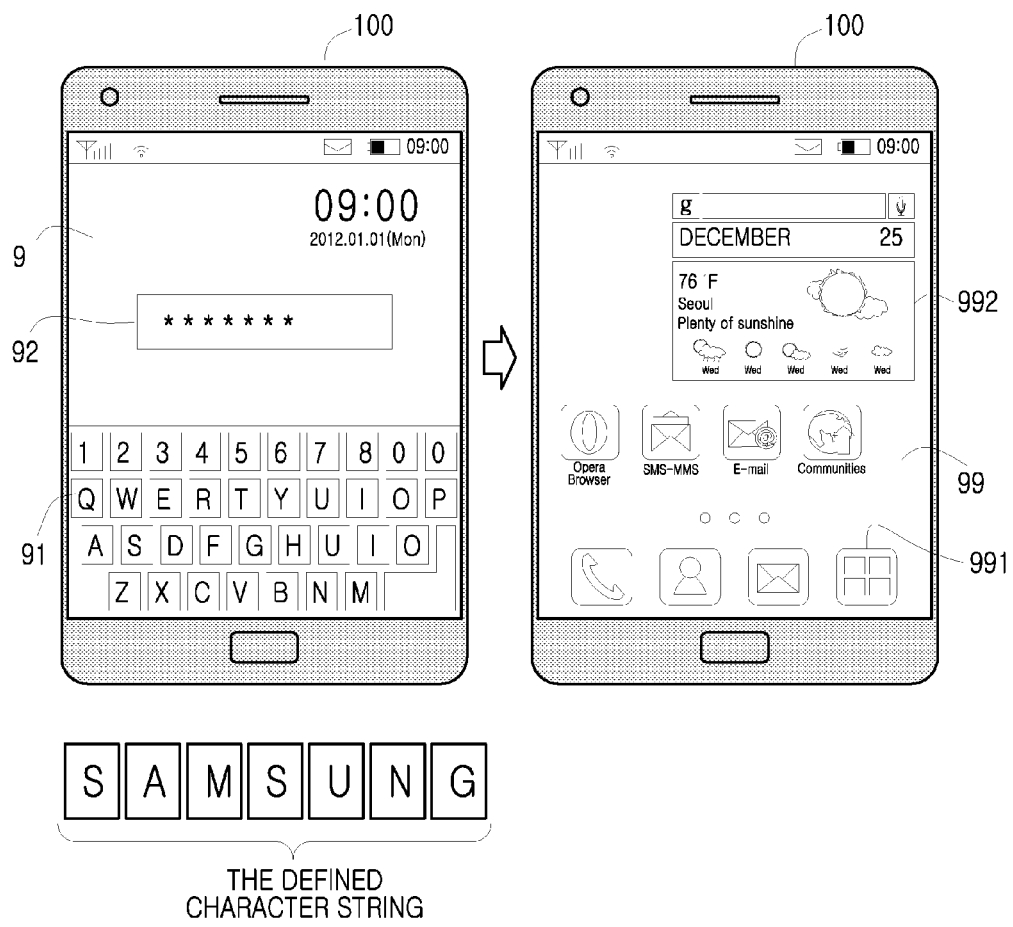
FIGS. 9B, 9C, 9D, 9E, 9F, 9G, 9H and 9I are diagrams of a user interface for unlocking the screen of an electronic device including a touch screen according to aspects of the disclosure.

Referring to FIG. 9B, the electronic device 100 provides the password unlock screen 9. When the defined character string is input, the electronic device 100 unlocks the screen and provides the unlocked screen 99. The defined character string includes at least one series of characters. The characters may include any alphanumeric character or symbol. The unlocked screen 99 can provide shortcuts to an icon 991 and a widget 992. Additionally or alternatively, the unlocked screen 99 can be the screen of an application that is being executed by the device 100.

Figure 9C:
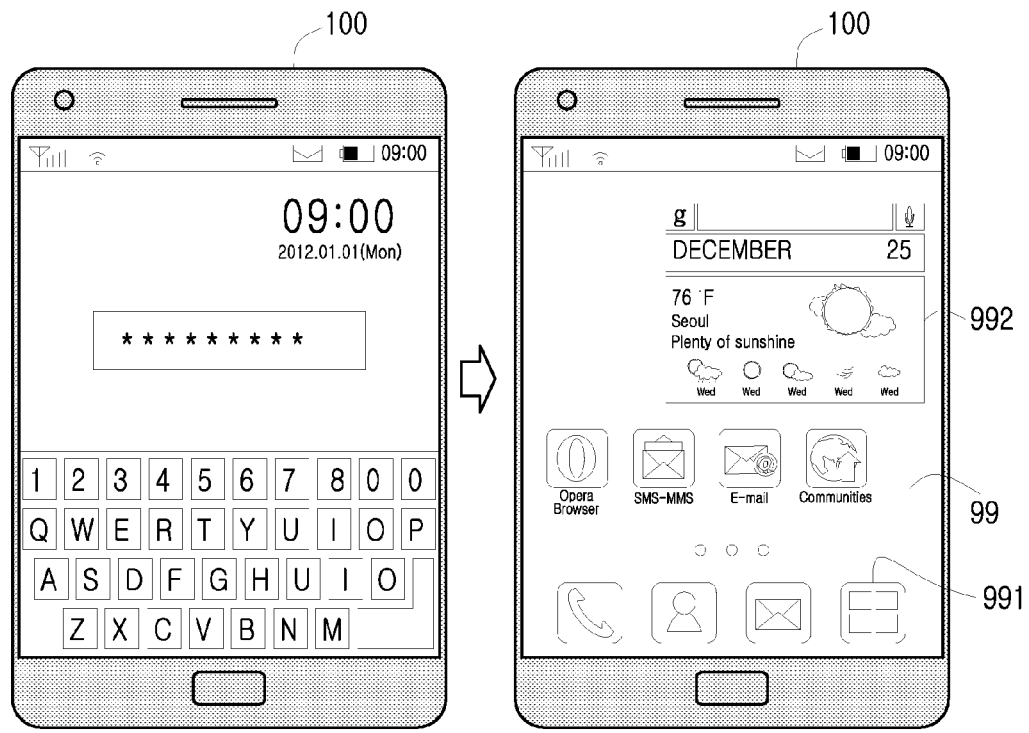

Referring to FIG. 9C, the electronic device 100 provides the password unlock screen 9. When an undefined character string and a defined character string following the undefined character string are input, the electronic device 100 unlocks the screen and provides the unlocked screen 99. When the undefined character string precedes the defined character string and includes at least one unspecified character, the screen is unlocked. When the undefined character string precedes the defined character string and includes a specified number of unspecified characters, the screen may be unlocked.

Figure 9D:
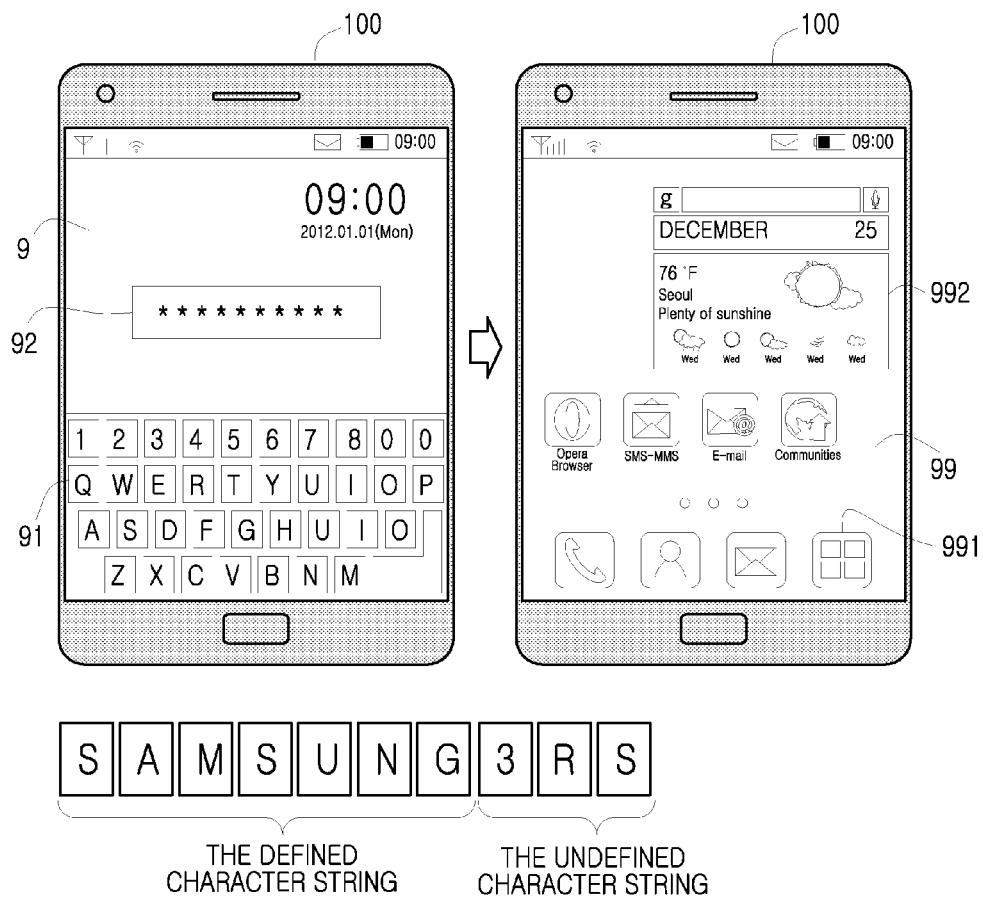

Referring to FIG. 9D, the electronic device 100 provides the password unlock screen 9. When a defined character string and an undefined character string following the defined character string are input, the electronic device 100 unlocks the screen and provides the unlocked screen 99. When the undefined character string follows the defined character string and includes an unspecified character, the screen is unlocked. When the undefined character string follows the defined character string and includes a specified number of unspecified characters, the screen may be unlocked.

Figure 9E:
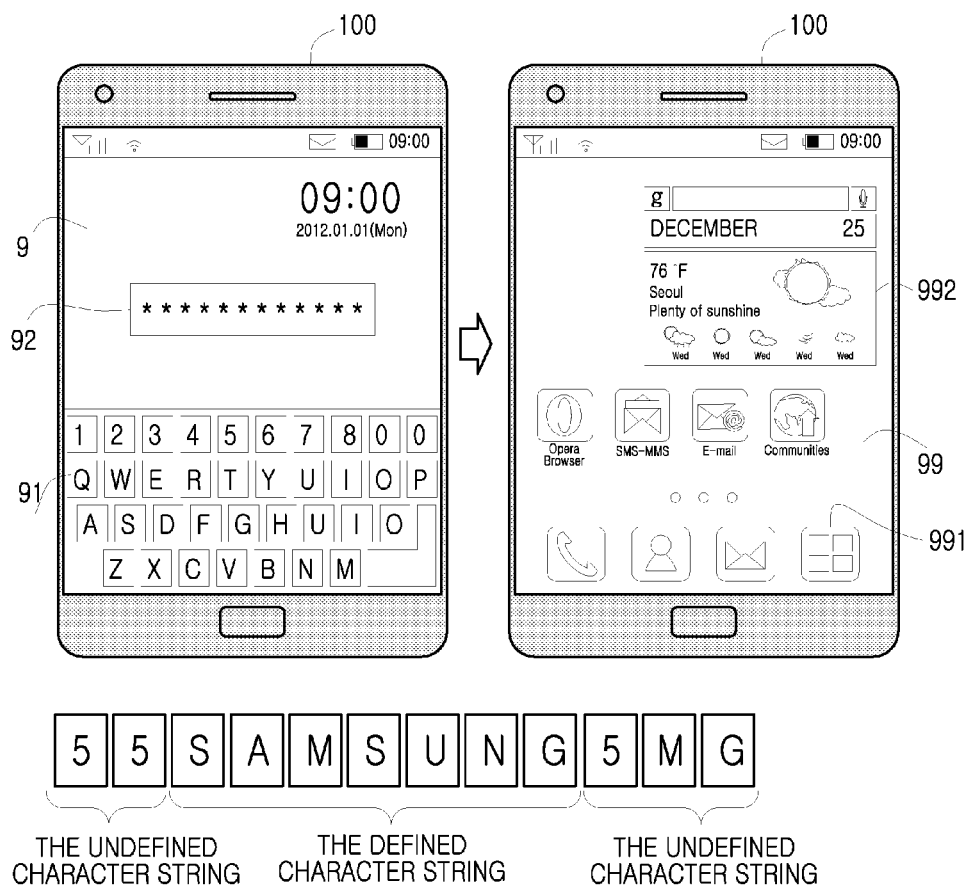

Referring to FIG. 9E, the electronic device 100 provides the password unlock screen 9. When an undefined character string, a defined character string following the undefined character string, and an undefined character string following the defined character string are input, the electronic device 100 unlocks the screen and provides the unlocked screen 99. When the first undefined character string precedes the defined character string and includes an unspecified number of unspecified characters, the screen can be unlocked. When the first undefined character string precedes the defined character string and includes an unspecified number of unspecified characters, the screen may be unlocked. Further, when the second undefined character string follows the defined character string and includes an unspecified number of unspecified characters, the screen can be unlocked. When the second undefined character string follows the defined character string and includes a specified number of unspecified characters, the screen may be unlocked.

FIGS. 9F through 9I depict a user interface screen for unlocking the screen of the electronic device including the touch screen according to an exemplary embodiment of the present invention. The PIN unlock screen 91 includes a keypad 911 having digit buttons, and a window 921 hiding the digits of the touched buttons of the keypad 911.

Figure 9F:
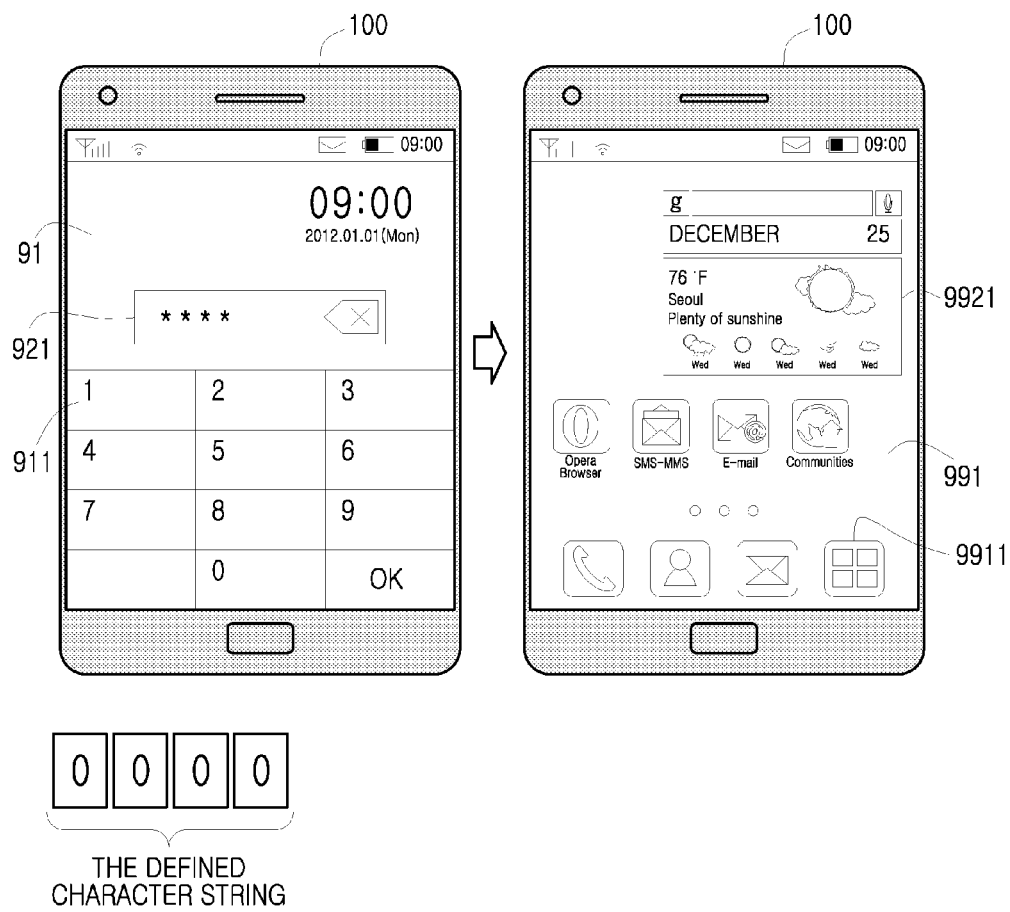

Referring to FIG. 9F, the electronic device 100 provides the PIN unlock screen 91. When a defined digit string is input, the electronic device 100 unlocks the screen and provides the unlocked screen 991. The defined digit string indicates at least one series of digits, which can be set by the user. The unlocked screen 991 can provide shortcuts to an icon 9911 and a widget 9921. In some implementations, the unlocked screen 991 can be the screen of an application that is being executed by the device 100.

Figure 9G:
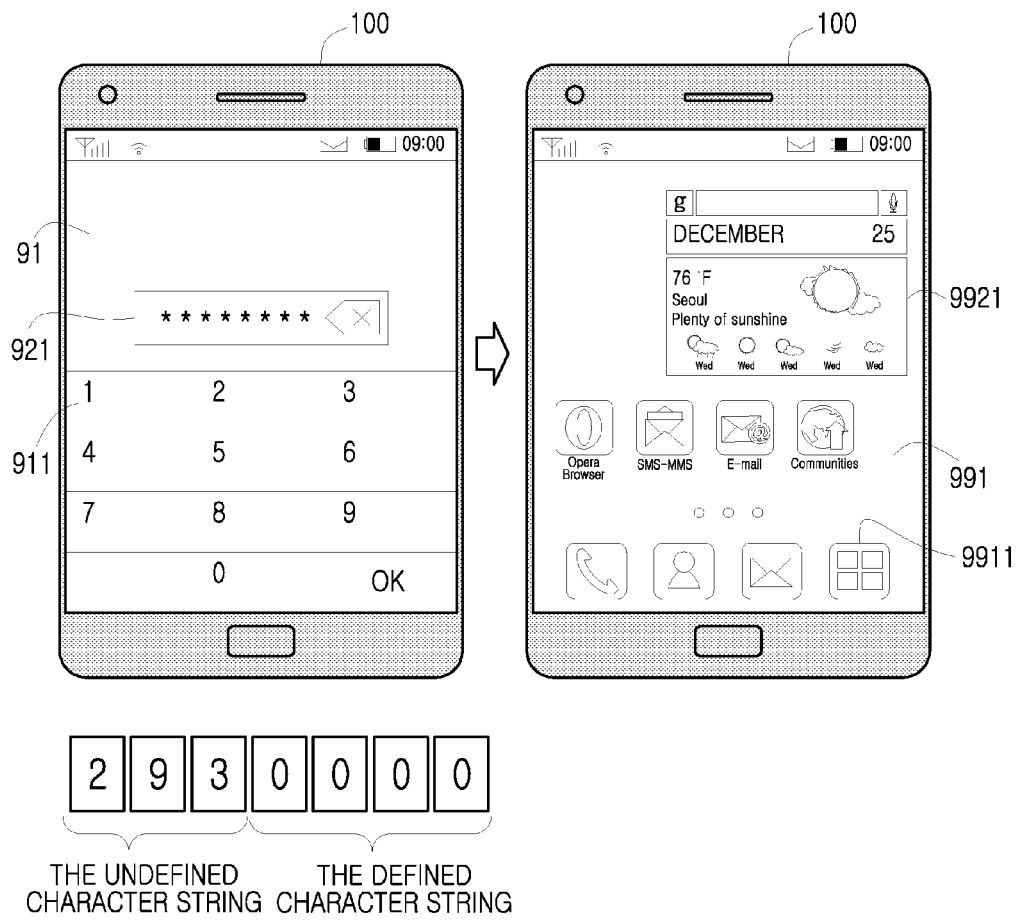

Referring to FIG. 9G the electronic device 100 provides the PIN unlock screen 91. When a defined digit string and an undefined digit string preceding the defined digit string are input, the electronic device 100 unlocks the screen and provides the unlocked screen 991. When the undefined digit string precedes the defined digit string, it can unlock the screen. When the undefined digit string preceding the defined digit string includes a specified number of unspecified characters, it may unlock the screen.

Figure 9H:
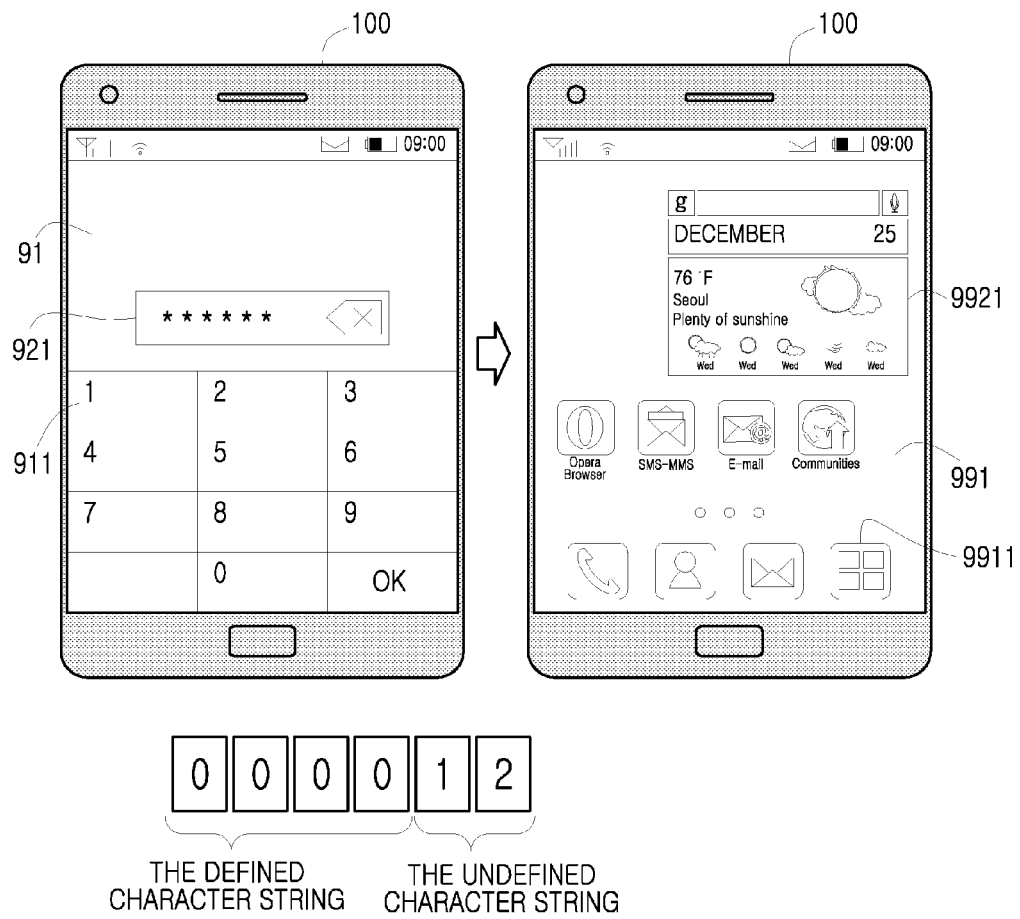

Referring to FIG. 9H, the electronic device 100 provides the PIN unlock screen 91. When a defined digit string and an undefined digit string following the defined digit string are input, the electronic device 100 unlocks the screen and provides the unlocked screen 991. When the undefined digit string precedes the defined digit string, it can unlock the screen. When the undefined digit string preceding the defined digit string includes a specified number of unspecified characters, it may unlock the screen.

Figure 9I:
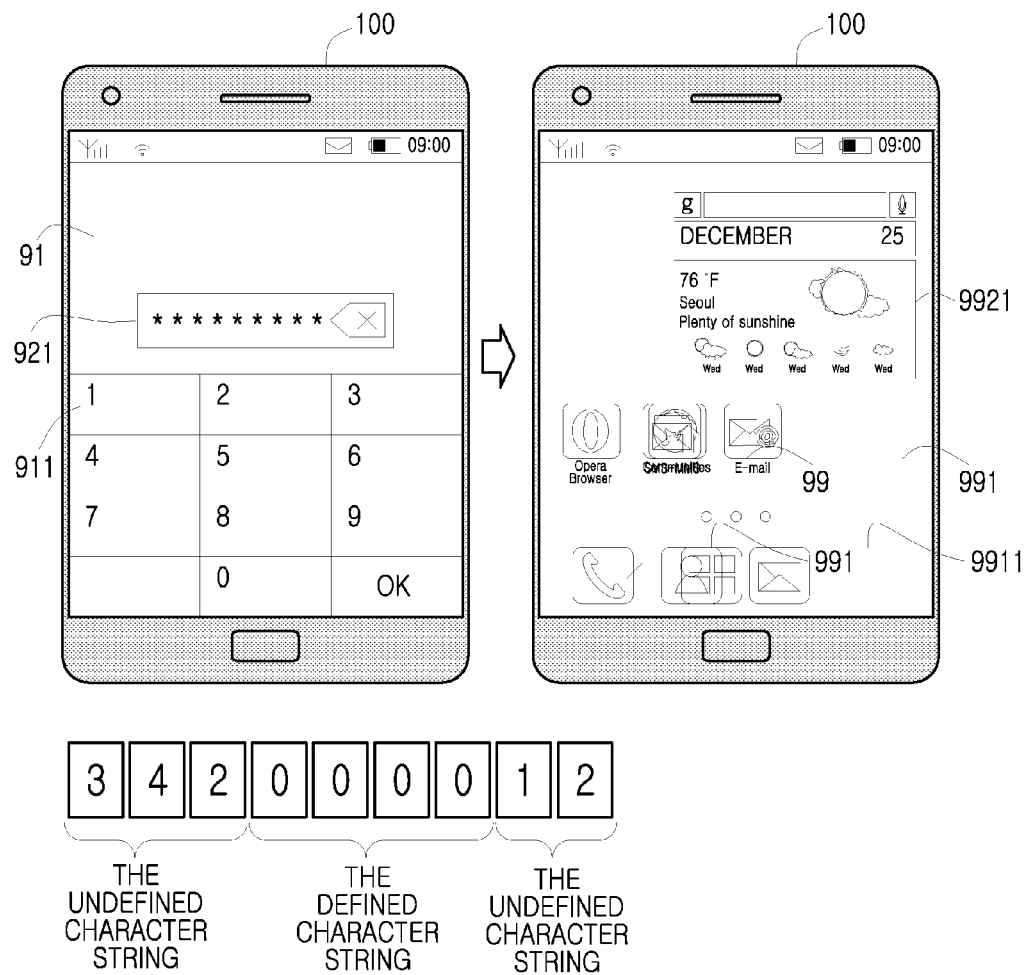

Referring to FIG. 9I, the electronic device 100 provides the PIN unlock screen 91. When an undefined digit string, a defined digit string following the undefined digit string, and an undefined digit string following the defined digit string are input, the electronic device 100 unlocks the screen and provides the unlocked screen 991. When the first undefined digit string precedes the defined digit string and the second undefined digit string precedes the defined digit string, it can unlock the screen. When the first undefined digit string preceding the defined digit string includes a specified number of unspecified characters, it may unlock the screen. Further, when the second undefined digit string following the defined digit string includes a specified number of unspecified characters, it may unlock the screen.

Figure 10A:
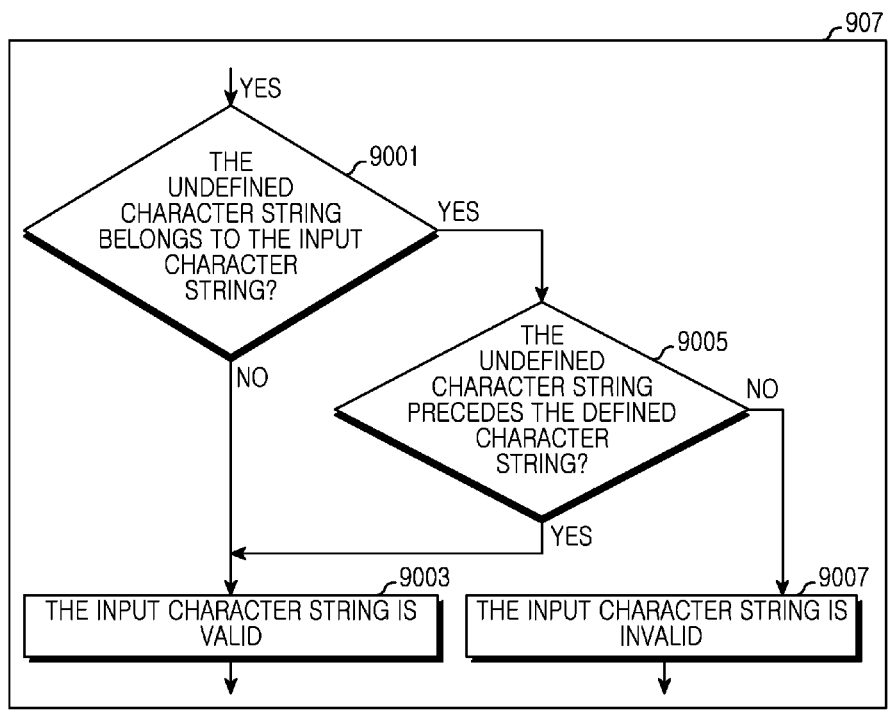
FIG. 10A is a flowchart of a method for determining whether an input character string is valid according to aspects of the disclosure.

FIG. 10A is a flowchart of a method for performing step 907 of FIG. 9A according to aspects of the disclosure.

In the example of FIG. 10A, the screen is unlocked when the input character string includes a defined character string and an undefined character string preceding the defined character string and including an unspecified number of unspecified characters. In this example, the screen may be unlocked only if the undefined character string precedes the defined character string. In some implementations, this condition can be set by the user.

Referring to FIG. 10A, the processor 112 determines whether an undefined character string belongs to the input character string in step 9001. When an undefined character string is not part of the input character string, that is, when the input character string matches the defined character string, the processor 112 determines the valid input character string in step 9003. By contrast, when the undefined character string belongs to the input character string, that is, when the input character string is the combination of the undefined character string and the defined character string, the processor 112 goes to step 9005.

In step 9005, the processor 112 determines whether the undefined character string precedes the defined character string. When the undefined character string precedes the defined character string, the processor 112 determines that the input character string is valid in step 9003. By contrast, when the undefined character string does not precede the defined character string, that is, when the undefined character string follows the defined character string, the processor 112 determines that the input character string is invalid in step 9007.

Figure 10B:
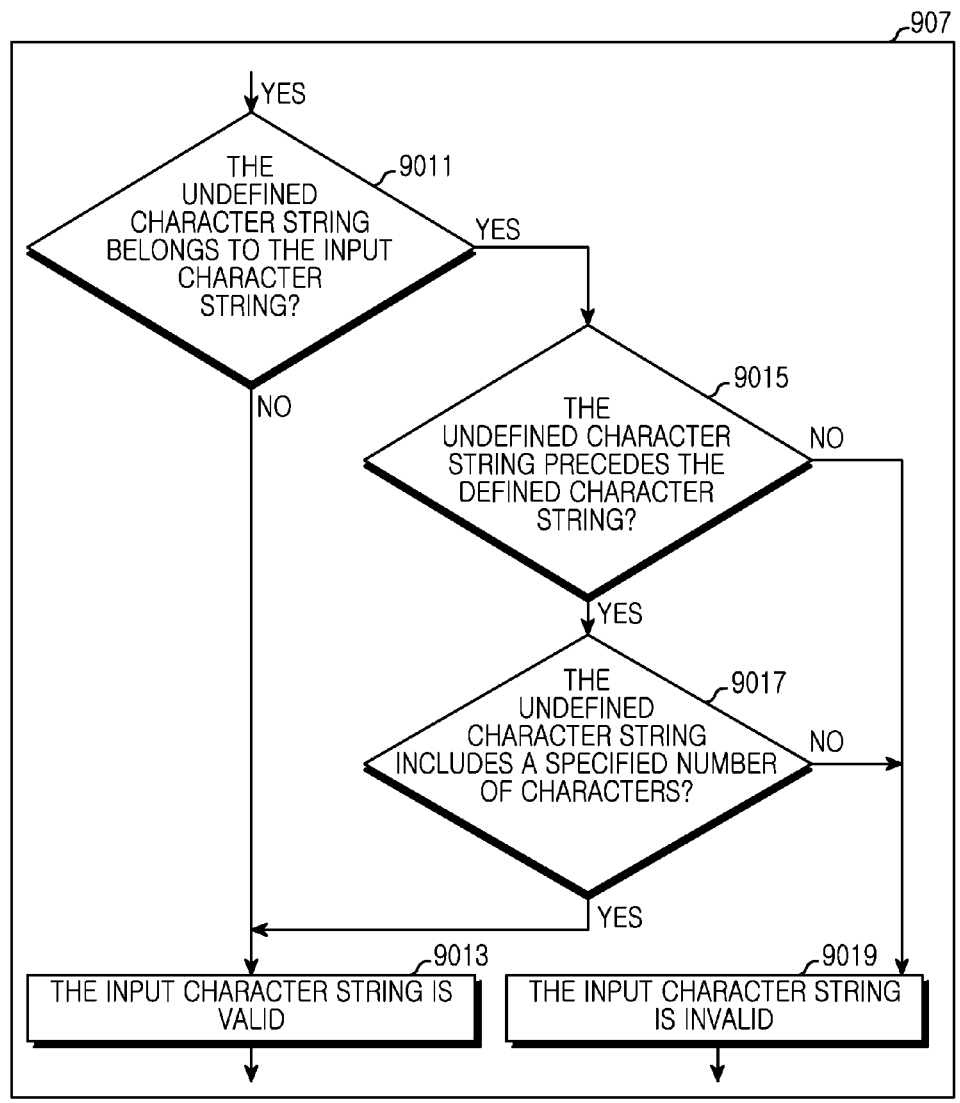
FIG. 10B is a flowchart of a method for determining whether an input character string is valid in accordance with aspects of the disclosure.

FIG. 10B is a flowchart of a method for performing step 907 of FIG. 9A according to aspects of the disclosure.

In FIG. 10B, the screen of device 100 is unlocked when the input character string includes a defined character string and an undefined character string preceding the defined character string and including a specified number of unspecified characters. In this example, the screen of device 100 is unlocked only when the undefined character string precedes the defined character string and includes a specified number of characters. In some implementations, this condition can be set by the user.

In the example of FIG. 10B, the processor 112 determines whether the undefined character string belongs to the input character string in step 9011. When an undefined character string does is not part of the input character string, that is, when the input character string matches the defined character string, the processor 112 determines the valid input character string in step 9013. By contrast, when the undefined character string belongs to the input character string, that is, when the input character string is the combination of the undefined character string and the defined character string, the processor 112 goes to step 9015.

In step 9015, the processor 112 determines whether the undefined character string precedes the defined character string. When the undefined character string precedes the defined character string, the processor 112 goes to step 9017. By contrast, when the undefined character string does not precede the defined character string, that is, when the undefined character string follows the defined character string, the processor 112 determines the invalid input character string in step 9019.

In step 9017, the processor 112 determines whether the undefined character string includes a specified number of characters. When the undefined character string includes a specified number of characters, the processor 112 determines that the input character string is valid in step 9013. By contrast, when the undefined character string does not include the specified number of characters, the processor 112 determines that the input character string is invalid in step 9019.

FIGS. 10C through 10G depict a user interface screen for unlocking the screen of the electronic device 100 according to aspects of the disclosure. In particular, in FIGS. 10C through 10G when an undefined character string precedes a defined character string and includes two characters, it satisfies the condition for unlocking the screen. The password unlock screen 10 includes a keypad 1001 having a plurality of buttons, for example, digit buttons, letter buttons, and symbol buttons, and a window 1002 which hides the digit, the letter, or the symbol of the touched button of the keypad 1001.

Figure 10C:
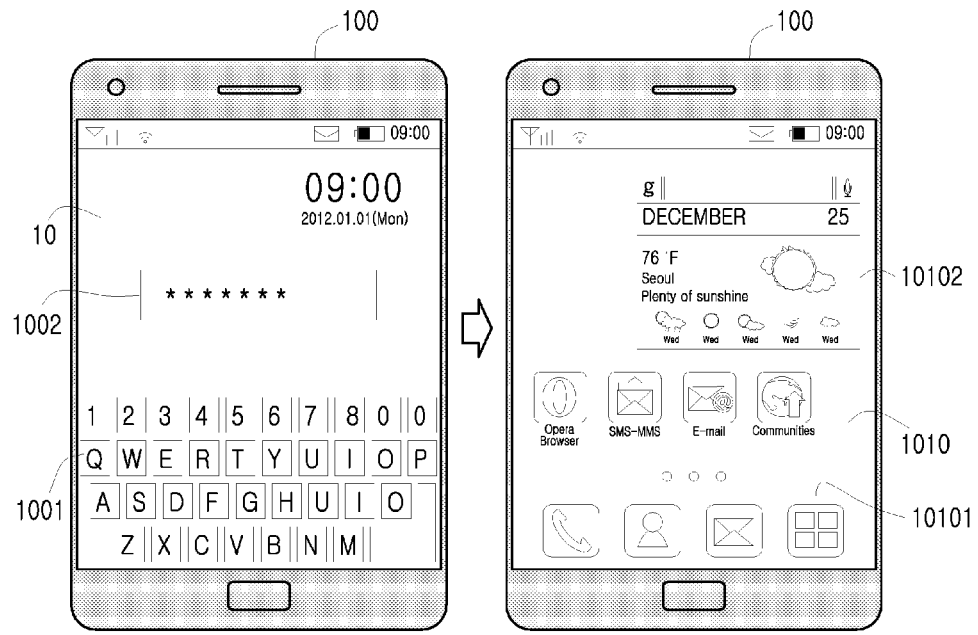
FIGS. 10C, 10D, 10E, 10F, and 10G are diagrams of a user interface screen for unlocking the screen of an electronic device including a touch screen according to aspects of the disclosure.
Figure 10C:
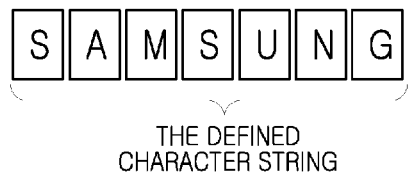

Referring to FIG. 10C, the electronic device 100 provides the password unlock screen 10. When the defined character string is input, the electronic device 100 unlocks the screen and provides the unlocked screen 1010. The unlocked screen 1010 can provide shortcuts to an icon 10101 and a widget 10102. In some implementations, the unlocked screen 1010 can be the screen of an application that is being executed by the device 100.

Figure 10D:
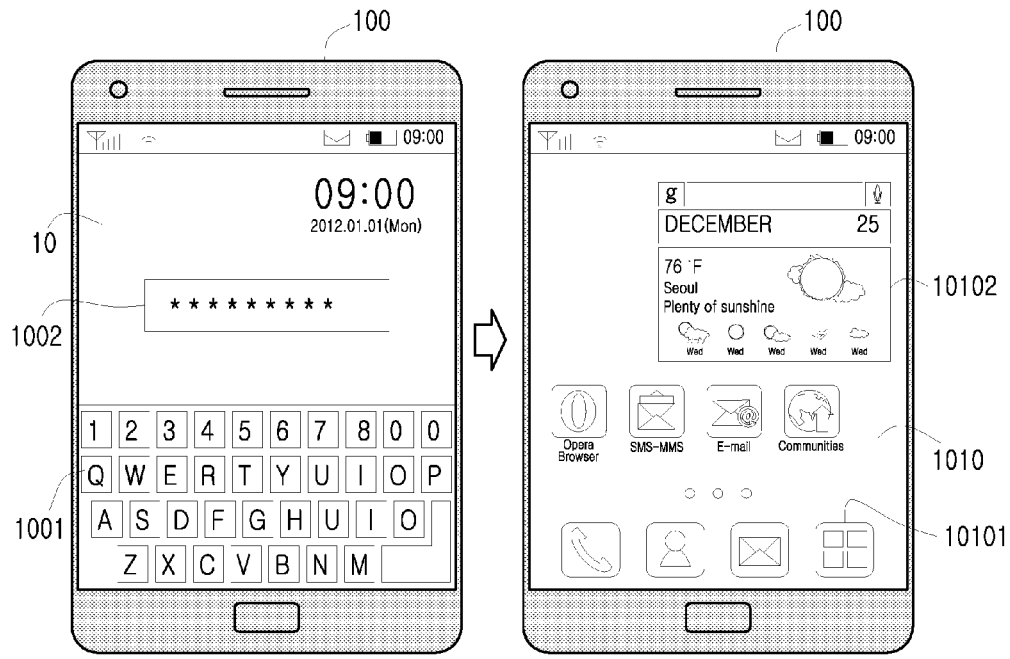
Figure 10D:
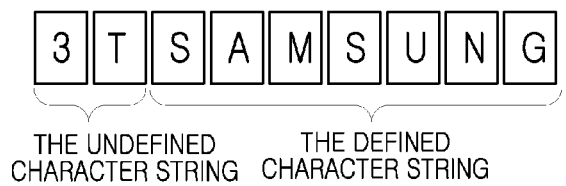

Referring to FIG. 10D, the electronic device 100 provides the password unlock screen 10. When an undefined character string including two characters and a defined character string following the undefined character string are input, the electronic device 100 unlocks the screen and provides the unlocked screen 1010.

Figure 10E:
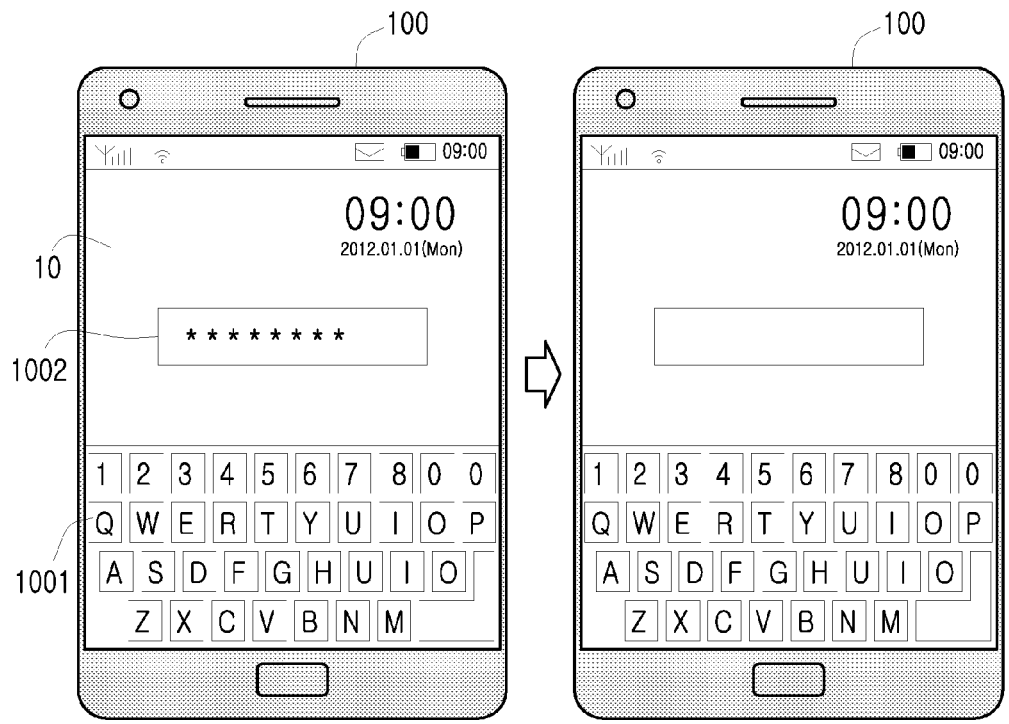
Figure 10E:
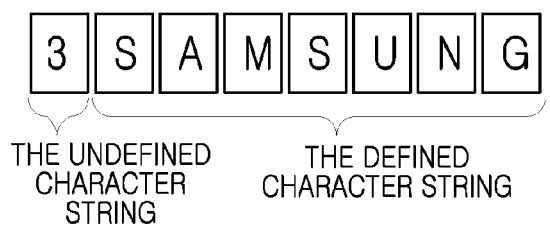

Referring to FIG. 10E, the electronic device 100 provides the password unlock screen 10. When an undefined character string including one character and an undefined character string following a defined character string are input, the electronic device 100 holds the screen locked. The reason for keeping the screen locked is that the undefined character string includes one character, rather than two characters.

Figure 10F:
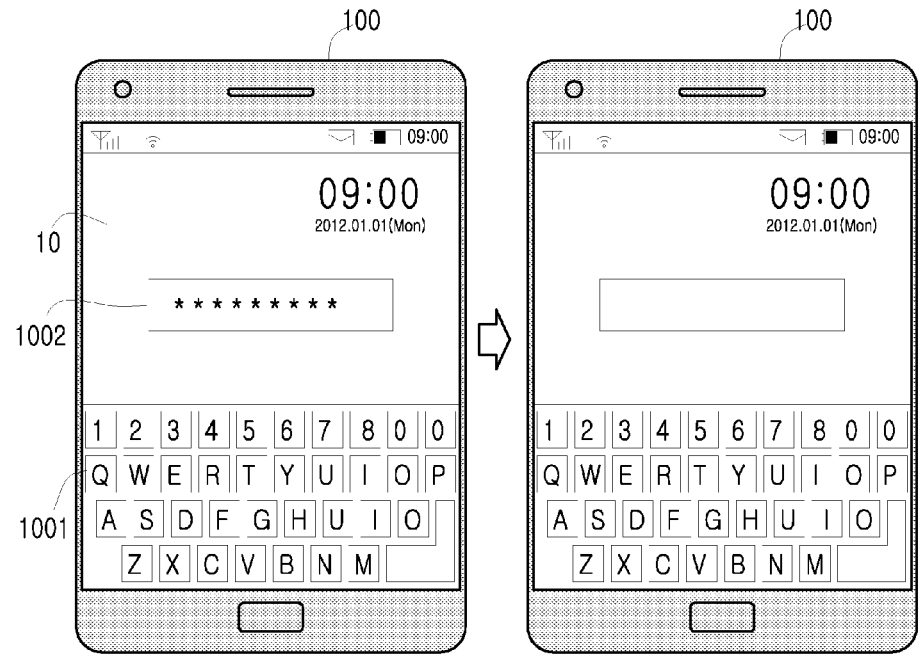
Figure 10F:
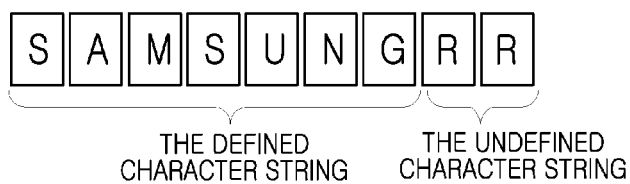

Referring to FIG. 10F, the electronic device 100 provides the password unlock screen 10. When a defined character string and an undefined character string following the defined character string are input, the electronic device 100 holds the screen locked. In this example, the reason for keeping the screen locked is that the undefined character string follows the defined character string, rather than preceding the character string.

Figure 10G:
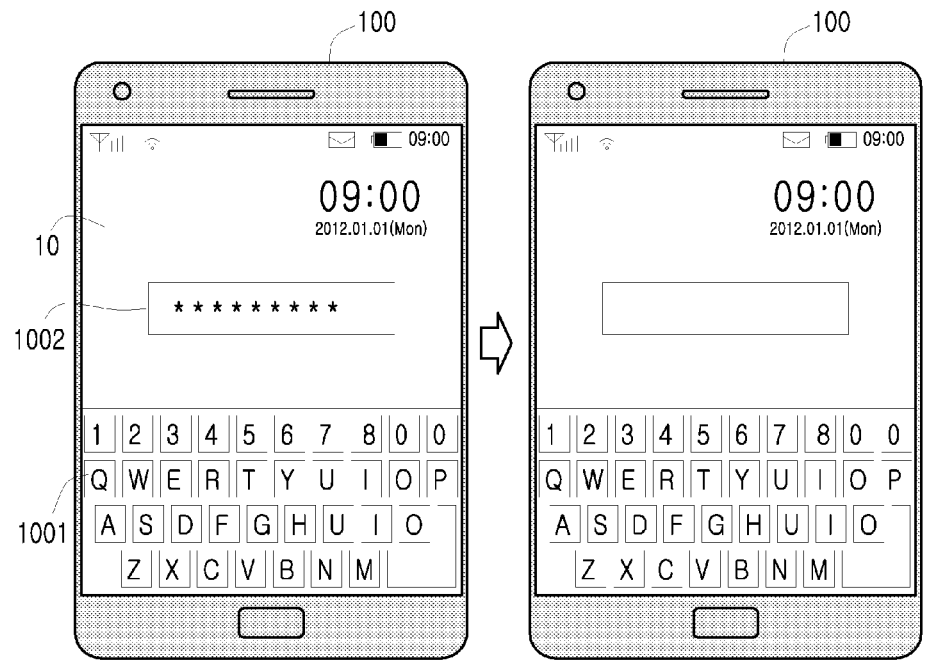
Figure 10G:
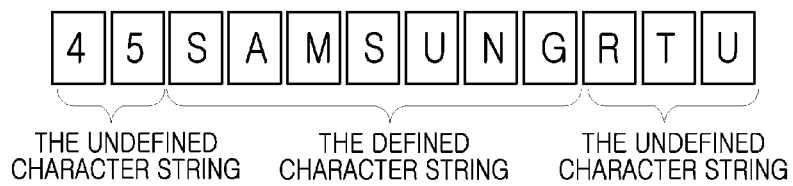

Referring to FIG. 10G, the electronic device 100 provides the password unlock screen 10. When an undefined character string including two unspecified characters, a defined character string following the defined character string, and an undefined character string following the defined character string are input, the electronic device 100 holds the screen locked. In this example, the reason for keeping the screen locked is that the undefined character string follows the defined character string.

Figure 11A:
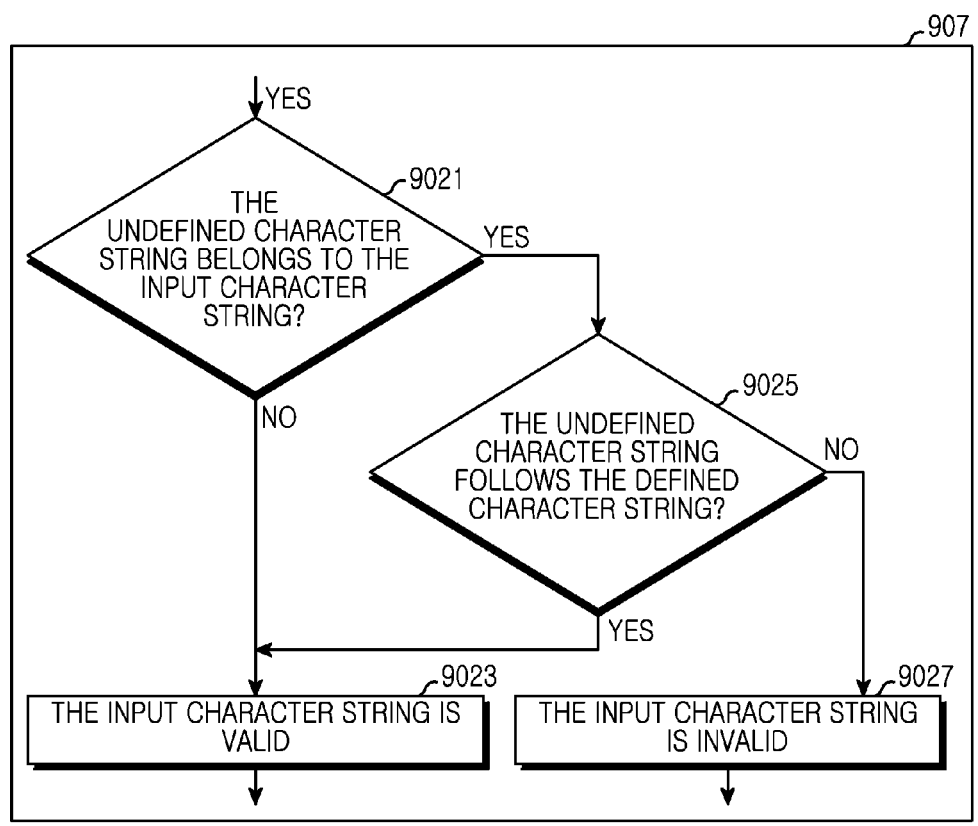
FIG. 11A is a flowchart of a method for determining whether an input character string is valid according to aspects of the disclosure.

FIG. 11A is a flowchart of a method for performing step 907 of FIG. 9A.

In the example of FIG. 11A, the screen of device 100 is unlocked when the input character string includes a defined character string and an undefined character string following the defined character string and including an unspecified number of unspecified characters. In this example, the screen of device is unlocked only when an undefined character string following the defined character string. In some implementations, this condition can be set by the user.

Referring to FIG. 11A, the processor 112 determines whether the undefined character string belongs to the input character string in step 9021. When an undefined character string is not included in the input character string, that is, when the input character string matches the defined character string, the processor 112 determines that the input character string is valid in step 9023. By contrast, when the undefined character string belongs to the input character string, that is, when the input character string is the combination of the undefined character string and the defined character string, the processor 112 goes to step 9025.

In step 9025, the processor 112 determines whether the undefined character string follows the defined character string. When the undefined character string follows the defined character string, the processor 112 determines that the input character string is valid in step 9023. By contrast, when the undefined character string does not follow the defined character string, that is, when the undefined character string precedes the defined character string, the processor 112 determines that the input character string is invalid in step 9027.

Figure 11B:
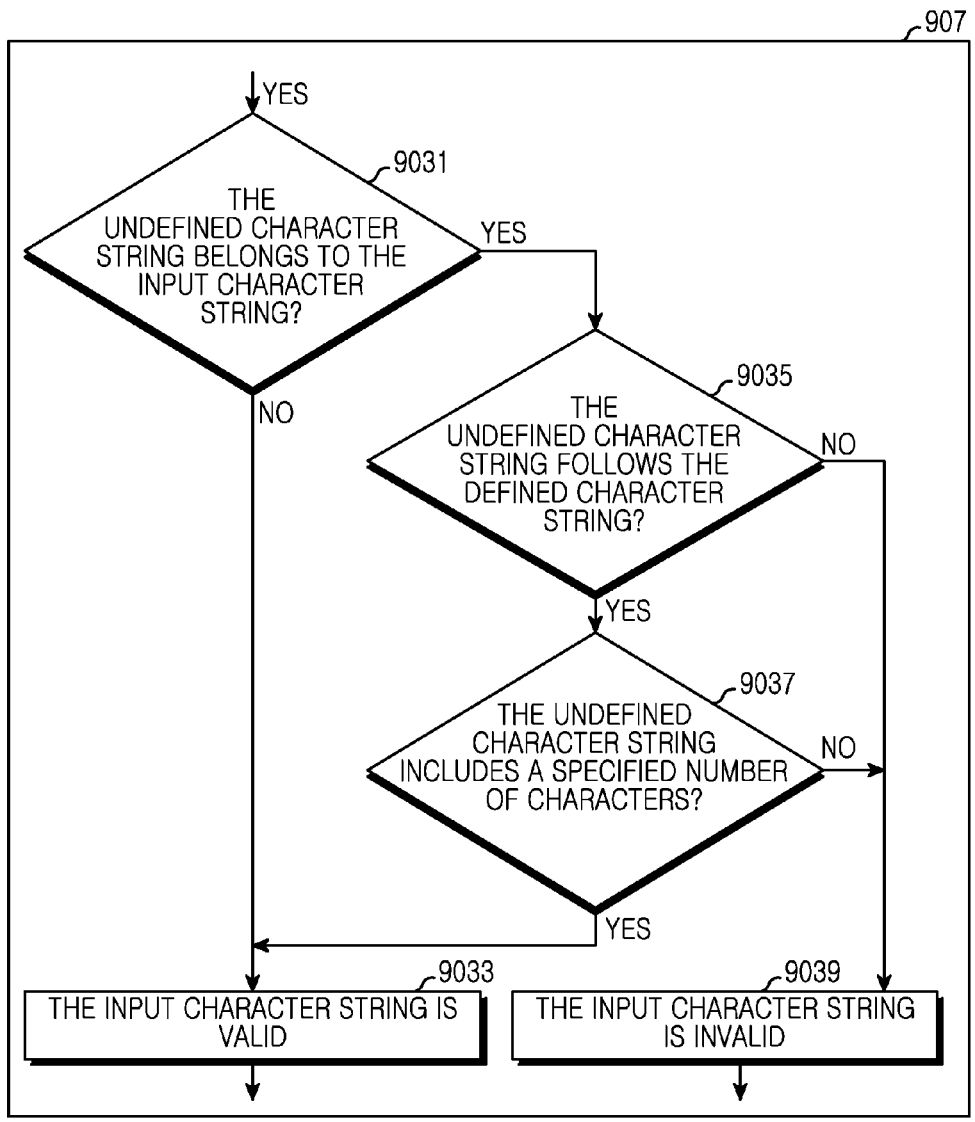
FIG. 11B is a flowchart of a method for determining whether an input character string is valid according to aspects of the disclosure.

FIG. 11B is a flowchart of a method for determining whether the input character string is valid in step 907 of FIG. 9A.

In FIG. 11B, the screen is unlocked when the input character string includes a defined character string and an undefined character string following the defined character string and including a specified number of unspecified characters. In this example, the screen is unlocked only when an undefined character string follows the defined character string and includes a specified number of unspecified characters. In some implementations, this condition can be set by the user.

Referring to FIG. 11B, the processor 112 determines whether the undefined character string belongs to the input character string in step 9031. When an undefined character string is not part of the input character string, that is, when the input character string matches the defined character string, the processor 112 determines the valid input character string in step 9033. By contrast, when the undefined character string belongs to the input character string, that is, when the input character string is the combination of the undefined character string and the defined character string, the processor 112 goes to step 9035.

In step 9035, the processor 112 determines whether the undefined character string follows the defined character string. When the undefined character string follows the defined character string, the processor 112 goes to step 9037. By contrast, when the undefined character string does not follow the defined character string, that is, when the undefined character string precedes the defined character string, the processor 112 determines that the input character string is invalid in step 9039.

In step 9037, the processor 112 determines whether the undefined character string includes a specified number of characters. When the undefined character string includes the specified number of characters, the processor 112 determines that the input character string is valid in step 9033. By contrast, when the undefined character string does not include the specified number of characters, the processor 112 determines that the input character string is invalid in step 9039.

FIGS. 11C through 11G depict a user interface screen for unlocking the screen of the electronic device 100 according to aspects of the disclosure. In the example of FIGS. 11C through 11G, when an undefined character string follows a defined character string and includes three unspecified characters, it satisfies the condition for unlocking the screen. The password unlock screen 11 includes a keypad 1101 having a plurality of buttons, for example, digit buttons, letter buttons, and symbol buttons, and a window 1102 which hides the digit, the letter, or the symbol of the touched button of the keypad 1101.

Figure 11C:
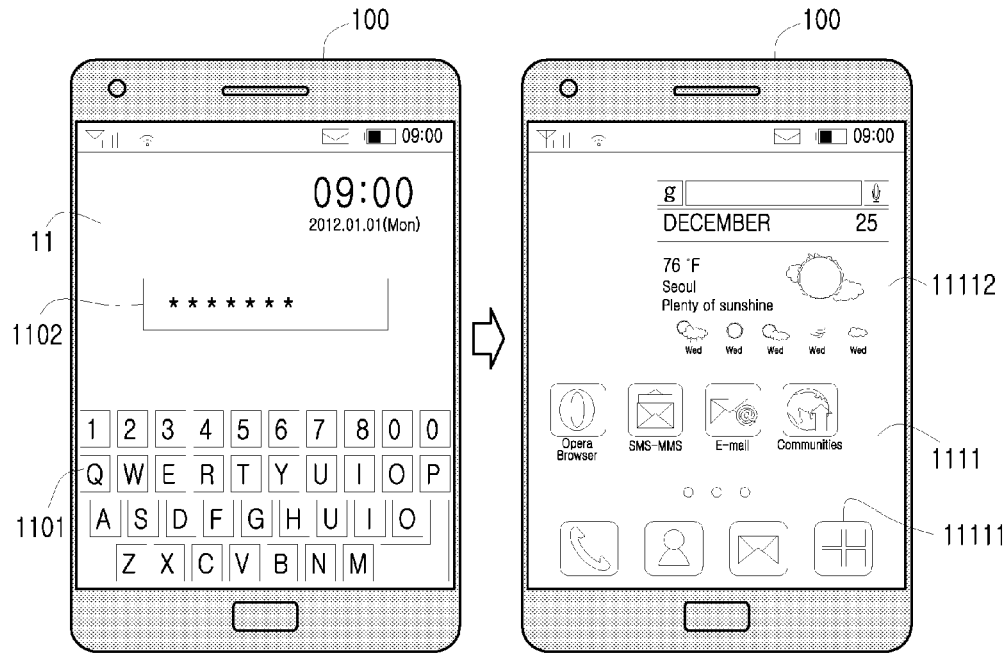
FIGS. 11C, 11D, 11E, 11F, and 11G are diagrams of a user interface screen for unlocking the screen of an electronic device according to aspects of the disclosure.
Figure 11C:
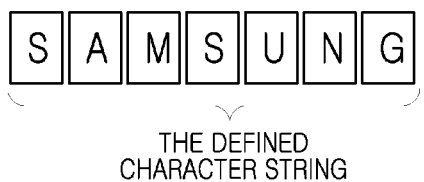
Figure 11D:
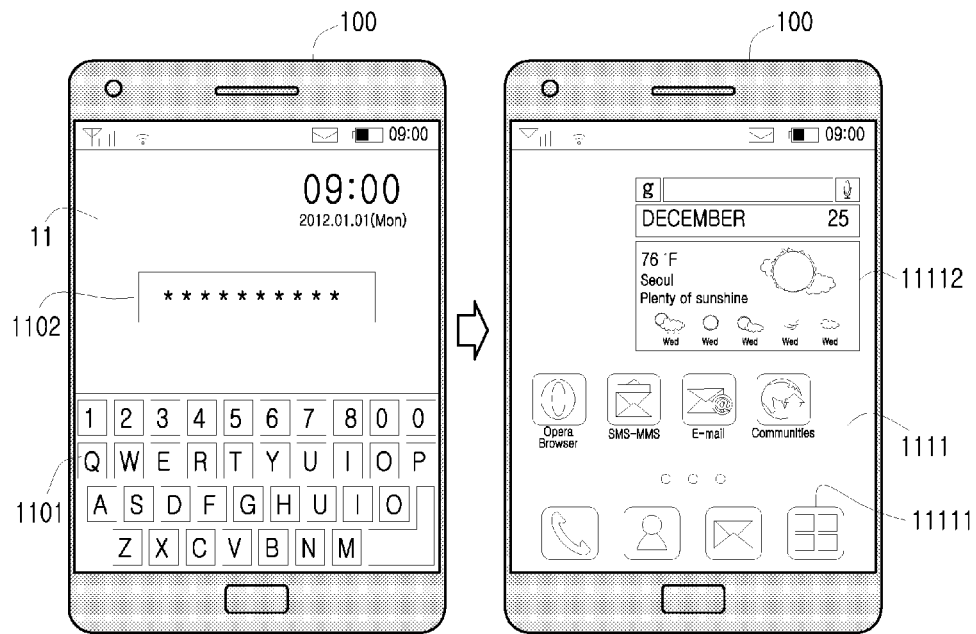

Referring to FIG. 11C, the electronic device 100 provides the password unlock screen 11. When the defined character string is input, the electronic device 100 unlocks the screen and provides the unlocked screen 1111. The unlocked screen 1111 can provide shortcuts to an icon 11111 and a widget 11112. In some implementations, the unlocked screen 1111 can be the screen of an application that is being executed by the device 100. Referring to FIG. 11D, the electronic device 100 provides the password unlock screen 11. When a defined character string and an undefined character string following the defined character string and including three characters are input, the electronic device 100 unlocks the screen and provides the unlocked screen 1111.

Figure 11E:
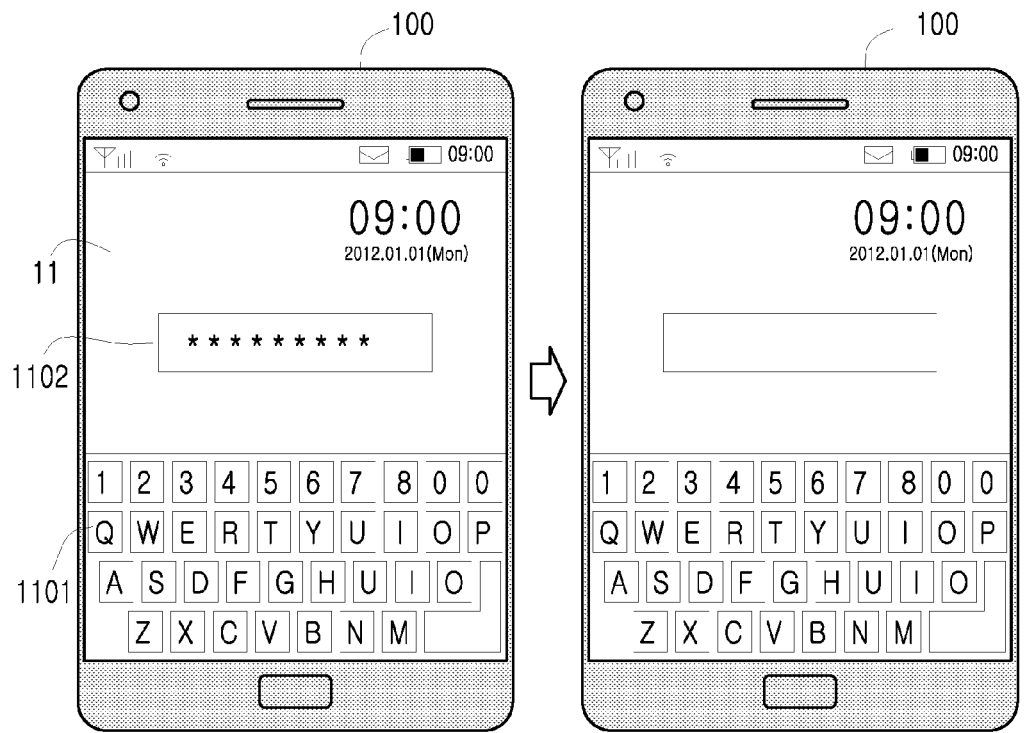
Figure 11E:
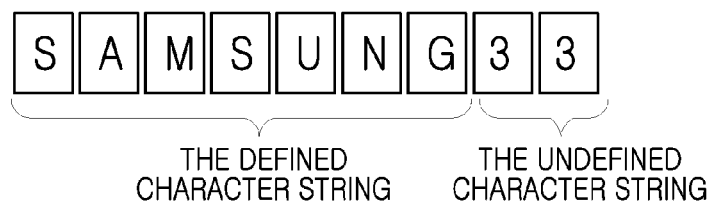

Referring to FIG. 11E, the electronic device 100 provides the password unlock screen 11. When a defined character string and an undefined character string following the defined character string and including two characters are input, the electronic device 100 holds the screen locked. In this example, the reason for keeping the screen locked is that the undefined character string includes two characters, rather than three characters.

Figure 11F:
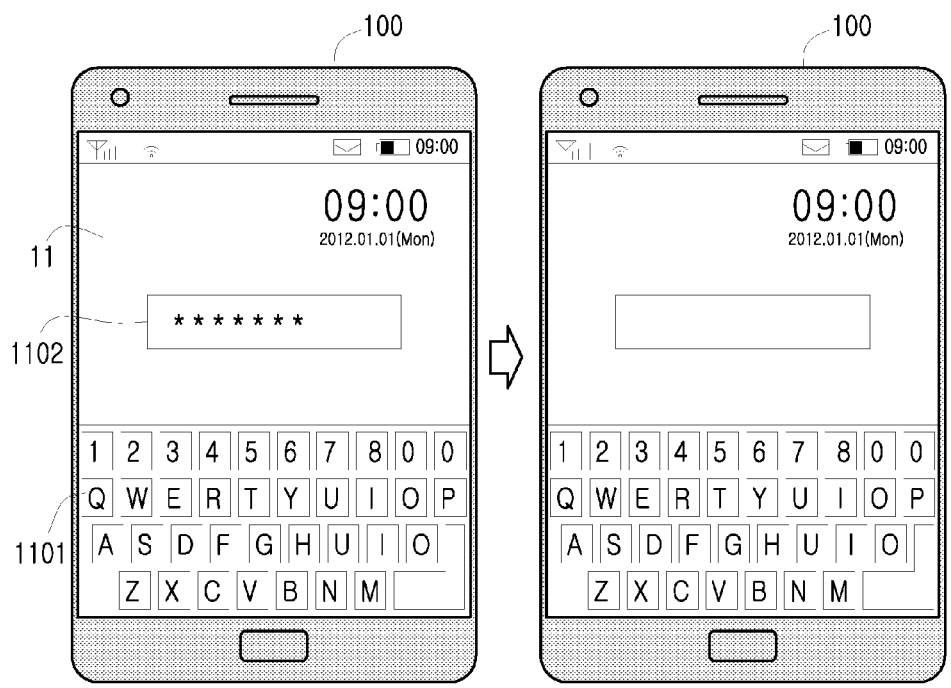
Figure 11F:
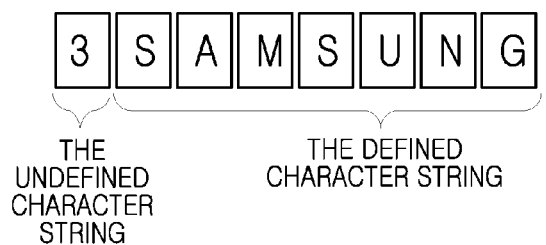

Referring to FIG. 11F, the electronic device 100 provides the password unlock screen 11. When an undefined character string and a defined character string following the undefined character string are input, the electronic device 100 holds the screen locked. In this example, the reason for keeping the screen locked is that the undefined character string precedes the defined character string.

Figure 11G:
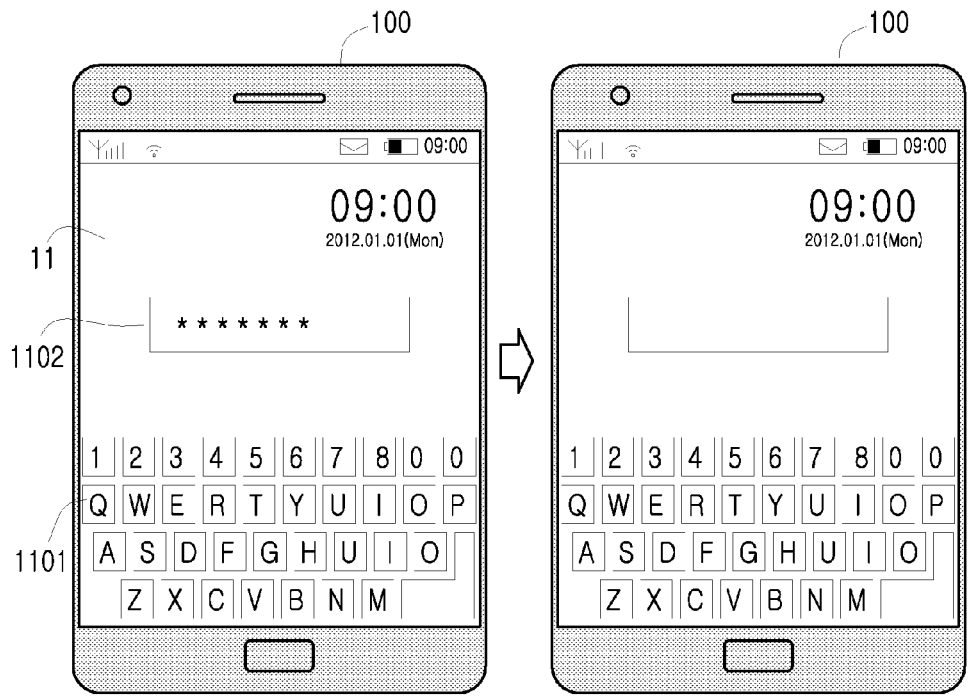
Figure 11G:
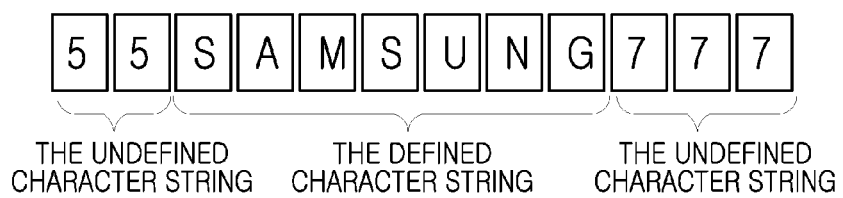

Referring to FIG. 11G, the electronic device 100 provides the password unlock screen 11. When an undefined character string, a defined character string following the undefined character string, and an undefined character string following the defined character string and including three characters are input, the electronic device 100 holds the screen locked. In this example, the reason for keeping the screen locked is that the undefined character string precedes the defined character string.

Figure 12A:
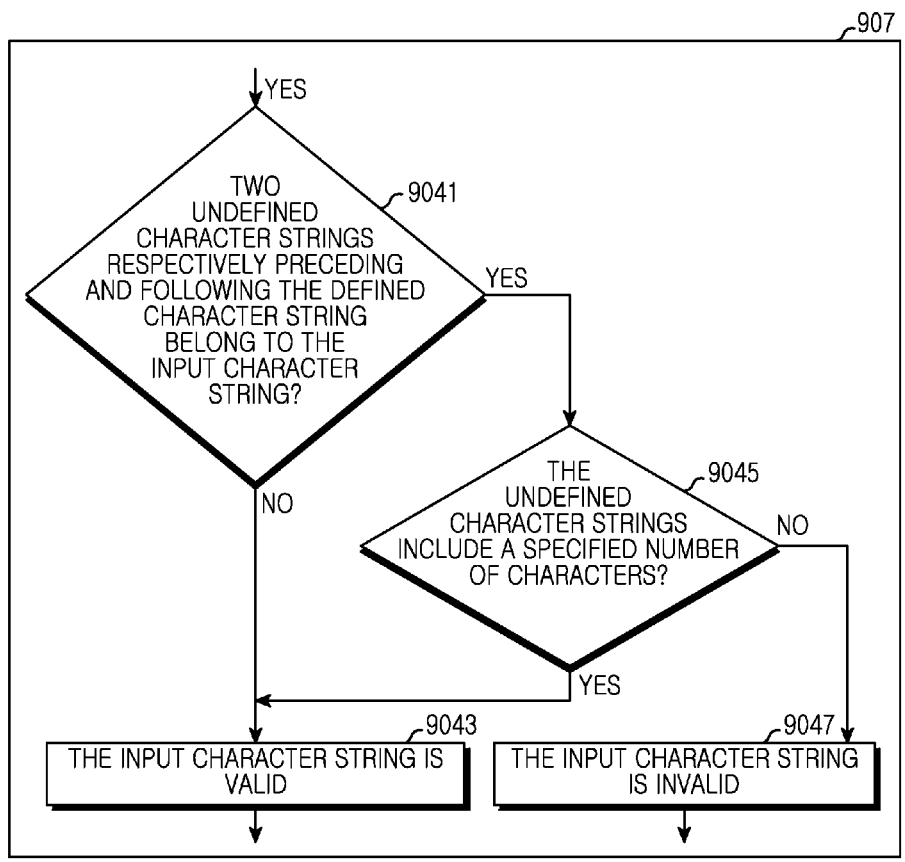
FIG. 12A is a flowchart of a method for determining whether an input character string is valid according to aspects of the disclosure.

FIG. 12A is a flowchart of a method for performing step 907 of FIG. 9A according to aspects of the disclosure.

In FIG. 12A, the screen is unlocked when an input character string includes a defined character string, a first undefined character string preceding the defined character string and including a specified number of unspecified characters, and a second undefined character string following the defined character string and including a specified number of unspecified characters. In this example, the screen is unlocked only when the first undefined character string precedes the defined character string and includes a specified number of characters and the second undefined character string follows the defined character string and includes a specified number of characters. In some implementations, this condition can be set by the user.

Referring to FIG. 12A, the processor 112 determines whether two undefined character strings preceding and following the defined character string respectively belong to the input character string in step 9041. When the undefined character strings are not part of the input character string, that is, when the input character string matches the defined character string, the processor 112 determines that the input character string is valid in step 9043. By contrast, when the two undefined character strings preceding and following the defined character string belong to the input character string, the processor 112 goes to step 9045.

In step 9045, the processor 112 determines whether the undefined character strings each include their specified number of characters. When the undefined character strings each include the specified number of characters, the processor 112 determines that the input character string is valid in step 9043. By contrast, when the undefined character strings do not include the specified number of characters, the processor 112 determines that the input character string is invalid in step 9047.

FIGS. 12B through 12F depict a user interface screen for unlocking the screen of the electronic device 100 according to aspects of the disclosure. In the example of FIGS. 12B through 12F, the condition for unlocking the screen is satisfied when the first undefined character string precedes the defined character string and includes two characters and the second undefined character string follows the defined character string and includes three characters. The password unlock screen 12 includes a keypad 1201 having a plurality of buttons, for example, digit buttons, letter buttons, and symbol buttons, and a window 1202 which hides the digit, the letter, or the symbol of the touched button of the keypad 1201.

Figure 12B:
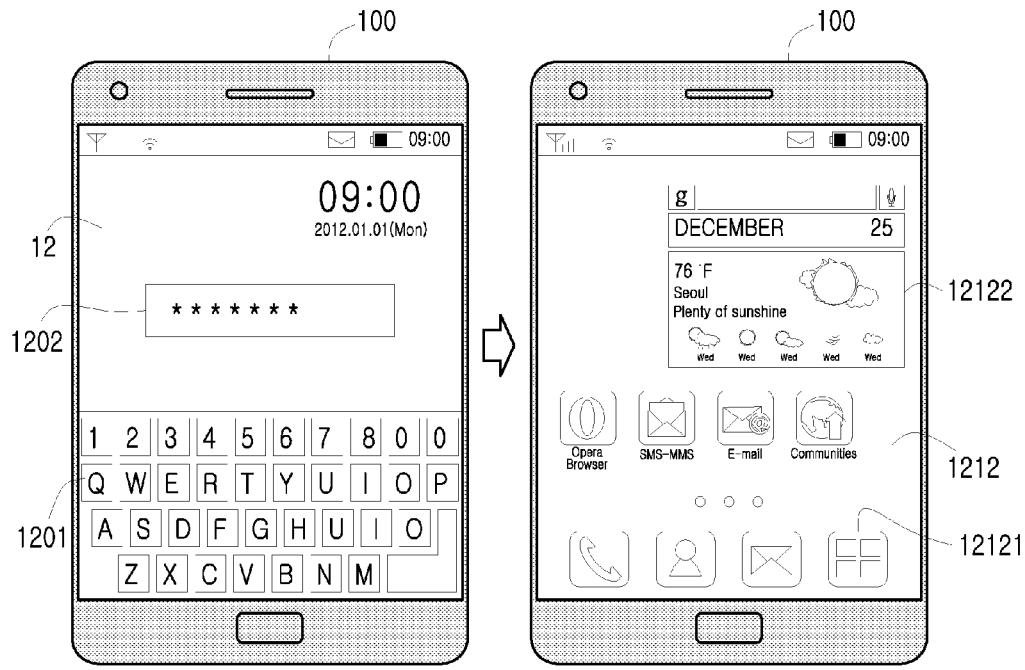
FIGS. 12B, 12C, 12D, 12E, and 12F are diagrams of a user interface screen for unlocking the screen of an electronic device according to aspects of the disclosure.
Figure 12B:
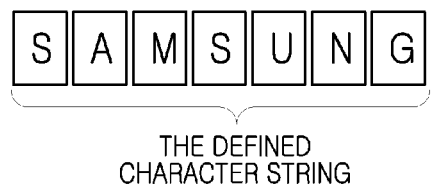

Referring to FIG. 12B, the electronic device 100 provides the password unlock screen 12. When a defined character string is input, the electronic device 100 unlocks the screen and provides the unlocked screen 1212. The unlocked screen 1212 can provide shortcuts to an icon 12121 and a widget 12122. Additionally or alternatively, the unlocked screen 1212 can be the screen an application that is executed by the device 100.

Figure 12C:
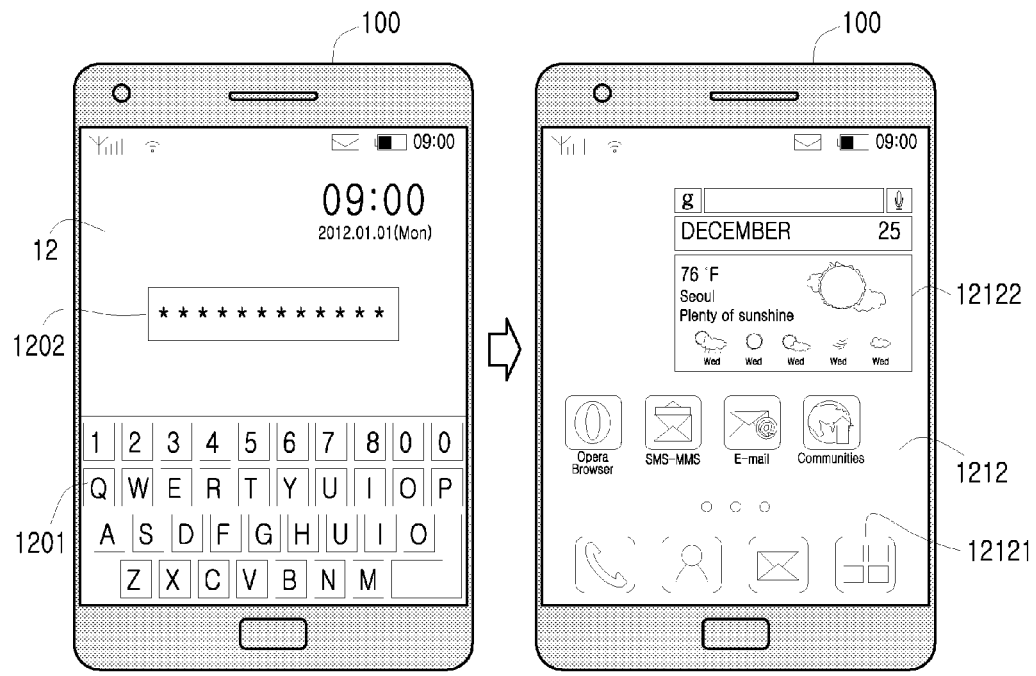
Figure 12C:
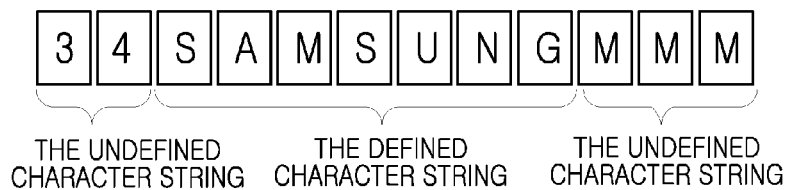

Referring to FIG. 12C, the electronic device 100 provides the password unlock screen 12. When a first undefined character string including two characters, a defined character string following the first undefined character string, and an undefined character string following the defined character string and including three characters are input, the electronic device 100 unlocks the screen and provides the unlocked screen 1212.

Figure 12D:
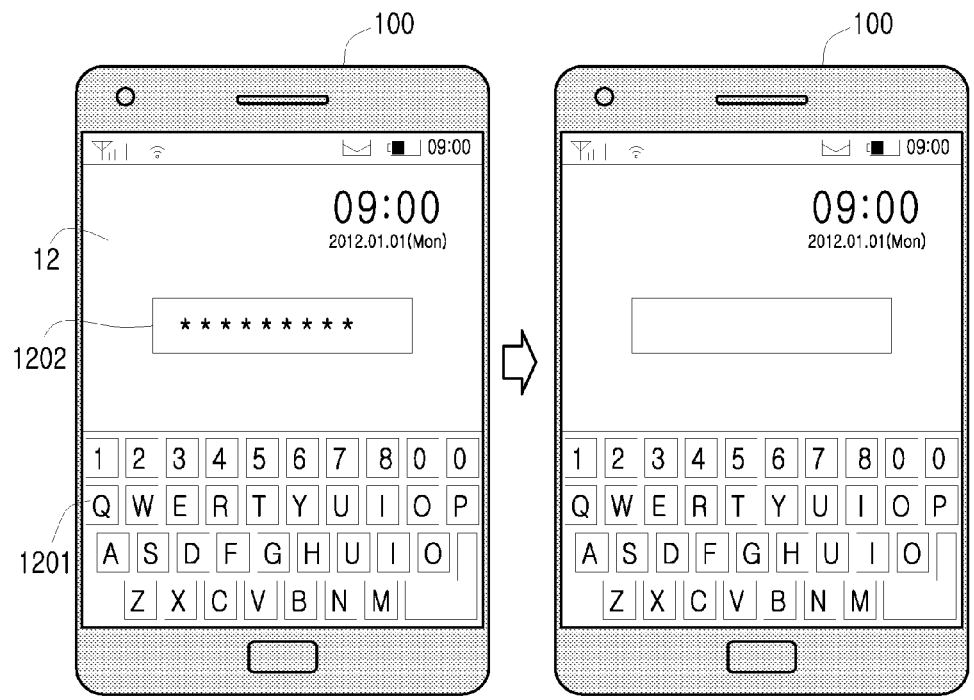
Figure 12D:
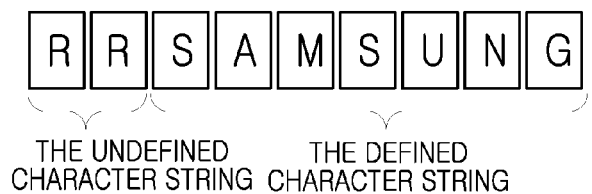

Referring to FIG. 12D, the electronic device 100 provides the password unlock screen 12. When an undefined character string including two characters and a defined character string following the undefined character string are input, the electronic device 100 holds the screen locked. In this example, the reason for keeping the screen locked is that there is no undefined character string following the defined character string and including three characters.

Figure 12E:
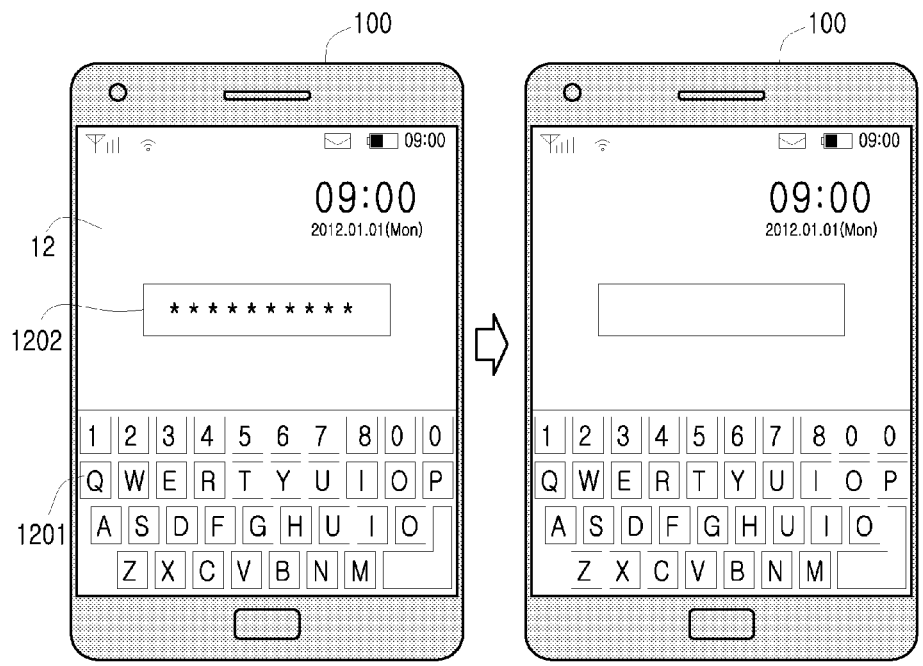
Figure 12E:
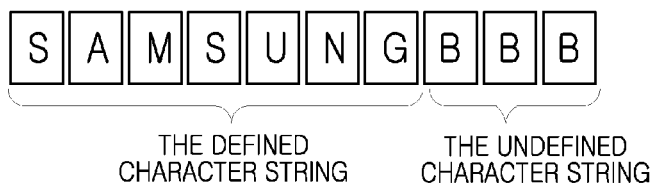

Referring to FIG. 12E, the electronic device 100 provides the password unlock screen 12. When a defined character string and an undefined character string following the defined character string are input, the electronic device 100 holds the screen lock. In this example, the reason for keeping the screen locked is that there is no undefined character string preceding the defined character string and including two characters.

Figure 12F:
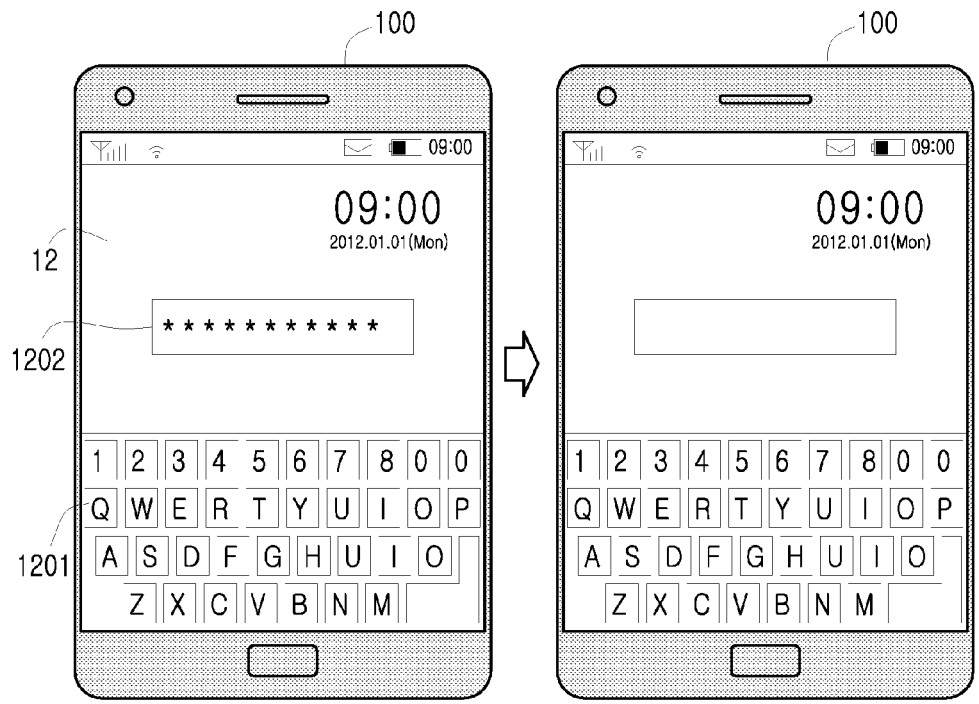
Figure 12F:
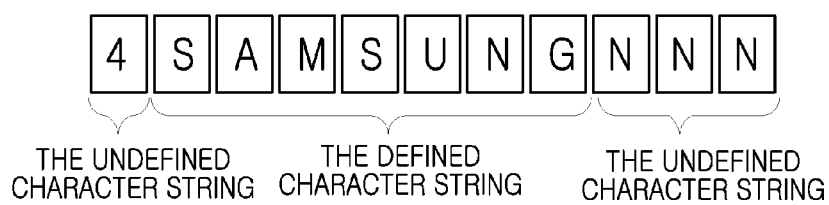

Referring to FIG. 12F, the electronic device 100 provides the password unlock screen 12. When a first undefined character string including one character, a defined character string following the first undefined character string, and a second undefined character string following the defined character string and including three characters are input, the electronic device 100 holds the screen lock. In this example, the reason for keeping the screen locked is that the undefined character string preceding the defined character string includes one character, rather than two characters.

Figure 13A:
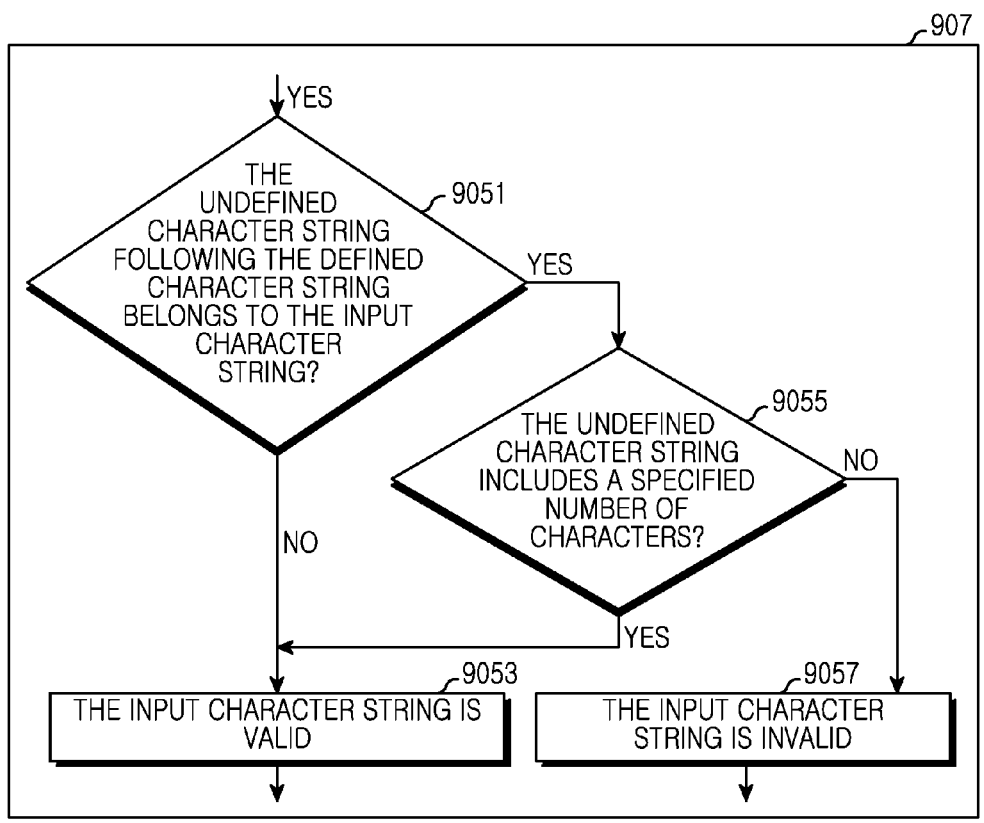
FIG. 13A is a flowchart of a method for determining whether an input character string is valid in accordance with aspects of the disclosure.

FIG. 13A is a flowchart of a method for performing step 907 of FIG. 9A according to aspects of the disclosure.

In the example of FIG. 13A, the screen of device 100 is unlocked when an input character string includes a defined character string and an undefined character string following the defined character string and including a specified number of unspecified characters. The presence of an undefined character string preceding the defined character string and including an unspecified number of unspecified characters is irrelevant with respect to the unlocking of the screen. In some implementations, this condition can be set by the user.

Referring to FIG. 13A, the processor 112 determines whether an undefined character string following the defined character string belongs to the input character string in step 9051. When the undefined character string is not part of the input character string, that is, when the input character string matches the defined character string or when an undefined character string preceding the defined character string is part of the input character string, the processor 112 determines that the input character string is valid in step 9053. By contrast, when the undefined character string belongs to the input character string, the processor 112 goes to step 9055.

In step 9055, the processor 112 determines whether the undefined character string includes a specified number of characters. When the undefined character string includes the specified number of characters, the processor 112 determines that the input character string is valid in step 9053. By contrast, when the undefined character string does not include the specified number of characters, the processor 112 determines that the input character string is invalid in step 9057.

FIGS. 13B through 13E depict a user interface screen for unlocking the screen of the electronic device including the touch screen according to an exemplary embodiment of the present invention. In FIGS. 13B through 13F, the condition for unlocking the screen is satisfied when the undefined character string follows the defined character string and includes two characters. An undefined character string preceding the defined character string is irrelevant to the screen unlock. The password unlock screen 13 includes a keypad 1301 having a plurality of buttons, for example, digit buttons, letter buttons, and symbol buttons, and a window 1302 which hides the digit, the letter, or the symbol of the touched button of the keypad 1301.

Figure 13B:
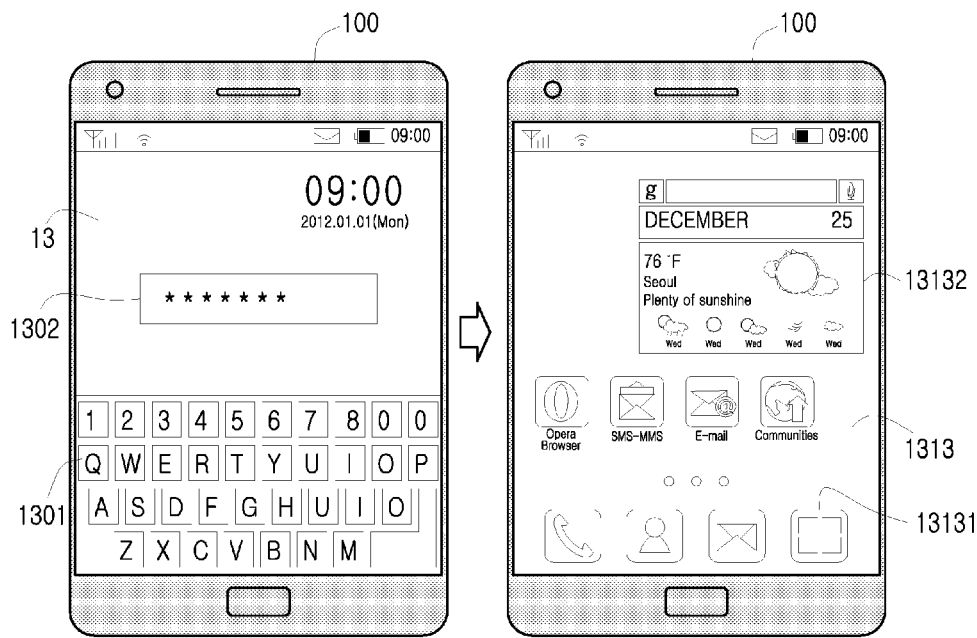
FIGS. 13B, 13C, 13D, and 13E are diagrams of a user interface screen for unlocking the screen of an electronic device according to aspects of the disclosure.
Figure 13B:
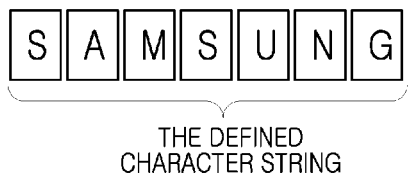

Referring to FIG. 13B, the electronic device 100 provides the password unlock screen 13. When the defined character string is input, the electronic device 100 unlocks the screen and provides the unlocked screen 1313. The unlocked screen 1313 can provide shortcuts to an icon 1301 and a widget 1302. Additionally or alternatively, the unlocked screen 1313 can be the screen of an application that is being executed by the device 100.

Figure 13C:
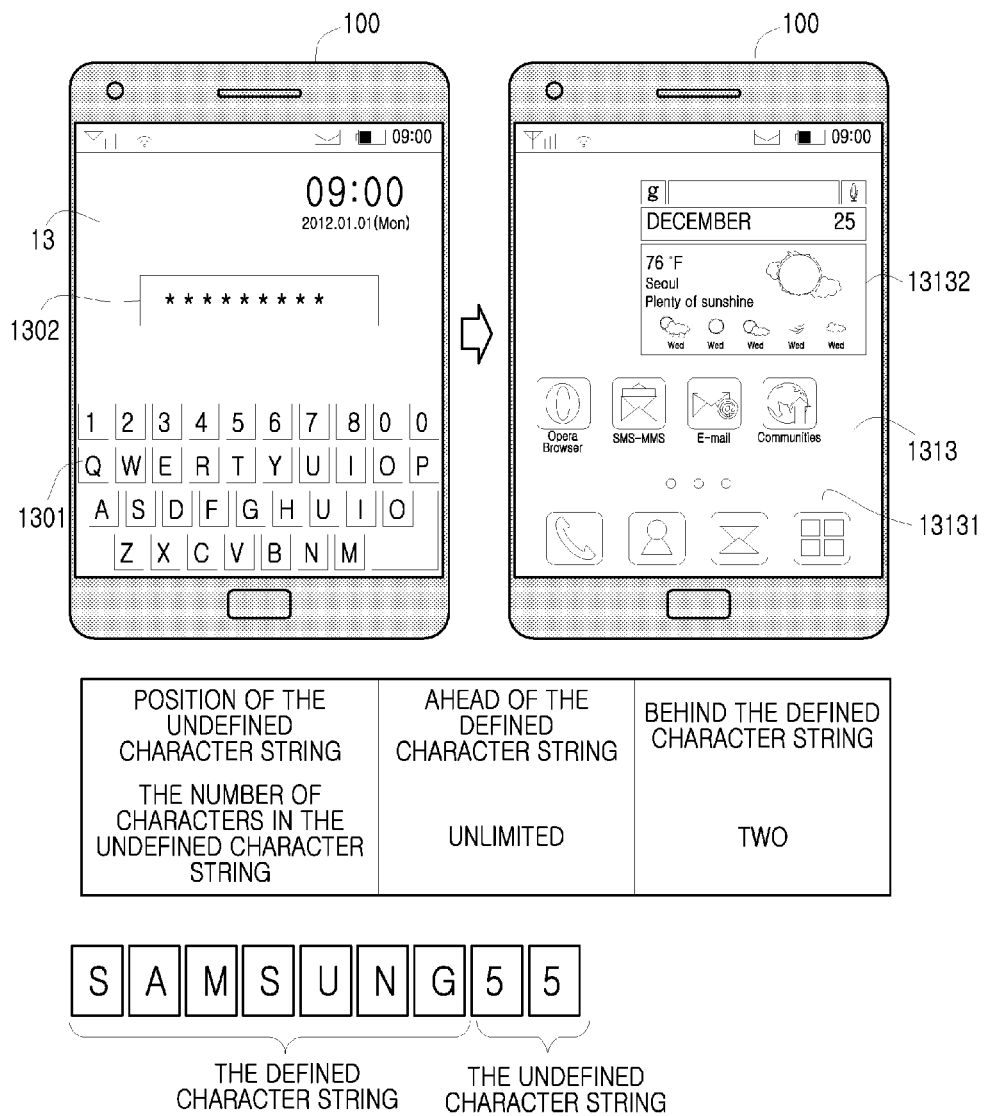

Referring to FIG. 13C, the electronic device 100 provides the password unlock screen 13. When a defined character string and an undefined character string following the defined character string and including two characters are input, the electronic device 100 unlocks the screen and provides the unlocked screen 1313.

Figure 13D:
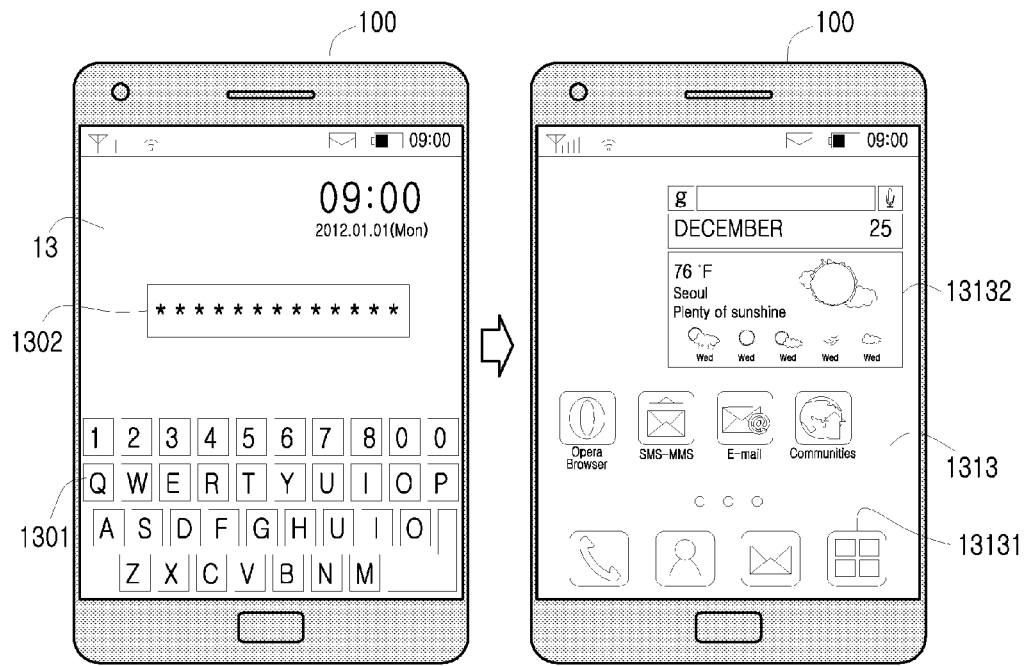
Figure 13D:
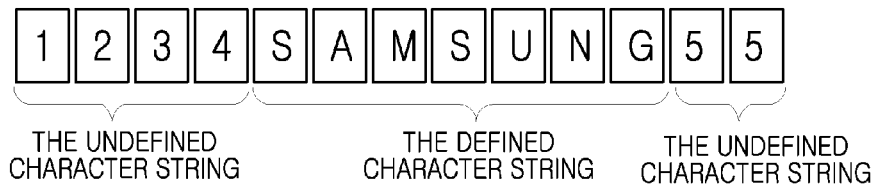

Referring to FIG. 13D, the electronic device 100 provides the password unlock screen 13. When a first undefined character string including a plurality of characters, a defined character string following the first undefined character string, and a second undefined character string following the defined character string and including two characters are input, the electronic device 100 unlocks the screen and provides the unlocked screen 1313.

Figure 13E:
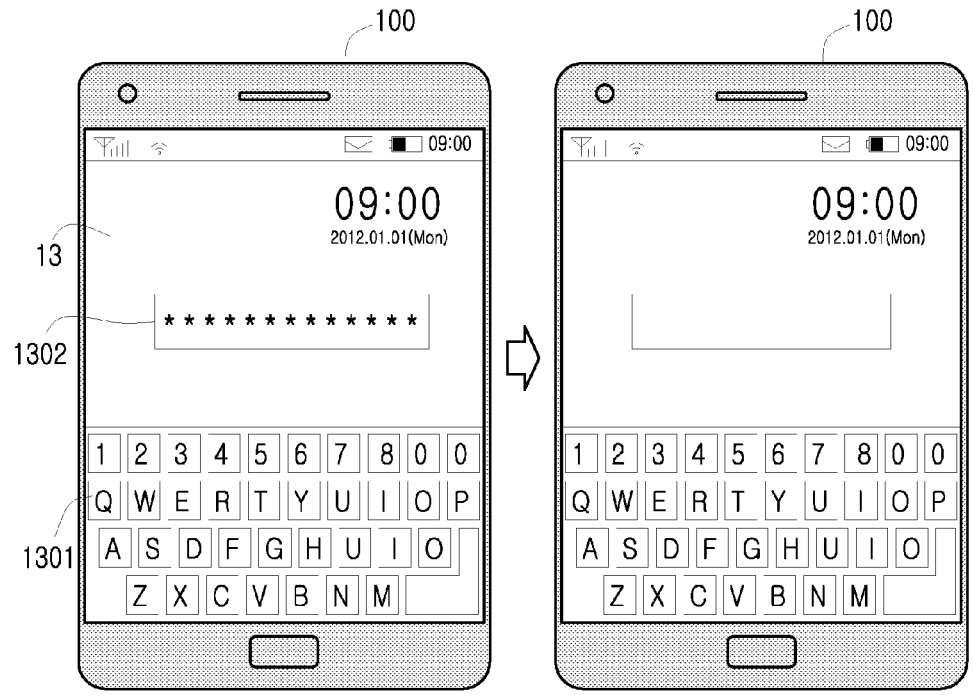
Figure 13E:
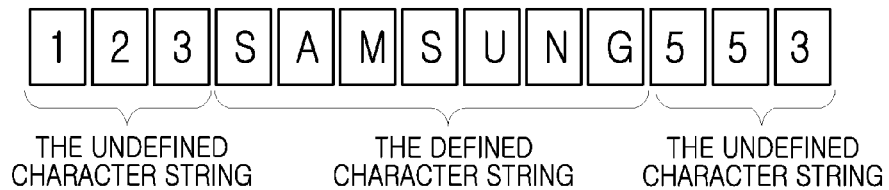

Referring to FIG. 13E, the electronic device 100 provides the password unlock screen 13. When a first undefined character string including a plurality of characters, a defined character string following the first undefined character string, and a second character string following the defined character string and including three characters are input, the electronic device 100 holds the screen locked. In this example, the reason for keeping the screen locked is that the undefined character string following the defined character string includes three characters, rather than two characters.

Figure 14A:
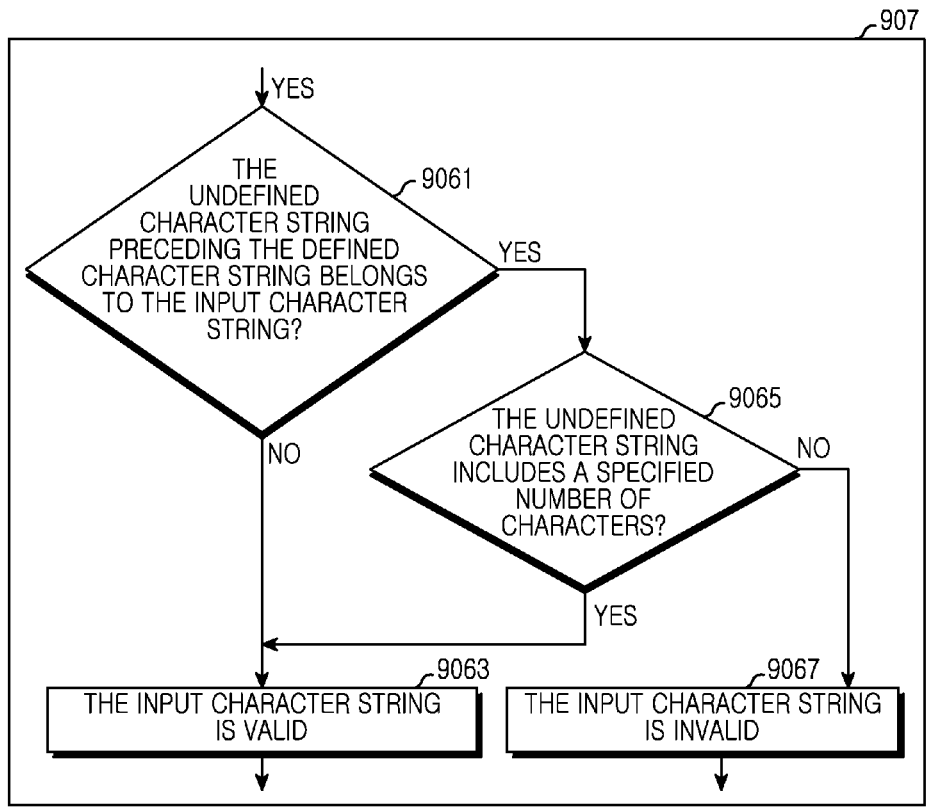
FIG. 14A is a flowchart of a method for determining whether an input character string is according to aspects of the disclosure.

FIG. 14A is a flowchart of a method for performing step 907 of FIG. 9A according to aspects of the disclosure.

In the example of FIG. 14A, the screen of device 100 is unlocked when an input character string includes a defined character string and an undefined character string preceding the defined character string and including a specified number of unspecified characters. The presence of an undefined character string following the defined character string and including an unspecified number of unspecified characters is irrelevant with respect to the unlocking of the screen. In some implementations, this condition can be set by the user.

Referring to FIG. 14A, the processor 112 determines whether an undefined character string preceding the defined character string belongs to the input character string in step 9061. When the undefined character string is not part of the input character string, that is, when the input character string matches the defined character string or when the undefined character string following the defined character string belongs to the input character string, the processor 112 determines that the input character string is valid in step 9063. By contrast, when the undefined character string preceding the defined character string belongs to the input character string, the processor 112 goes to step 9065.

In step 9065, the processor 112 determines whether the undefined character string includes a specified number of characters. When the undefined character string includes the specified number of characters, the processor 112 determines that the input character string is valid in step 9063. By contrast, when the undefined character string does not include the specified number of characters, the processor 112 determines that the input character string is invalid in step 9067.

FIGS. 14B through 14E depict a user interface screen for unlocking the screen of the electronic device 100 according aspects of the disclosure. In FIGS. 14B through 14E, the condition for unlocking the screen is satisfied when the undefined character string follows the defined character string and includes three characters. The presence of an undefined character string following the defined character string is irrelevant with respect to the unlocking of the screen. The password unlock screen 14 includes a keypad 1401 having a plurality of buttons, for example, digit buttons, letter buttons, and symbol buttons, and a window 1402 which hides the digit, the letter, or the symbol of the touched button of the keypad 1401.

Figure 14B:
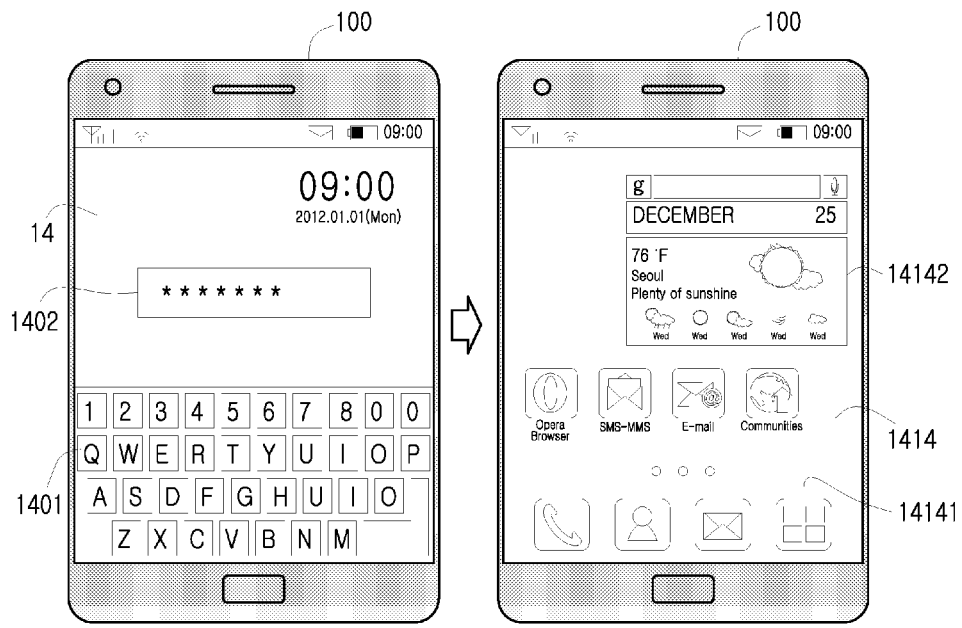
FIGS. 14B, 14C, 14D, and 14E are diagrams of a user interface screen for unlocking the screen of an electronic device according to aspects of the disclosure.
Figure 14B:
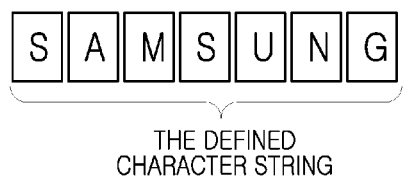

Referring to FIG. 14B, the electronic device 100 provides the password unlock screen 14. When the defined character string is input, the electronic device 100 unlocks the screen and provides the unlocked screen 1414. The defined character may include one or more letters, digits, and/or any other suitable type of symbols. The unlocked screen 1414 can provide shortcuts to an icon 1401 and a widget 1402. Additionally or alternatively, the unlocked screen 1414 can be the screen of an application that is being executed by the device 100.

Figure 14C:
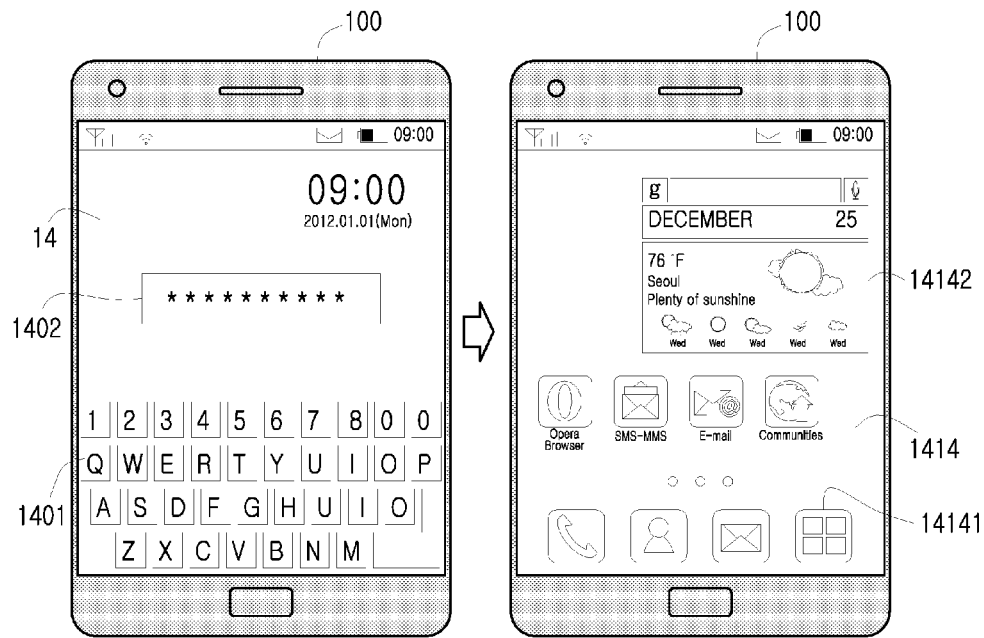
Figure 14C:
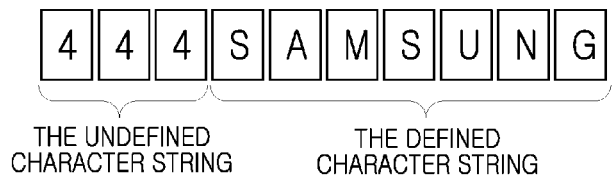

Referring to FIG. 14C, the electronic device 100 provides the password unlock screen 14. When an undefined character string including three characters and a defined character string following the undefined character string are input, the electronic device 100 unlocks the screen and provides the unlocked screen 1414.

Figure 14D:
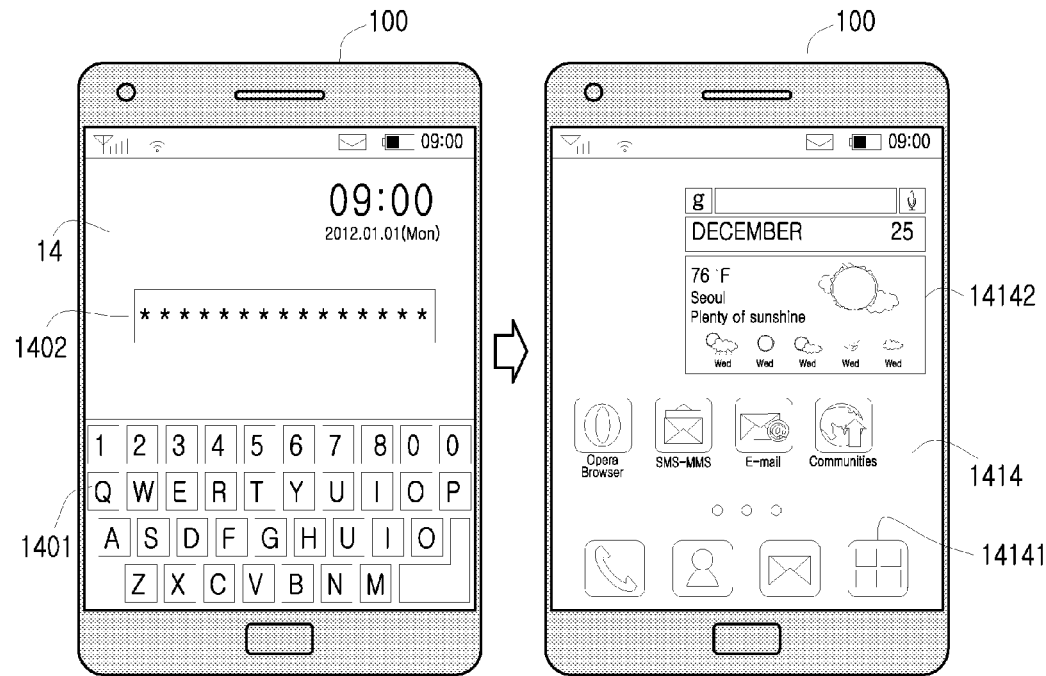
Figure 14D:
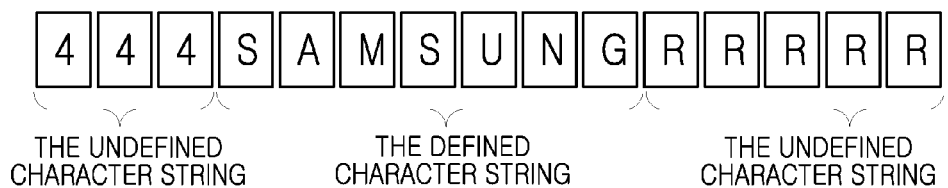

Referring to FIG. 14D, the electronic device 100 provides the password unlock screen 14. When a first undefined character string including three characters, a defined character string following the first undefined character string, and a second undefined character string following the defined character string and including a plurality of characters are input, the electronic device 100 unlocks the screen and provides the unlocked screen 1414.

Figure 14E:
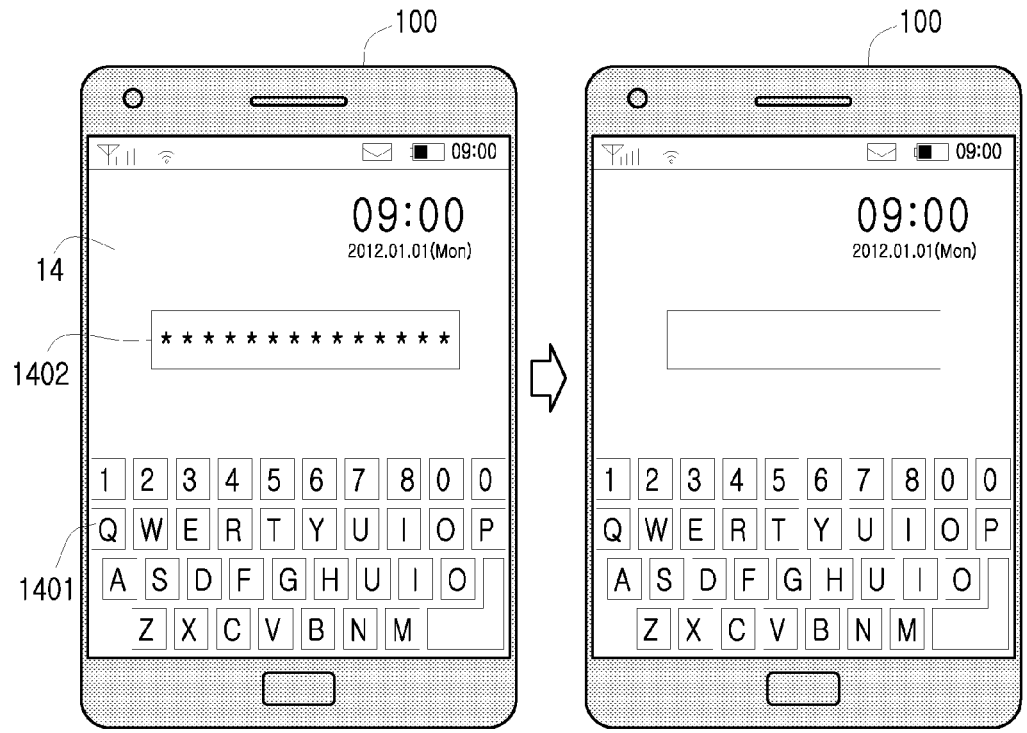
Figure 14E:
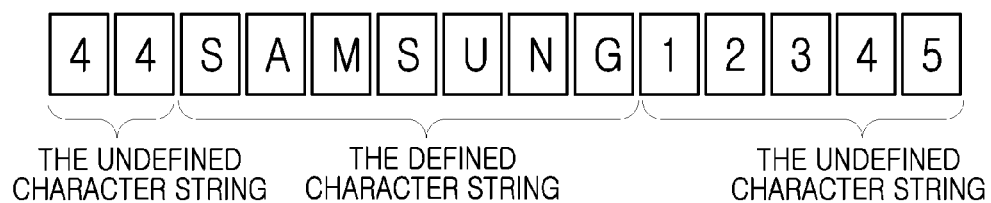

Referring to FIG. 14E, the electronic device 100 provides the password unlock screen 14. When a first undefined character string including two characters, a defined character string following the first undefined character string, and a second character string following the defined character string and including a plurality of characters are input, the electronic device 100 holds the screen locked. In this example, the reason for keeping the screen locked is that the first undefined character string preceding the defined character string includes two characters, rather than three characters.

While the detailed process and the user interface screen for unlocking the screen of the electronic device including the touch screen in FIGS. 9F through 9I are not depicted, the same screen unlock of FIGS. 10A through 14E can be carried out through the PIN unlock screen 91.

The above described conditions for validating user input and unlocking the screen of a device may be implemented as one or more rules. The logic of those rules may be implemented in software that is executed by a processor, in hardware (e.g., as an FPGA or another type of circuit), as a combination of hardware and software that is executed by a processor. As discussed above, some of the conditions are based on "specified" such as specified values for the number of points in a valid undefined sequence (or string) for example. Such specified values, may be specified at runtime by the users of mobile devices that implement the above-described techniques. Additionally or alternatively, such specified values may be specified by programmers or circuit designers that create software and/or circuits that implement the above-described techniques.

In some implementations the determination of whether an undefined (or defined) string belongs to a character string that is input by a user may include determining whether a portion of the input string matches the undefined (or defined) string. Additionally or alternatively, the determination of whether an undefined (or defined) string belongs to a character string that is input by a user may include determining whether the entire input string matches the undefined (or defined) string. In some implementations the determination of whether an undefined (or defined) touch pattern belongs to a touch pattern that is input by a user may include determining whether a portion of the input touch pattern matches the undefined (or defined) touch pattern. Additionally or alternatively, the determination of whether an undefined (or defined) touch pattern belongs to a touch pattern that is input by a user may include determining whether the entire input string matches the undefined (or defined) touch pattern.

The above-described embodiments according to the present disclosure can be implemented in hardware, firmware or via the execution of_software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

As set forth above, the method and the apparatus for unlocking the screen of the electronic device can hide the defined touch pattern or password of the screen unlock from the other person, to thus enhance the security.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for unlocking a screen of an electronic device, comprising:
    receiving a touch pattern;
    determining whether the received touch pattern is valid; and
    unlocking, when the received touch pattern is valid, the screen,
    wherein the determining whether the received touch pattern is valid comprises determining whether the received touch pattern includes a defined touch pattern, and determining, when the received touch pattern includes the defined touch pattern, whether the received touch pattern is valid, and
    wherein the received touch pattern further includes at least one touch pattern connected to the defined touch pattern.

2. The method of claim 1, wherein the determining, when the received touch pattern includes the defined touch pattern, whether the received touch pattern is valid determines whether the received touch pattern is valid based on the connected touch pattern.

3. The method of claim 2, wherein at least one end of the defined touch pattern is previously set, and
    wherein the determining, when the received touch pattern includes the defined touch pattern, whether the received touch pattern is valid comprises:
    determining whether the connected touch pattern is connected to the set end of the defined touch pattern,
    wherein the received touch pattern is valid when the connected touch pattern is connected to the set end of the defined touch pattern.

4. The method of claim 3, wherein the determining whether the connected touch pattern is connected to the set end of the defined touch pattern comprises:
    determining whether the connected touch pattern follows the defined touch pattern.

5. The method of claim 3, wherein the determining whether the connected touch pattern is connected to the set end of the defined touch pattern comprises:
    determining whether the connected touch pattern precedes the defined touch pattern.

6. The method of claim 2, wherein the determining, when the received touch pattern includes the defined touch pattern, whether the received touch pattern is valid comprises:
    determining whether the connected touch pattern includes a previously set number of touch points,
    wherein the received touch pattern is valid when the connected touch pattern includes the set number of touch points.

7. The method of claim 1, further comprising:
    holding, when the received touch pattern is invalid, the screen locked.

8. A method for unlocking a screen of an electronic device, comprising:
    receiving a character string;
    determining whether the received character string is valid; and
    unlocking, when the received character string is valid, the screen,
    wherein the determining whether the received character string is valid comprises determining whether the received character string includes a defined character string, and determining, when the received character string includes the defined character string, whether the received character string is valid,
    wherein the received character string further includes at least one character string other than the defined character string.

9. The method of claim 8, wherein the determining, when the received character string includes the defined character string, whether the received character string is valid determines whether the received character string is valid based on the other character string.

10. The method of claim 9, wherein at least one end of the defined character string is previously set, and
    wherein the determining, when the received character string includes the defined character string, whether the received character string is valid comprises:
    determining whether the other character string is connected to the set end of the defined character string,
    wherein the received character string is valid when the other character string is connected to the set end of the defined character string.

11. The method of claim 9, wherein the determining whether the other character string is connected to the set end of the defined character string comprises:
    determining whether the other character string follows the defined character string.

12. The method of claim 9, wherein the determining whether the other character string is connected to the set end of the defined character string comprises:
    determining whether the other character string precedes the defined character string.

13. The method of claim 9, wherein the determining, when the received character string includes the defined character string, whether the received character string is valid comprises:
    determining whether the other character string includes a previously set number of characters,
    wherein the received character string is valid when the other character string includes the set number of characters.

14. The method of claim 8, further comprising:
    holding, when the received character string is invalid, the screen locked.

15. An electronic device comprising:
    at least one processor;
    a memory coupled to the processor, the memory storing a plurality of processor-executable instructions, which when executed by the processor cause the processor to;
    receive a character string or a touch pattern,
    determine whether the received character string or the received touch pattern is valid,
    unlock, when the received character string or the received touch pattern is valid, a screen of the electronic device, and
    wherein the processor determines whether the received touch pattern includes a defined touch pattern, and determines, when the received touch pattern includes the defined touch pattern, whether the received touch pattern is valid, or
    wherein the processor determines whether the received character string includes a defined character string, and determines, when the received character string includes the defined character string, whether the received character string is valid,
    wherein the received touch pattern further includes at least one touch pattern connected to the defined touch pattern and the received character string further includes at least one character string other than the defined character string.

16. The electronic device of claim 15, wherein the processor determines whether the received touch pattern is valid based on the connected touch pattern.

17. The electronic device of claim 16, wherein at least one end of the defined touch pattern is previously set, and
   wherein the processor determines whether the connected touch pattern is connected to the set end of the defined touch pattern,
   wherein the received touch pattern is valid when the connected touch pattern is connected to the set end of the defined touch pattern.

18. The electronic device of claim 16, wherein the processor determines whether the connected touch pattern includes a previously set number of touch points,
   wherein the received touch pattern is valid when the connected touch pattern includes the set number of touch points.

19. The electronic device of claim 15, wherein the processor determines whether the received character string is valid based on the other character string.

20. The electronic device of claim 19, wherein at least one end of the defined character string is previously set, and
   wherein the processor determines whether the other character string is connected to the set end of the defined character string,
   wherein the received character string is valid when the other character string is connected to the set end of the defined character string.

21. The electronic device of claim 19, wherein the processor determines whether the other character string includes a previously set number of characters,
   wherein the received character string is valid when the other character string includes the set number of characters.

22. The electronic device of claim 15, wherein the processor holds the screen locked when the received character string or the received touch pattern is invalid.

* * * * *